US00RE37157E

(19) United States
(12) Reissued Patent
Ikeda et al.

(10) Patent Number: US RE37,157 E
(45) Date of Reissued Patent: May 1, 2001

(54) PRINTER WITH FACE-DOWN DELIVERY OF COLLATED PRINTED SHEETS AT THE TOP, AND A MANUALLY REMOVABLE PC/DEVELOPER CARTRIDGE

(75) Inventors: Kunihiko Ikeda, Kodaira; Shigeru Suzuki, Yokohama; Takashi Yokota, Tokyo; Akira Shimura, Kawasaki; Yutaka Kodama, Tokyo; Shigeru Yamazaki, Tanashi; Masaichi Niro, Tokyo; Satoru Tomita, Kawasaki, all of (JP)

(73) Assignee: Ricoh Company, Ltd., Tokyo (JP)

(21) Appl. No.: 08/595,524

(22) Filed: Feb. 1, 1996

Related U.S. Patent Documents

Reissue of:
(64) Patent No.: 4,887,133
Issued: Dec. 12, 1989
Appl. No.: 07/244,584
Filed: Sep. 13, 1988

U.S. Applications:

(63) Continuation of application No. 08/111,828, filed on Aug. 25, 1993, now abandoned, which is a continuation of application No. 07/806,874, filed on Dec. 12, 1991, now abandoned, which is a continuation of application No. 07/037,633, filed on Apr. 13, 1987, now abandoned, which is a division of application No. 06/434,701, filed on Oct. 15, 1982, now Pat. No. 4,657,372.

(30) Foreign Application Priority Data

Oct. 16, 1981 (JP) ..... 56-165128

(51) Int. Cl.[7] ..... G03G 21/00; G03G 15/00; B65H 29/00

(52) U.S. Cl. ..... 399/124; 271/184; 271/902; 399/116; 399/119; 399/405

(58) Field of Search ..... 355/200, 210, 355/211, 212, 308, 309, 321; 399/111, 113, 116, 117, 119, 124, 405; 271/184, 186, 902

(56) References Cited

U.S. PATENT DOCUMENTS

| | | | | |
|---|---|---|---|---|
| Re. 29,323 | | 7/1977 | Kawakubo et al. . | |
| 3,062,110 | | 11/1962 | Shepardson et al. . | |
| 3,181,418 | | 5/1965 | Durlofsky | 355/212 |
| 3,411,932 | * | 11/1968 | Malone et al. | 355/297 X |
| 3,606,532 | | 9/1971 | Shelffo et al. | 355/212 |
| 3,655,282 | * | 4/1972 | Turner et al. | 355/310 |
| 3,738,743 | | 6/1973 | Hoffman et al. . | |
| 3,772,497 | * | 11/1973 | Gray et al. | 355/286 X |
| 3,809,475 | * | 5/1974 | Post et al. | 355/206 |
| 3,966,316 | | 6/1976 | Pfeifer et al. | 355/200 |
| 3,985,436 | | 10/1976 | Tanaka et al. | 355/200 |
| 4,045,135 | | 8/1977 | Doi et al. . | |
| 4,095,886 | * | 6/1978 | Koeleman et al. | 355/290 |
| 4,144,539 | | 3/1979 | Davie et al. | 346/160 |
| 4,169,674 | | 10/1979 | Russel | 355/309 |

(List continued on next page.)

FOREIGN PATENT DOCUMENTS

| | | |
|---|---|---|
| 49-42930 | 11/1974 | (JP) . |
| 50-53051 | 5/1975 | (JP) . |
| 50-17861 | 6/1975 | (JP) . |
| 51-2433 | 1/1976 | (JP) . |

(List continued on next page.)

*Primary Examiner*—Fred L Braun
(74) *Attorney, Agent, or Firm*—Cooper & Dunham LLP

(57) ABSTRACT

A compact printer has a sheet feeder positioned at its front wall and electrophotographic components arranged along a sheet moving path for receiving a sheet from the sheet feeder and for exposing, developing, then transferring a toner image onto the sheet. At its rear side, the printer has an image fixing unit and a discharge portion for discharging the sheet to a side output tray or onto the top wall of the printer. The discharge portion is provided with a detachably hinged, sheet turning apparatus when it is desired to discharge sheets onto the top wall, or with a detachably hinged cover with a rear opening to discharge sheets onto a rear side output tray.

38 Claims, 47 Drawing Sheets

(AMENDED)

U.S. PATENT DOCUMENTS

| | | | | |
|---|---|---|---|---|
| 4,304,485 | * | 12/1981 | Povio | 355/321 |
| 4,325,626 | | 4/1982 | Murata et al. | 355/3 DR |
| 4,332,467 | | 6/1982 | Kimura et al. | 355/14 D |
| 4,335,951 | * | 6/1982 | Scribner | 355/285 |
| 4,364,656 | * | 12/1982 | Yanagawa | 355/212 |
| 4,379,631 | | 4/1983 | Kitamura . | |
| 4,382,674 | * | 5/1983 | Miyoshi et al. | 355/285 X |
| 4,386,838 | | 6/1983 | Hirabayashi et al. | 355/200 |
| 4,432,632 | * | 2/1984 | Yokota | 355/212 X |
| 4,538,896 | | 9/1985 | Tajima et al. | 355/200 |

FOREIGN PATENT DOCUMENTS

| | | | |
|---|---|---|---|
| 52-49631 | 4/1977 | (JP) . | |
| 52-80127 | 7/1977 | (JP) . | |
| 53-19834 | 2/1978 | (JP) | G03G/15/00 |
| 53-41228 | 4/1978 | (JP) . | |
| 53-108430 | 9/1978 | (JP) | G03G/21/00 |
| 54-52543 | 4/1979 | (JP) . | |
| 54-153035 | 12/1979 | (JP) . | |
| 54-153240 | 12/1979 | (JP) . | |
| 54-157051 | 12/1979 | (JP) . | |
| 54-166336 | 12/1979 | (JP) . | |
| 55-105451 | 1/1980 | (JP) . | |
| 55-27236 | 2/1980 | (JP) . | |
| 55-38527 | 3/1980 | (JP) | G03G/15/04 |
| 55-38593 | 3/1980 | (JP) . | |
| 55-73073 | 6/1980 | (JP) | G03G/15/22 |
| 55-84742 | 6/1980 | (JP) . | |
| 55-86034 | 6/1980 | (JP) . | |
| 55-93185 | 7/1980 | (JP) . | |
| 55-98762 | 7/1980 | (JP) . | |
| 55-115544 | 9/1980 | (JP) . | |
| 55-133076 | 10/1980 | (JP) . | |
| 55-141132 | 10/1980 | (JP) | G03G/15/00 |
| 55-144264 | 11/1980 | (JP) | G03G/15/04 |
| 55-153949 | 12/1980 | (JP) . | |
| 55-157723 | 12/1980 | (JP) | G03G/15/00 |
| 55-157753 | 12/1980 | (JP) | G03G/13/00 |
| 55-167954 | 12/1980 | (JP) | G03G/15/00 |
| 56-9758 | 1/1981 | (JP) . | |
| 56-15507 | 4/1981 | (JP) | G03G/15/00 |
| 56-16426 | 4/1981 | (JP) . | |
| 56-47535 | 5/1981 | (JP) . | |
| 56-91248 | 7/1981 | (JP) . | |
| 56-128958 | 8/1981 | (JP) . | |
| 56-111859 | 9/1981 | (JP) . | |
| 56-113152 | 9/1981 | (JP) | G03G/15/00 |
| 56-122761 | 9/1981 | (JP) | G03G/15/00 |
| 58-54392 | 1/1983 | (JP) | G03G/21/00 |

* cited by examiner

FIG. 5 (AMENDED)
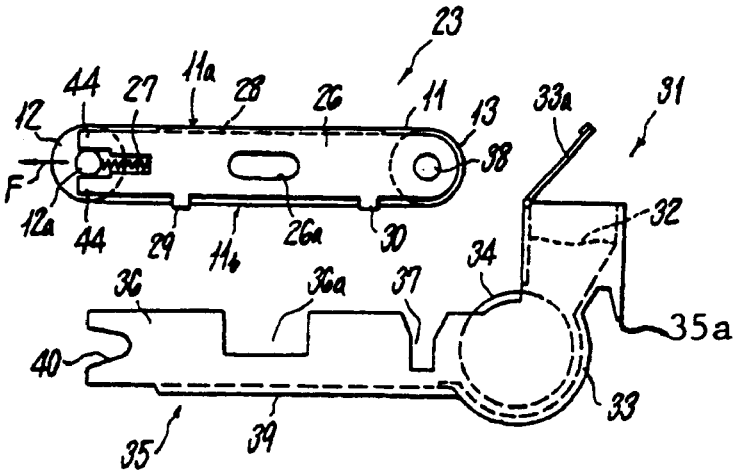

(5)

PRINTER WITH FACE-DOWN DELIVERY OF COLLATED PRINTED SHEETS AT THE TOP, AND A MANUALLY REMOVABLE PC/DEVELOPER CARTRIDGE

Matter enclosed in heavy brackets [ ] appears in the original patent but forms no part of this reissue specification; matter printed in italics indicates the additions made by reissue.

This *reissue* application is a continuation of *reissue application Ser. No. 08/111,828, filed Aug. 25, 1993, now abandoned, which is a continuation of application Ser. No. 07/806,874, filed Dec. 12, 1991, now abandoned, for the reissue of U.S. Pat. No. 4,887,133 granted Dec. 12, 1989 on application Ser. No. 244,584, which is a continuation of* application Ser. No. 37,633, filed Apr. 13, 1987, now abandoned, which is a divisional of application Ser. No. 434,701, filed Oct. 15, 1982, now U.S. Pat. No. 4,657,372.

BACKGROUND OF THE INVENTION

At the current state of the art, input and output devices associated with a computer operate at an increased rate. Accordingly, a high speed of operation is required of a printer which is to be used as an output device. It should be understood that the printer be capable of providing a high resolution for the images being recorded, but it is also necessary that the printer be compact to reduce the space requirement and facilitates its maintenance. If a high speed of printing operation is realized, this does not assure an actual high speed operation if the apparatus is bulky and it takes a long time for trouble-shooting. Another factor required is a low running cost.

When a record in the form of an endless belt is used, the record extending around the belt rollers must be changed from time to time because of degradation or damage thereof. It will be understood that when the record unit is not mounted on the printer or during its stowage or shipment, an unnecessary application of the tension to the record causes a change in the configuration of the record by producing a curvature in its regions which are pressed against the belt rollers. In addition, if the tension is maintained under adverse environment of high temperature, high humidity and/or low temperature and over a prolonged period of time as experienced during the stowage for shipment, an elongation, surface cracks or degradation of quality of the record may result. Accordingly, a tension release mechanism is provided to avoid these problems in order to release the action of the tensioning mechanism during the replacement, stowage or shipment of the record.

As the record in the form of an endless belt moves along a loop, a static electricity may be produced between the record and a member which supports it. The static electric tends to attract the record to the support member, interfering with a smooth movement of the record.

When a photosensitive member comprises an endless belt which is supported by a drive roller and one or more follower rollers, each of which has a peripheral length that is reduced as compared with the full perimeter of the belt, the space occupied by the photosensitive member within the printer can be reduced, thus resulting in a reduced size of the arrangement. However, with this arrangement, the photosensitive member will have a reduced radius of curvature in its region of contact with the roller or rollers and a slack may be produced in the photosensitive belt between adjacent rollers in a selected region. Therefore, the locations for the exposure station, the charger and the developing unit must be carefully chosen. Specifically, the exposure station must be located in a region of the record where a fluctuation in the running speed of the photosensitive surface is low and having an increased radius of curvature. The developing unit must be located so as to minimize a variation in the developing gap. Finally, the location for the charger must be chosen in a region of the record which is free from a rapid variation in its configuration and where a variation in the position of the photosensitive surface is reduced.

To form a sharp image, it is essential that an electrostatic latent image be formed in accurate conformity to image information. At this end, it is necessary that the surface of the record which has been uniformly charged as a result of a corona discharge from the charger be rendered conductive only in those regions which are exposed and the electric potential of such regions be brought as close to the ground potential or zero volt as possible.

In the above case, it is necessary that the record be connected to a grounding brush in an electrically effective and stable manner.

As the record in the form of the endless belt is driven by the roller, a meandering and an offsetting phenomenon of the belt may occur in which the record shifts in a direction perpendicular to the direction of the drive applied, and which is attributable to a difference in the magnitude of the tension applied to the record by the roller, as measured between the opposite axial ends of the roller, or to an error in the parallelism between the shafts of the rollers. Such phenomenon must be prevented since otherwise an image formed on the record or to be transferred onto a transfer sheet becomes offset.

In one arrangement which is used to prevent this phenomenon, the roller or rollers which support and drive the record in the form of the endless belt is provided with flanges which control the edges of the record to limit the meandering and offsetting of the belt. In another arrangement, at least one of the rollers which support and drive the endless belt is provided with an automatic aligning mechanism including an aligning shaft which utilizes an offsetting force of the belt produced, as the offset occurs to cause the belt to be driven in the oppose direction from the direction of initial off-setting. In the first mentioned arrangement, stresses are produced in the edge of the record as a result of an offsetting action, and produces a deformation in the edge thereof, thus substantially degrading the durability of the record and the reliability of the printer. Hence, when this arrangement is used, the record must have a base of an increased thickness to increase the resistance to deformation. Alternatively, the offsetting action of the belt must be diminished. However, an increased thickness of the base of the record is undesirable since it causes a reduction in the bonding strength of the record layer to the base and an increase in the belt tension as a result of increasing bending stresses. If one elects the choice to diminish the offsetting action of the belt, a delicate adjustment of the tension in the belt is required, resulting in a completed arrangement which requires a high precision. In the second arrangement mentioned above, a roller assembly of a high accuracy is necessary to permit a reliable automatic aligning operation. Again, there results a complex and expansive arrangement which is of an increased size.

If an offset control is performed during the time when a transfer operation is being performed, the movement of the record and the transfer sheet in the respective given directions will be disturbed, disadvantageously producing back stripes or blurring of transferred image. Hence, the offset control should be made when no transfer operation takes place or when the transfer charger is inoperative.

To control an offsetting of the belt, the use of some means which constrains the lateral edge of the belt involves the likelihood that such edge may be deformed or damaged.

The printer according to the invention adopts a magnetic brush developing process in which a magnetic developer is used to convert an electrostatic latent image into a visual image. As is well recognized, in a magnetic brush development process, a developing roller is formed by a non-magnetic cylindrical sleeve and a magnet or magnets disposed inside the sleeve. By producing a relative movement between the sleeve and the magnets, a magnetic brush is formed on the surface of the sleeve for sliding contact with the latent image to convert it into a visual image. The magnetic brush developing process is most popular among the developing processes of dry type in view of its practical feasibility, and is extensively used in copying machines, printers, plotters, and recording systems of facsimile systems.

In the magnetic brush developing process, the toner concentration must be uniform and the height of tuft of the magnetic brush must be substantially constant in order to enable a developing effect free from non-uniformity. Where two-component developer is used, a sufficient agitation must be made to achieve a uniform toner concentration. To form a tuft of the magnetic brush which has a constant height, there must be provided a doctor blade which is mounted at a given spacing from the sleeve surface, thus limiting the developer to a given height as it is formed on the sleeve.

In the prior art practice, the spacing between the sleeve and the doctor blade is on the order of 0.1 to 1.0 mm where one component developer is used in the magnetic brush developing process, and such spacing is on the order of 1.0 to 3.0 mm where two-component developer is used. When the spacing between the sleeve and the doctor blade is small as given above, a white streaking may appear on a copy image.

A study made by the present inventors revealed that the space between the sleeve and the doctor is plugged with particles of paper, dust, metal powder or the like in the region of white streakings. When the developer recovered by the cleaning unit is returned to the developing unit for re-use, particles of paper, metal powder and the like are admixed with the developer. Also, particles of paper, dust and metal powder which are dispersed within the printer may also become admixed with the developer. As a result, if the clearance between the sleeve and the doctor blade is too small, the space may be plugged with such impurities to prevent a free passage of the developer therethrough, resulting in a localized reduction in the amount of developer. This results in a reduced height of tuft of the magnetic brush where no contact occurs with the latent image or the pressure of contact is minimized if the contact occurs at all, resulting in so-called white streaking. Obviously, a similar streaking also occurs as a result of agglomeration of developer. The occurrence of such streaking is particularly notable with one-component developing process which is utilized with a reduced spacing between the doctor blade and the sleeve.

It is a feature of one-component developing process that the volumetric occupancy of magnetic powder in the magnetic toner is very small, with consequence that the magnetization per single particle of toner is low and that when a magnetic brush is formed on the developing sleeve by means of magnets disposed therein, such brush cannot be comparable to a rough and elongate brush as may be formed with a carrier in two-component developing process. If a toner layer of an increased thickness is formed, the toner formed is susceptible to non-uniformity, given rise to non-uniform optical density of the image. Hence, it is essential that a magnetic brush of a reduced thickness be uniformly formed on the developing sleeve when the one-component developer is used.

In addition, since the layer has a reduced thickness, once the developer layer is used in the developing step, there is produced a great difference in the thickness of the developer layer in areas corresponding to the image and the remainder. If the developer layer is allowed to remain on the sleeve and a fresh developer is supplied thereto, there is a difference in the characteristic between the developer remaining on the surface and the fresh developer, preventing a uniform layer from being formed again to thereby cause a non-uniform optical density of the image or an after-image. An increased amount of triboelectricity of the residual toner increases the electrostatic attraction to the developing sleeve, making it difficult for the toner to be separated from the sleeve.

To overcome these disadvantages, it has been proposed in the prior art to provide a scraper which removes any residual toner from the developing sleeve. Alternatively, a scraper blade may be apertured to return the toner once removed again onto the developing sleeve. However, when the scraper is used, it is usually arranged for contact with the developing sleeve, which requires a troublesome fine adjustment of the mounting of the scraper. Also, the scraper may impair the sleeve. Additionally, the urging effect of the scraper upon the toner may promote the agglomeration of the toner. A smooth removal of the toner may be prevented if the scraper undulates.

Where an apertured scraper is used, it is disposed for contact with the developing sleeve, and the toner once removed from the sleeve is returned thereto again through apertures, thus achieving a toner stirring action. However, the contact of the scraper blade with the sleeve prevents its proper functioning if the blade undulates to be separated from the sleeve. Also, the blade or sleeve may be impaired or an agglomeration of the toner may result. Where a number of copies are produced from a single original, if the toner is removed once from the developing sleeve, it may be supplied to the developing sleeve again before it is sufficiently stirred with fresh developer contained within a toner hopper, thus causing a non-uniform optical density of the image and an after-image.

The replenishment of developer takes place at shorter intervals, and hence its frequency is greatly higher than the interval with which the record is normally changed.

It will be seen that the record cannot be changed unless the unit is completely taken out of the printer, but that the replenishment of developer can be effected if the unit is withdrawn to a degree which is sufficient to open the top cover of the vessel. On the other hand, it is desirable that the exposure of the record to the outside of the arrangement be avoided or minimized since such exposure may cause a degradation in the photosensitive response by the indoor illumination, scratches or deposition of dirts or dusts thereon.

When a record in the form of an endless belt is used, a slack or undulation may occur in the record across the belt rollers. Accordingly, the disposition of the various devices around the record must be carefully chosen.

A higher precision of relative position with respect to the record, as compared with that for the developing unit, is required of the exposure unit. A best choice to maintain a constant relative position between the record and the exposure unit will be obtained by performing the exposure of the record around the roller or in the so-called curved region E. In this instance, it is prerequisite that the scan line of a scanning beam be parallel to the axis of the roller. If such parallel relationship is not maintained for a roller of a reduced diameter, the exposure will not be uniform in the axial direction of the roller or crosswise of the record.

It is also necessary that the charger be disposed at a location which is not subject to a variation in its relative position with respect to the record. In particular, with the charger of Scorotron type, the plurality of grid wires must be all disposed at an equal distance from the record. The printer according to the invention satisfies these requirements in establishing the locations of the exposure and the charging stations.

A sheet feeder for supplying a sheet of record paper toward the record will now be described. In one sheet feeder known in the art, a stack of record sheets is disposed on a movable bottom plate of a tray, and raising member which is urged by a spring bears against the bottom plate to push it up so that an uppermost one of the record sheets in the stack is urged against a feed roller, which then feeds such sheet. In another arrangement in which the tray projects out of the arrangement, the tray is provided with a top cover which can be selectively opened and closed in order to prevent a marring of the record sheets.

In the paper feeder of the type described above, in order to allow the record sheets to be replenished, the raising member must be depressed initially by means of an operating lever to open the top cover, whereupon a supply of record sheets is fed into the tray, followed by closing the cover and releasing the raising member to return it to its upper location. In an alternative arrangement employing a cassette in which a tray is detachably mounted on the printer, it is also necessary to withdraw the cassette from or insert it into the printer, in addition to the operation mentioned above. Thus, a replenishment of record sheets is a troublesome operation.

In the paper feeder described above, it is necessary to provide a sensor which detects the presence or absence of a record sheet or sheets on the bottom plate, and another sensor which detects whether the bottom plate is urged toward the feed roller to enable a normal sheet feed operation whenever the top cover is closed.

Also, a sheet feeder of a type is known in which the bottom plate moves upward to urge the record sheet against the feed roller, which then rotates to partly feed a plurality of record sheets, but delivers only one of the record sheets out of the tray by utilizing a friction pad having a different coefficient of friction. In a sheet feeder of this type, the possibility must be taken into consideration that an additional supply of record sheets may not be properly oriented within the tray. The leading ends of a plurality of record sheets are held between the feed roller and the friction pad. If the bottom plate is allowed to move down under this condition, these record sheets remain in position where their leading ends are held between the roller and the pad without moving down in following relationship with the movement of the bottom plate. If another supply of record sheets is subsequently placed on top thereof, there results an inconvenience that the record sheets which have their leading ends held between the roller and the pad as well as an uppermost one of the sheets are also fed. It is to be mentioned here that located above the sheet feeder is the record/developing unit, above which is disposed the cleaning unit. The purpose of the cleaning unit is to remove and recover any developer which remains on the surface of the record after the transfer step. Accordingly, when the unit is either entirely or partly withdrawn for purpose of replacing the record or replenishing the developer, oscillations or impacts may cause the developer which is recovered by the cleaning unit to fall down over the sheet feeder, in particular over the roller pair, the feed roller and the friction pad. If such developer is deposited thereon, the coefficients of friction of the surfaces of these rollers and pad may change, preventing a normal feed operation. In addition, developer may deposit on the record sheet to produce a marred copy. In addition, during a movement of the record, a powder image formed on the surface thereof may produce a floating toner which mars the record sheet or rollers. It is to be noted that the record sheet, when it is delivered out of the tray, is brought into close contact with the record, and it is necessary that the record sheet be fed in proper orientation.

The printer of the invention employs a fixing unit of roller type. A fixing unit of roller type generally includes a separation claw which is provided for purpose of preventing a record sheet from being wrapped around a fixing roller after the image has been fixed. In the conventional arrangement, the leading end of the claw is maintained in contact with the fixing roller. When the claw is maintained in contact with the roller, the leading end of the claw which is held in contact with the roller serves to scrape the toner, as it is deposited on the roller, thus gradually forming a toner deposition thereon. Accordingly, after a prolonged period of use, the toner deposition causes the leading end of the claw to be removed from the fixing roller, with result that a normal separation of the sheet by the claw is prevented, thereby causing the record sheet to be engaged with the claw, or producing a jamming. In addition, because the leading end of the separation claw is maintained in contact with the roller, a Teflon coating of the roller surface may be damaged to prevent a satisfactory fixing operation in such region, thus causing white streaking in the fixed image to cause a degradation in the image quality.

It is then proposed to provide an electromagnetic drive such as plunger which is energized by an electrical signal when it is desired to separate a record sheet, thereby causing an angular movement of the claw into contact with the roller while normally maintaining it removed from the latter. However, the provision of a separate drive, with an associated control, to cause a movement of the claw toward or away from the roller results in a mechanically and electrically complex arrangement and an increased space requirement to cause an increased cost.

After it is charged, the record should be neutralized for subsequent use thereof. It is also necessary that the transfer paper should be securely separated from the record after a visual image has been transferred to the paper.

To assure a satisfactory cleaning operation with the cleaning unit mentioned above, it is necessary that a constant spacing be maintained between the sleeve and the record surface. In other words, the contact between the fibers implanted on the sleeve surface and the record surface must be maintained uniform, since otherwise a non-uniformity occurs in the cleaning effect. Any residual toner which remains as a result of a failure of cleaning operation or insufficient cleaning operation prevents a satisfactory performance of a next record operation. To overcome such difficulty, it has been the prior art practice to provide bearings on the opposite ends of the sleeve and having a diameter which is slightly greater than the diameter of the sleeve so that these bearings are disposed in abutment against the record surface during their rotation to maintain a constant spacing between the sleeve and the record surface. However, this requires a complex mechanism and causes an increase in the cost. In addition, a disadvantage results that foreign matters such as toner may be deposited in the area of contact between the bearings and the record to cause a gradual decrease in the accuracy of the spacing maintained. According to the invention, a recording is made on the record in the form of an endless belt. In this technique, it is necessary that a junction or joint in the record be treated as a non-record area. Hence, during a record operation, there must be provided some means which detects such junction or joint on the record or the location thereof where the recording operation may be initiated, thus preventing a junction or joint region from being used in its recording operation. It is also to be recognized that it is undesirable that it takes an increased length of time to move the record before the recording operation can be initiated or that the record continues to move after the intended recording operation has been completed.

As a safeguard arrangement associated with the apparatus to form an image, the prior art employs a paper end sensor which detects the presence or absence of record sheets, a register sensor which detects a feed mistake and a jamming sensor which detects the occurrence of a jamming in order to take a suitable measure. By way of example, if the paper end sensor detects the absence of any record sheet, feeding of a record sheet is prevented while simultaneously preventing the register sensor and the jamming sensor from operating, in order to prevent the apparatus from assuming an abnormal condition. In the event the register sensor detects a feed mistake, the jamming sensor is prevented from operating and from acting to provide a safeguard action, again in order to prevent the apparatus from assuming an abnormal condition. However, in a printer using a record in the form of an endless belt, the sequence control is based on a sync signal. If a paper end (exhaustion) or a feed mistake occurs, the subsequent detecting operations are prevented in the prior art arrangement. Accordingly, separate sequential operations must be performed as the situation may be, disadvantageously resulting in a complex control.

Specifically, when the motor starts, a single sync signal is produced per revolution of the record, thus achieving a synchronization between the record and the sequence. At a given time after the initial sync signal is supplied, a write enable signal is produced, which permits the entry of an image to be initiated. The feed roller is driven to supply a record sheet. As the record sheet reaches the location of the register sensor, the drive to the feed roller and the conveyor roller is interrupted, maintaining the record sheet in standby mode at a given location. Subsequently, in response to a signal from a timer which indicates that a given time interval has passed since the occurrence of the write enable signal, the conveyor rollers are restarted to register the leading end of the record sheet with the leading end of the image. The block $A_1$ which effects only the detection of a feed mistake, the block $A_2$ which effects the detection of both a feed mistake and a jamming, the block B which effects the detection of a jamming alone and the block C in which no detection is performed must be separately controlled. In this manner, there results a complex control even though the control would be facilitated if common terms are used in the individual blocks. In the prior art arrangement, if a paper end (exhaustion) is detected in the block $A_2$ and a feed operation is prevented, the detection of a feed mistake must be prevented. Alternatively, if a feed mistake is detected, the detection of a jamming and an associated safeguard operation must be prevented in the block B which is used to deliver the preceeding sheet externally of the printer.

The temperature of the hater used in the fixing unit is detected by means of a thermistor, and the power supply is controlled to maintain a constant temperature. In the prior art arrangement, a thermal fuse is connected in a loop which is used to energize the heater since there is a likelihood for the heater to be excessively heated in the event the thermistor is broken or an abnormality occurs in the temperature detection circuit. If the thermistor is broken, a potential increase or decrease due to the breakage of the thermistor is detected. In this manner, any abnormality which results from the breakage of the thermistor is immediately and automatically detected. However, there is no remedy when the thermal fuse is blown. A printer is available which initiates a time counting operation from the time when the power source for the heater is turned on, and determines automatically the presence of an abnormality in the power system, including a blowout of a thermal fuse unless the detected thermistor temperature reaches or exceeds a given value within a defined time limit. However, this involves a loss time since the determination is rendered after a warm-up period for the heater temperature, which is preset for a normal operation, since the power source for the heater is turned on subsequent to the turn-on of the power supply to the apparatus. The determination of the occurrence of any abnormality is normally executed only immediately after the power supply to the apparatus is turned on, and there is no remedy after the warm-up period for the temperature has passed if the thermal fuse is blown out. To accommodate for this possibility, it is necessary that the operational sequence of the printer includes an abnormality detecting routine which monitors the time periods during which the heater is energized and deenergized and which determines the occurrence of an abnormality in the power system associated with the heater if the detected thermistor temperature is below a given value when it should exceed the latter value. In this manner, the detection of the abnormality is complex, adding to the tasks which must be processed in the printer sequence.

In the printer, the power supply for the control unit as well as the power supply for other mechanical components are turned on when the so-called power switch is turned on by an operator operation or by the closure of a power relay switch in response to an external turn-on signal applied, whereby various devices are preset in a standby mode. Accordingly, the various devices assume given conditions at the start of a printer operation, assuring a smooth initiation of a print operation. When the print operation is completed, these devices return to their standby conditions. Accordingly, it is preferable that the power supplies be turned off during the standby mode by disconnecting the power switch by an operation of an operator or by the opening of the power relay switch in response to the removal of an external turn-on signal applied. However, if the turn-off of the power supplies occurs during the print operation, the presence of a record sheet which fails to be delivered or an incomplete cleaning operation may cause a malfunctioning or a degraded copy quality when the power supplies are turned on the next time. In particular, considering the record, it will be noted that the ozone produced by the charger may remain within the charger casing to degrade the surface of the record in the region where an image to be formed, causing a degradation in the quality of a latent image formed during a subsequent operation.

The record is formed with the sub-scan sync mark, while the drive system for the record is provided with the sync mark detector so that a timing pulse which is based on the detection of such mark and thus is synchronized with the movement of the record may be counted to control the timing of sheet feed, charging, exposure and transfer operations in accordance with preset counts. However, the record may slip with respect to the drive roller, and accordingly the count is initiated to a given value, usually cleared to zero, each time the mark is detected. However, if the magnitude of slip is high, a deviation in the timing may be caused, which cannot be prevented by the initialization alone. To deal with this problem, the prior art provides a timer which is triggered at the time the mark is detected, and unless the mark is detected immediately after the time has timed out, a determination is rendered that there has occurred a timing error, thus indicating the occurrence of an abnormality, by energizing a display or the like to indicate the necessity for an inspection. However, in the prior art practice, of detecting such error, a hardware time such as time limit circuit or a timer integrated circuit is connected to the central unit which performs the timing control, resulting in an increased cost. In addition, the components C and R used to determine the time limit may involve a certain tolerance, which must be adjusted. Also, the temperature causes a variation in the time limit, which therefor must be chosen to be greater than is necessary, resulting in a degraded accuracy in the detection of abnormal slip occurred.

It is also to be noted that the slip between the record and the drive roller may occur at a variable point in time, whereby the phase difference between the detection of the mark and the occurrence of the timing pulses is not uniform. The timing pulse may appear between successive detections of the mark or may appear immediately before or after the detection of the mark. A uniform initialization results in an initial offset between the initial count and the position of the record which varies from instance to instance depending on the time when the detection of a mark occurs and the period of the timing pulse, causing a shift in the control timing which gives rise to a displacement of the location of an image on the record.

A fixing unit which achieves a fixing of a toner image by the application of heat and pressure to a record sheet carrying an unfixed toner image and passing between a pair of rollers requires the provision of a cleaning unit associated with the fixing roller. The usual practice has been to employ a cleaning pad which is brought into abutment against the peripheral surface of the fixing roller. In this instance, the pad abuts against the fixing roller with a uniform force as viewed in the direction of rotation of the roller. Accordingly, the toner deposited on the fixing roller tends to be gradually accumulated on the advanced side of the pad, with the accumulated toner falling down to mar the transfer sheet or a pressure roller disadvantageously.

In the prior art practice, there is a proposal to provide an apparatus for inverting record sheets, which apparatus is located adjacent to a delivery port of the printer in order to permit a paging of record sheets as they are delivered from the printer. However, in the prior art practice, a fitting is employed to construct an inverting apparatus which is perfectly fixed in position. This presents a great inconvenience when a paper jamming occurs at the delivery port or in the fixing unit adjacent thereto or in the event a repair of adjacent parts is required.

When the record is in the form of an endless belt having a joint therein, it is necessary to treat the joint as a nonrecord area. Accordingly, it is necessary to provide some means which detects a starting position for the record or the joint therein so that an image formed can be on the record while avoiding the joint. In contradistinction to the remainder, an area involving the joint is uneven, has a reduced mechanical strength, or may have a photoconductive layer which is liable to exfoliation from a base layer. Hence it is undesirable that the record be stopped at an arbitrarily chosen position. It is also undesirable to spend a length of time before the formation of an image on the record is initiated or to allow the record to continue its movement after the desired image has been formed thereon. If the record is maintained stationary for a prolonged length of time during the formation of an image and if a certain area of the record is located adjacent to a step or station which has an adverse influence upon the formation of an image, such area may be influenced in some way by such step to prevent an image from being formed therein or to result in an image of greatly degraded quality during the next cycle of operation.

A printer employing a record in the form of an endless belt requires the provision of a safety unit which assures a synchronization between a conveying operation of the record and the progress of a printing operation as well as the detection of the presence or absence of a record sheet. A conventional safety unit for printer is known including first detection means which detects the exhaustion of a transfer sheet, second detection means which detects the occurrence of a feed mistake, and third detection means which detects the occurrence of a jamming. Signals from these detection means are utilized to provide an appropriate remedy. For example, when the exhaustion of a transfer sheet is detected by the first detection means, a feed operation for the transfer sheet is prevented while simultaneously disabling the operation of the second and the third detection means, thus avoiding that the priner assumes an abnormal condition. In the event the second detection means has detected a feed mistake, the operation of the third detection means as well as resulting remedy are disabled, thus preventing the printer from entering an abnormal condition. However, in the printer employing an endless belt as the record, it is necessary to perform a sequence control on the basis of a sync signal. In the event the exhaustion of a transfer sheet or a feed mistake occurs, the subsequent operation is disabled in the prior art, so that separate individual sequential operations are required subsequently, resulting in a complex control. By way of example, a path of movement of a record sheet or a transfer sheet may be divided into a plurality of blocks including a block A where only the detection of a feed mistake takes place, a block B where the detection of both the feed mistake and the jamming takes place, a block C where only the jamming is detected and a block D where no detection is made. It will be seen that separate controls are required for each of these blocks. Even though the control will be greatly facilitated if items are provided which are common to all of these blocks, the actual control results in a complex arrangement. Specifically, in the convention arrangement, if the exhaustion of a record sheet is detected in the block B and a feed operation for the record sheet is not performed, the detection of the feed mistake must be disabled. If the feed mistake is detected, the detection of a jamming and the resulting remedy must be disabled in the block C where the preceding sheet has to be delivered out of the printer.

It will be understood that the temperature of the fixing roller is detected by means of a thermistor, and power control is effected to produce a constant temperature. In the event an abnormal condition occurs in a temperature detector circuit including the thermistor or in the event of occurrence of a breakage of the thermistor, the likelihood of an associated heater being overheated must be prevented by connecting a thermal fuse in a loop which is used to energize the heater. The occurrence of a breakage of the thermistor is detected by an increase or decrease in the potential which results from such breakage. In this manner, the breakage of the thermistor can be immediately and automatically detected. However, there is no immediate reaction to the blowout of the thermal fuse. A printer is provided in the prior art which automatically determines the existence of an abnormality in the power system, including the blowout of the thermal fuse, unless the thermistor temperature exceeds a given value within a fixed time interval as the time is counted from the turn-on of the heater. However, this arrangement involves a time lag since the determination is made after a rising time which is normally required for the heater temperature to reach a given value after the power supply therefor has been turned on. In addition, such abnormality determining flow chart is executed only immediately after the power supply for the heater is turned on, and no remedy is provided for the blowout of the thermal fuse after the temperature has reached its normal value. To accommodate for such possibility, the control sequence of the printer must include an abnormality detecting flow chart which monitors the time intervals during which the heater is energized and deenergized and which decides the existence of an abnormality in the heater power system if the thermistor temperature is less than a given value when it should exceed the latter. This complicates the detection of abnormalities in the heater power system, and adds to the tasks in the control sequence of the printer.

In a printer, a power switch is turned on by an operator, or an ON signal is externally applied to close a relay switch associated with a power source, whereby the power supply for the control unit and other devices are turned on, establishing the various parts of the printer in a standby mode. In this manner, the various devices assume given conditions at the start of a printing operation, allowing a smooth initiation of the operation. The completion of the printing operation returns the printer to a similar standby mode, so that it is desirable that during a standby mode, the power switch be turned off by an operator or the ON signal which is externally applied is removed to open the relay switch associated with the power source, thereby turning the power supply off. However, if such a turn-off occurs in the course of the printing operation, the presence of a record sheet which remains undelivered or the incomplete cleaning operation may cause a malfunctioning of the arrangement when the power supply is turned on for the next time, causing a degradation in the quality of the copy. In particular, ozone produced by the charger may remain within the casing of the charger, thereby degrading the quality of the surface of the record in a region where an image is to be formed, and thus degrading the quality of a latent image to be formed subsequently.

Where a record having a joint therein is used, an area of the record which includes the joint cannot be utilized as a region where an image is to be formed. Consequently, during the printing operation, it is necessary to control the operation of the printer so that image information be always supplied to an image region of the record which is free from the joint. At this end, the record is formed with a mark intended to produce a sync signal. The mark can be detected to derive a sync signal which is in turn utilized to control the operation of the printer.

However, a detector which is provided to detected the mark on the record also happens to produce an output signal in response to a flaw or dust on the record. Consequently, if an output from the detector is utilized as a sync signal which is used to control the operation of the printer, a proper operation of the printer may be prevented since output signals which are produced in succession by the detector in response to a number of flaws and dusts may prevent a sequential transfer between successive steps even though the time passes, thus resulting in a failure to complete the printing operation.

In the printer, the record in the form of an endless belt is formed with a sync mark, while a belt drive system is coupled with an encoder. Pulses from the encoder or timing pulses synchronized with the movement of the belt are counted, choosing the detection of the mark as the start point. The resulting counts are utilized to determine the timing when the sheet feeding, charging, exposure and transfer steps are to be performed. However, the belt may slip relative to the drive roller. Accordingly, the count is reset to a given value, or usually cleared to zero each time the mark is detected. However, a phase difference between the detection of the mark and the occurrence of a timing pulse may result from a slip of the belt with respect to the drive roller, and its magnitude is not uniform. In certain instance, a timing pulse may appear between successive detections of the mark while at other times, the timing pulse may appear immediately before or after the detection of the mark. Hence, if the count is reset to a constant value, an initial displacement of the timing pulse relative to the detection of the mark or a relative displacement between the initial count and the position of the record may differ from initialization to initialization, causing a displaced timing in the printing operation, which results in the displacement of a picture frame.

If there occurs a large magnitude of slip, it cannot be compensated for by the initialization. To accommodate for this, there is provided an arrangement in the prior art in which a timer is triggered at the time when a mark is detected, and unless the mark is detected immediately after the timer has timed out, it is decided that there has occurred a timing error, causing a display to indicate an abnormality and requiring an inspection. However, to detect an error in this manner, a central control unit which controls the timing of various operations in the printer must be connected with a hardware time such as a time limit circuit or IC timer, resulting in an increased cost. In addition, an adjusting circuit is required which compensates for tolerances in the value of C and R components which are used to define a time limit, requiring an additional adjustment. In addition, the time limit may shift with temperature. This requires that the time limit be chosen to be longer than necessary, resulting in a coarse detection of the slip or abnormality.

SUMMARY OF THE INVENTION

It is an object of the invention to satisfy the described technical needs, by providing a printer which is compact, simple in construction and easy to maintain and which is capable of operating at a relatively high speed to produce recorded images with a high resolution and with a reduced running cost in a stable manner.

The above object of the invention is achieved by providing a printer comprising a record unit including a record in the form of an endless belt which rotates in one direction, a charger for uniformly charging the record, exposure means for irradiating the charged record with light information which corresponds to an image to be recorded to thereby form an electrostatic latent image, a developing unit including a developing roller which supplies a developer to the record to convert the latent image into a visual image, a paper feeder for delivering a record sheet, as separated one by one, from a stack thereof in order to bring it into close contact with the record on which the visual image is formed, a transfer unit for transferring the visual image onto the record sheet which is held in close contact with the record, a fixing unit for fixing the visual image on the record sheet, a sheet delivery unit for delivering the fixed record sheet out of the printer, a neutralizer for eliminating any residual charge on the record after the visual image has been transferred, a cleaning unit disposed for contact with the surface of the record after the transfer process for removing any residual developer from the surface thereof, drive means associated with various units including the record unit, and control means for controlling the operation of the various units including the drive means, the sheet feeder, the record unit, the transfer unit and the fixing unit being disposed so that a record sheet as delivered by the delivery unit moves through the printer along a path which is close to a straight line.

In the printer of the invention, the electrophotographic process is utilized to produce a recorded image of a high resolution, and the adoption of a visual image transfer technique permits a plain paper to be used as a record sheet, thus reducing the running cost. The record in the form of an endless belt permits the size of the printer to be reduced. A nearly linear path for the record sheet, inclusive of the record, facilitates the maintenance and minimizes the possibility of a jamming of the record sheet. The printer delivers a single record sheet for each record operation. Although the record sheet undergoes a variety of process steps, the path for the record sheet which is configured close to a straight line minimizes troubles such as jamming of the record sheet.

It is an object of the invention to provide an apparatus which permits a facilitated and reliable positioning of a record with respect to a variety of devices disposed therearound.

The positioning of the record with respect to a developing unit is achieved by providing a record unit including a record in the form of an endless belt and which is detachably supported by a developing unit. Both units can be combined into an integral unit which can be mounted on the body of the printer in a manner to permit their free withdrawal or insertion with respect to the body of the printer. In this manner, the relative positioning of the record with respect to the developing unit is facilitated in a reliable manner.

The integral unit which comprises both the record and the developing unit can be completely withdrawn out of the printer, or only the developing unit may be withdrawn out of the printer. In the latter instance, a movement of the record unit is also required, but a replenishment of developer to the developing unit can be performed without exposing the record to external light such as light emitted by a lamp which is used for indoor illumination, for example.

With respect to the relationship between the record, the exposure unit and the developing unit, the relative position is maintained by locating the exposure station to be opposite to a point on the record where a variation in the configuration and the speed of the record is minimized, and locating the developing unit in an area where a variation in the developing gap and the speed is minimized. A linear region where a fluctuation in the surface configuration of the record is minimized is obtained on the tensioned side of the record immediately before the curved region thereof which extends around the drive roller. Therefore, the exposure station is located in such linear region. A variation in the developing gap and a variation in the speed of the record are minimized in the curved region thereof where it extends around the drive roller. Accordingly, the developing unit is disposed in such curved region.

It is another object of the invention to provide means which permits the record to be maintained as close to zero as possible.

This object is achieved by disposing a brush which is maintained in contact with a region of the record where oscillation is minimized, namely, in a linear region on the tensioned side of the record which is close to the drive roller. While the oscillation of the record will be at its minimum in its curved region where it extends around the driver roller, the developing unit is disposed in such region, and therefore the brush is disposed adjacent thereto. The choice of such location allows the relative position between the record and the brush to be maintained constant.

It is a further object of the invention to provide means for detecting a movement of the record, in the form of an endless belt, in a direction perpendicular to the direction in which it normally runs.

This object is achieved by the provision of offset detection means including a contact piece which is disposed for contact with an edge of the record and engaged thereby whenever the record moves in a direction perpendicular to the direction in which it is normally driven, and a sensor producing a detectable output in response to a movement of the contact piece. The provision of such offset detection means enables a reliable detection of an offsetting of the record which is detachably mounted on the printer.

Alternatively, the detection means may comprise a light reflecting surface formed on at least one lateral edge of the record, with a combination of a light source and light receiving element disposed in opposing relationship with such reflecting surface so that light from the source which is reflected by the surface impinges upon the receiving element in order to detect an offsetting of the record in accordance with the amount of light incident thereon.

It is still another object of the invention to provide a simple apparatus, which reliably corrects for an offsetting of the record, the apparatus being arranged to permit a detachable mounting of the record.

This object is achieved by an apparatus including one of a plurality of rollers around which the record extends, and which one roller is disposed in a tiltable manner, the apparatus also including a control arm disposed so as to be engageable with or disengageable from the axial end of the one roller, and means for rocking the control arm. When the record offsets to one side, the axial end of the roller which is on the same side as the offset occurs may be raised, to cause the record to be intentionally offset in the opposite direction, thus correcting for an offsetting. It should be understood that such correction takes place in response to a signal from the offset detection means mentioned above. Since no member is used which abuts against the lateral edge of the record, no damage is caused to the record by such offset control.

It is a further object of the invention to provide a developing unit which is capable of removing toner remaining on a developing sleeve without contacting the latter, and stirring fresh and old toner together.

This object is achieved by providing an agitating member extending along a generatrix of a developing sleeve adjacent thereto and having a projection which is chevron-shaped circumferentially, and means for causing an axial reciprocately motion of the agitating member. This arrangement permits toner to be removed from the developing sleeve, without causing any damage thereof, and to be axially conveyed. A sufficient stirring action of both fresh and old toner is assured to allow an image of high quality to be produced in a stable manner.

It is yet another object of the invention to provide a developing unit which is effective to prevent a so-called "white streaking" which is caused by the absence of toner on part of the developing sleeve.

This object is achieved by providing means which establishes a distribution of a magnetic field across an area of the peripheral surface of the developing sleeve on which a magnetic brush is formed. The area extends along a generatrix of the sleeve between a location where developer or toner is supplied onto the sleeve or a location where the thickness of developer or toner is controlled and a location where the developer is effective to develop a latent image. As a result of the magnetic field, no developer is present in such area. With this arrangement, when a doctor blade which controls the height of a magnetic brush is closely spaced from the developing sleeve and the space therebetween is plugged with foreign matter, a magnetic brush will not exist on the sleeve surface between such region and "the area where the developer is absent". However, as the brush rotates, a magnetic brush will be formed between the developing location and "the area where the developer is absent", thus avoiding the occurrence of so-called white streaking.

In other words, a magnetic brush is formed on the sleeve surface with the area where the developer is absent interposed therein. A portion of the magnetic brush which is located upstream of the area as viewed in the direction of movement of the magnetic brush will be become collapsed when passing over the area, but will be formed again downstream of the area.

It is yet further object of the invention to provide a sheet feeder which permits a replenishment of record sheets in a simple manner.

This object is achieved by providing a sheet feeder which is constructed so that when a top cover of a tray containing a stack of record sheets is opened, a bottom plate is automatically depressed to permit a replenishment of record sheets into the tray, and in which as the top cover is closed, the bottom plate is automatically raised to enable a sheet feed operation.

With this sheet feeder, a replenishment of record sheets can be made through a simple operation of opening and closing the top cover of the tray while leaving the tray as mounted within the printer. There is no need to provide any member which is mounted on the printer for lowering or raising the bottom plate, thus resulting in a simplified construction.

It is an additional object of the invention to provide a sheet feeder which prevents the leading end of any record sheet to be left between a feed roller and a friction pad during the replenishment of record sheets.

This object is achieved by the provision of a reset lever which rocks in interlocked relationship with the downward movement of the bottom plate as it is lowered prior to the replenishment of record sheets, the rocking motion of the lever being effective to urge any record sheet which is interposed between the feed roller and the friction pad to be driven back into the tray.

With this arrangement, any record sheet which is interposed between the feed roller and the friction pad is positively returned into the tray, so that the leading end of a record sheet or sheets which are replenished can be aligned with the leading end of the record sheets already contained in the tray, allowing an uppermost sheet to be fed in the subsequent feed operation.

It is another object of the invention to provide means for detecting whether a record sheet is present within the tray and for detecting whether a record sheet in the tray is urged against the feed roller and thus is ready to be fed.

This object is achieved by providing a single sensor which detects the presence or absence of a record sheet and which detects whether the bottom plate urges the record sheet against the feed roller to enable a normal feed operation. The use of the single sensor for both detections simplifies the arrangement.

It is a further object of the invention to provide a mechanism which is capable of protecting the sheet feeder from contamination by developer.

This object is achieved by providing a guide cover disposed above the sheet feeder and having a sufficient breadth to cover the record, a conveying path therefor as well as the feed roller and the friction pad.

The guide cover protects the path of the record sheet, the feed roller and the friction pad from contamination or falling or suspended developer. The guide cover can be detachably mounted on the printer so that it be removed for maintenance and inspection purpose of the printer.

It is still another object of the invention to provide a fixing unit including a separation claw which can be removed from a fixing roller to prevent the claw from damaging the roller, without using any special components therefor.

This object is achieved by utilizing a delivery roller which is used to deliver a fixed record sheet out of the printer and having a peripheral speed which is greater than the peripheral speed of a fixing roller used in the fixing unit so that a tension is maintained in the record sheet when the latter is held in taut condition between the rollers, the tension being used as a drive to cause the separation claw to rock away from the peripheral surface of the fixing roller, by acting through a projection which extends into the conveying path for the record sheet.

With this fixing unit, the tension in the record sheet which is maintained in taut condition is utilized as a drive, thus enabling any damage to the peripheral surface of the fixing roller by the separation claw to be prevented from occurring in spite of a simple arrangement. Since the separation claw is not maintained in contact with the peripheral surface of the fixing roller, the deposition of toner on the free end of the claw is minimized, permitting the proper functioning of the separation claw to be maintained over a prolonged period of time. This means that a fixing unit of high reliability can be provided by eliminating the occurrence of a jamming.

It is still another object of the invention to provide a cleaning unit for the record which is simple in construction and efficient in operation.

This object is achieved by the provision of a unit including a cleaning roller capable of producing a magnetic field on its surface which is effective to remove any remaining magnetic toner from the surface of the record, and a magnetizable member disposed opposite to the cleaning roller with the record interposed therebetween, at least one of the cleaning roller or the magnetizable member being substantially free to move, whereby the record is held between the cleaning roller and the member under the influence of the magnetic force from the cleaning roller. This permits a uniform contact to be achieved between the surface of the record and the cleaning roller, assuring a satisfactory cleaning operation.

It is a still further object of the invention to provide a cleaning unit associated with the fixing unit which is capable of an efficient cleaning operation by utilizing the entire surface of the cleaning pad of the fixing unit.

This object is achieved by utilizing the cleaning pad which bears against the peripheral surface, on the advanced side, of the fixing roller which is disposed in abutment against a toner image. A portion of the pad which is located downstream of the center thereof is secured in abutment against a portion of the fixing roller which is located downwardly of the center thereof. In this manner, the pad bears against the fixing roller with a force which gradually decreases as the point of abutment moves upward, thus assuring an efficient cleaning operation over the entire surface of the pad.

It is yet another object of the invention to provide a sheet inversion apparatus which is easy to operate.

To achieve this object, the invention provides an apparatus including a delivery port, a delivery roller disposed adjacent to the delivery port, and a guide member disposed between a portion of the printer where a record sheet having its toner image fixed is discharged and the delivery roller for guiding and inverting the record sheet. The apparatus is detachably mounted above the discharge portion of the printer, and is also supported in a rotatable manner to leave the space above the discharge portion open.

Since the sheet inversion apparatus is detachably mounted on the printer, a free choice is allowed to cause the record sheet to be delivered in its normal position or in its inverted position. In the event a jamming occurs or a repair is required in the discharge portion of the printer, the apparatus can be angularly moved to leave the discharge portion open, thus simplifying the required operation.

It is yet further object of the invention to stop the motion of a record in the form of an endless belt having a joint therein, at a location where no harm is expected.

This object is achieved by providing detecting means which detects the position of the record, a mark formed on the record, and means for driving the record, the arrangement being such that the record is stopped when a non-record area thereof is located within an effective discharge area of the charger.

The described arrangement alleviates any adverse influence of the corona discharger upon a record region of the record, since the non-record region is disposed within the effective discharge area of the corona discharger when the region comes to a stop. The actual stop position of the record can be chosen in consideration of the strength and the configuration of the non-record area, and this also reduces the time required to start the printing operation.

It is an additional object of the invention to provide an arrangement for supporting a record in the form of an endless belt which accommodates for the generation of static electricity produced by a friction occurring between the record and a support member therefor and which facilitates the removal or mounting of a record unit as well as its associated support member while assuring a reliable positioning of the record.

This object is achieved by providing an arrangement for supporting a record unit and including a first member having a control surface which positions one lateral side of a support member associated with a record, and a second member formed of a resilient material and disposed for resilient abutment against the other side of the support member to urge the record unit toward the first member, at least one of the first and the second member being electrically conductive.

With the supporting arrangement of the invention, the second member maintains the record unit urged toward the first member, whereby the record unit is positively maintained in position. The resilience of the second member is utilized to remove or insert the record unit, thus greatly facilitating such operation. As a result of the first and the second member which are maintained in contact with the record unit, the triboelectricity produced between the record and the associated support member can be positively passed to the ground. Accordingly, any attraction acting between the record and the support member which results from the accumulation of the triboelectricity as well as the resulting difficulties, including an increased driving load presented by the record and a non-uniform conveying speed of the record which results from a slip occurring between the record and drive roller, can be avoided.

It is another object of the invention to provide a safety unit for the printer which can be simply controlled.

This object is achieved by a safety device comprising first means for detecting the absence of a record sheet in a sheet feeder, second means for providing a signal indicative of the fact that the sheet feeder is going to feed a record sheet, the signal being produced when the first means does not detect the absence of a record sheet, third means for detecting the presence or absence of a record sheet at a point downstream within a feed drive system, fourth means for detecting the presence or absence of a record sheet at a point downstream of the third means, fifth means for producing a feed success signal and a feed failure signal when the third means detects the presence and the absence, respectively, of a record sheet after the second means has produced a signal indicative of the absence of a record sheet and for producing a feed success signal irrespective of an output from the third means whenever the second means fails to produce the signal, and sixth means for producing no jamming signal and a jamming signal, respectively, when the fourth means detects the presence and the absence, respectively, of a record sheet after the third means has detected the presence of a record sheet and for producing no jamming signal irrespective of an output from the fourth means whenever the third means has detected the absence of a record sheet, the safety unit sampling outputs from the first, the fifth and the sixth means at given timings during the printing operation and independently from the outputs from the first, the fifth and the sixth means, thereby executing safe guard procedure in accordance with the outputs from these means.

In accordance with the invention, the control can be simplified since the outputs from the various detecting means are sampled at given timings. The occurrence of a sheet exhaustion or a feed mistake does not require a disabling of subsequent detecting operations, thus simplifying the control. The fifth and the sixth means may be combined into a single flipflop within a memory, so that the content of the flipflop can be utilized to detect a feed mistake or jamming, thus simplifying the circuit arrangement.

It is a further object of the invention to provide a temperature detection circuit capable of detecting an abnormality occurring in a heater power system in a simple manner at an early point in time, to provide a temperature detection circuit capable of detecting the breakage of a thermistor and an abnormality in a heater power system in a simple manner at an early point in time, and to provide a temperature detection circuit capable of detecting the breakage of a thermistor and an abnormality in a heater power system at an equal signal level on a single line.

To achieve this object, in accordance with the invention, a temperature responsive element such as a thermal fuse or thermal switch which becomes electrically open at or above a given temperature and at least one resistor are connected in series with a thermistor across a pair of terminals, across which a constant voltage is applied. Both the thermistor and the temperature responsive element are disposed in a region adjacent to the heater of the fixing unit where a temperature is to be detected. One end of the thermistor is connected to a terminal where a temperature is detected while the junction between the series combination of the thermistor and the temperature responsive element and the resistor is connected to a terminal where an abnormality is to be detected. The terminal connected to the junction assumes one of the potentials of the constant voltage terminals upon breakage of the thermistor and/or when the temperature responsive element becomes open, indicating an abnormally high temperature of the heater.

The temperature detection circuit of the invention permits both the breakage of the thermistor and an overheating of the heater, which is attributable to an abnormality occurring in the heater power loop, the temperature detection circuit or an associated control system, to be detected on a single line and at an equal level indicative of an abnormality. This eliminates the need for the provision of complex abnormality decision flow charts involving a counting of the time passed since the turn-on of the heater power and the comparison of the temperatures detected by the thermistor.

It is still another object of the invention to cut off the power supply after a given procedure has been completed within the printer, to cut off the power supply after a region of the record where an image is to be formed has moved away from the region of the charger, and to maintain the various parts of the printer under desired conditions during the OFF interval of the power supply.

To achieve this object, in accordance with the invention, a power supply connection unit is interposed between a commercial a.c. source and a receiving end including a d.c. power supply for the printer. Power turn-on means is provided to enable the receiving end to be fed from the a.c. source. When the power turn-on means assumes an on-condition, the connection unit assumes a "connected" condition. Conversely, when the power turn-on means assumes an off-condition, the connection unit assumes a "disconnected" condition after a given procedure has been completed within the printer. When the printer of the invention employs a record having sensitivity to ozone, the "disconnected" condition of the connection unit is established when the record is positioned such that its non-record area is disposed immediately below the charger when the power turn-on means is turned off.

Thus, in the event the power turn-on means is turned off in the course of the printing operation, the connection unit does not assume a disconnected condition until the given procedure is completed, whereby there is no record sheet which remains within the printer without being delivered or there occurs no incomplete cleaning operation to cause a degradation in the quality of the copy. Since the region of the record where an image is to be formed is driven out of the region of the charger, a degradation in the quality of the record is prevented.

It is yet another object of the invention to provide a printer which assures the generation of an accurate sync signal in the presence of a flaw or dust on a record in the form of an endless belt.

At this end, in the printer of the invention, a mark is formed on the record in a non-record region thereof adjacent to a lateral edge thereof so as to be detected to provide a sync signal to assure that image information is properly supplied to a region of the record where an image is to be formed. A detector is provided for detecting the mark. The printer also includes means for determining at least once, the presence or absence of an output signal from the detector within a time interval greater than an interval corresponding to a regular time interval between successive sync signals in response to the occurrence of an output signal from the detector to thereby assure the proper production of the sync signal, and means responsive to the detection of the proper sync signal by nullifying or invalidating any output signal from the detector which may occur before time when the next sync signal is expected to be detected. In this manner, the sync signal which properly corresponds to the mark on the record is reliably detected, assuring a satisfactory printing operation.

It is yet further object of the invention to prevent a variation in the relative timing between the detection of the sync mark and the occurrence of a timing pulse as the count of timing pulses is reset.

At this end, in accordance with the invention, a count of timing pulses $C_T$ which prevails at the time the mark is detected is compared against a standard value Q, and deviation therebetween $C_T$—Q is chosen as an initial count. For example, if the count $C_T$ at the time of detecting the mark is given by $C_T$=Q−1, it is then determined that there has occurred a timing pulse immediately after the detection of the mark during the previous initialization or that the processing during the previous cycle has been advanced by one timing pulse relative to the position of the record. Accordingly, the initial count is now preset to −1, thus delaying the processing of the current cycle by one timing pulse relative to the position of the record as compared with the previous cycle. Conversely, if the count is given by $C_T$=Q+1 at the time when the mark is detected, it is determined that a timing pulse has appeared immediately before the detection of the mark during the previous initialization or that the processing during the previous cycle has been lagging by one timing pulse relative to the position of the record. Accordingly, the initial count during the current cycle is preset to +1, thus advancing the timing of the processing by one timing pulse in comparison to the processing during the previous cycle. If $C_T$=Q, it is determined that the timing of the processing correctly corresponds to the position of the record, and an initial count of 0 is chosen.

It is a corollary object of the invention to allow a timing error to be detected in a low cost arrangement and in a reliable manner without employing any analog time limit circuit or elements.

At this end, in accordance with the invention, a count of timing pulses which are developed since the detection of a mark is noted, and a timing error is detected if the count exceeds a given value which is slightly greater than the normal number of pulses between adjacent detections of the mark. In this manner, a central control unit which controls the timing of the processing within the printer detects an error by a digital processing. This removes the need for the provision of an external timer, allowing an error to be detected in a manner substantially free from the influence of tolerances of C and R components or temperature fluctuations.

BRIEF DESCRIPTION OF THE DRAWINGS

FIG. 5 is an exploded, side elevation of a record unit and a developing unit, which form together a record/developing unit.

DESCRIPTION OF EMBODIMENT

Figure 1:
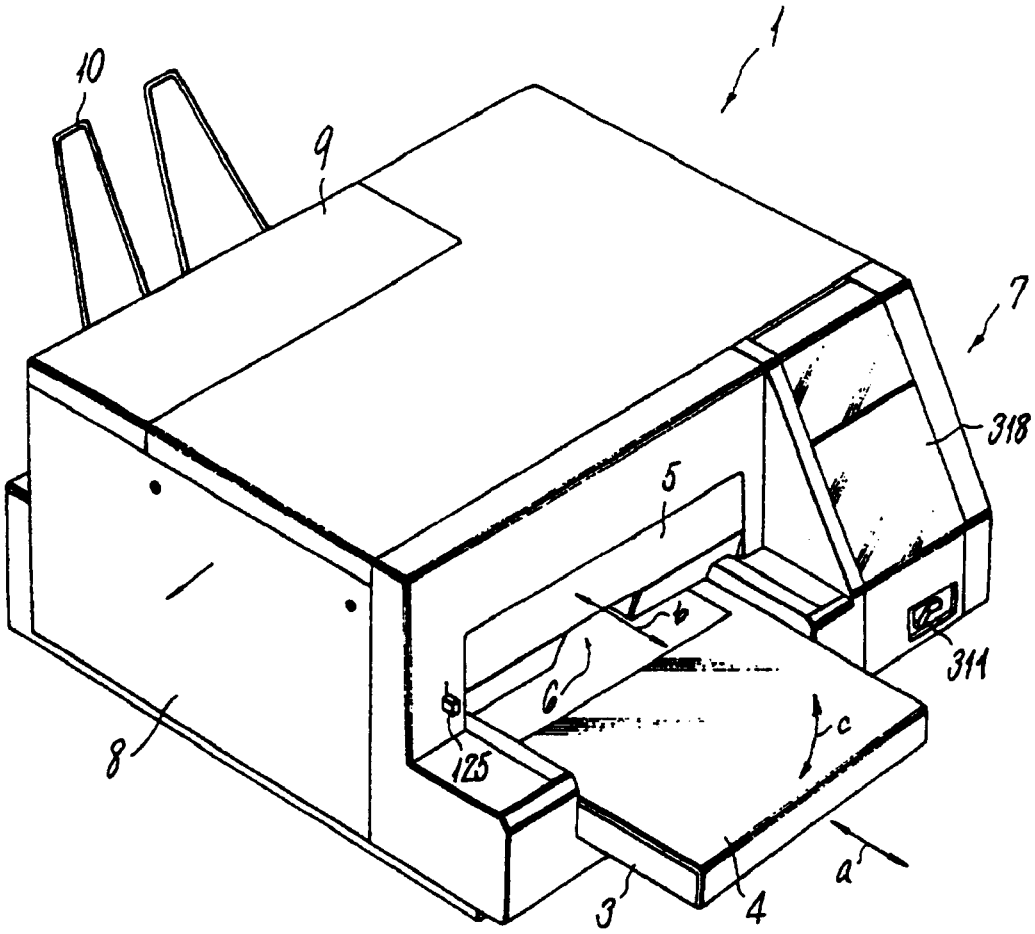
FIG. 1 is a perspective view of a printer according to one embodiment of the invention, principally illustrating its appearance.

FIG. 1 shows the appearance of a printer 1 according to the invention. On its front, the printer 1 is provided with a power switch 311. A tray 3 of record sheets is detachably mounted in the front side of the printer 1 so as to be movable in a direction indicated by an arrow a. The tray 3 is associated with a lid 4 which can be swung in a direction indicated by an arrow c while the tray is mounted on the printer. A record/developing unit 5, the detail of which will be described later, is mounted in the front side of the printer and is movable in a direction indicated by an arrow b. A given length of the unit can be drawn out of the printer or the unit can be completely withdrawn out of the printer. In FIG. 1, the unit is fully inserted into the printer. As shown, the unit 5 is formed with a recess 6 which provides a hand grip. A transparent cover 7 is disposed on a part of the front side of the printer 1 and covers a pause button, reset button and display lights (not shown), all of which are disposed therebelow. One side plate 8 and part of a top cover 9 of the printer can be removed from the rest of the printer. On its rear side, the printer is provided with an abutment 10 for a record sheet which is delivered out of the printer.

It is to be noted that the printer of the invention is based on the electrophotography while utilizing a dry developing process and the transfer of a visual image. Its internal construction will be briefly described with reference to FIG. 2. A record 11 in the form of an endless belt extends around a pair of belt rollers 12, 13, which are located substantially centrally within the printer 1. The roller 12 represents a follower roller while the roller 13 represents a drive roller and is driven for rotation in a direction indicated by an arrow, by a drive system to be described later. The record 11 represents an electrophoto photosensitive mebber formed by a film base carrying an organic or inorganic photoconductor thereon.

A variety of devices or units are disposed around the record 11, and include a charger 14, an exposure unit 15, a developing unit 16, a sheet feed roller 17, a pair of conveying rollers 18, a transfer charger 19, a fixing unit 20, a neutralizer 21 and a cleaning unit 22, all disposed in sequence as viewed in the clockwise direction of rotation of the record 11.

Briefly describing the operation of the printer, the surface of the record 11 is initially charged uniformly to a given polarity by the charger 14, and light containing image information to be recorded is directed thereon from the exposure unit 15. The charge on the record 11 is then selectively removed, forming an electrostatic latent image which conforms to an image to be recorded. The latent image is converted into a toner image by a developer supplied from the developing unit 16 and comprising a colored fine particle, usually called toner. A record sheet 24 is supplied from the tray 3 through the feed roller 17 and the pair of coverying roller 18 in synchronism with the formation of the image on the record 11 so as to be brought into superimposed relationship with the toner image at the location of the transfer charger 19, which is then activated to produce a charging effect, thus transferring the toner image onto the record sheet 24. Subsequently, the record paper 24 is separated from the record 11 to be carried into the fixing unit 20 where the transferred toner image is fixed and the sheet is delivered to the abutment 10 by a pair of delivery rollers 25. On the other hand, any residual potential on the surface of the record 11 is eliminated by the neutralizer 21, and any residual toner is removed by the cleaning unit 22.

The individual devices or units used in the printer will be morespecifically described below.

Record Unit

It is to be noted that it is a feature of the printer that the record 11 and the developing unit 16 are separately constructed as unitary constructions. Specifically, referring to FIG. 5, it will be seen that a record unit 23 comprises the record 11, the rollers 12, 13 which support and drive the record, and a pair of support plates 26 which rotatably support the opposite end of both rollers.

Figure 4:
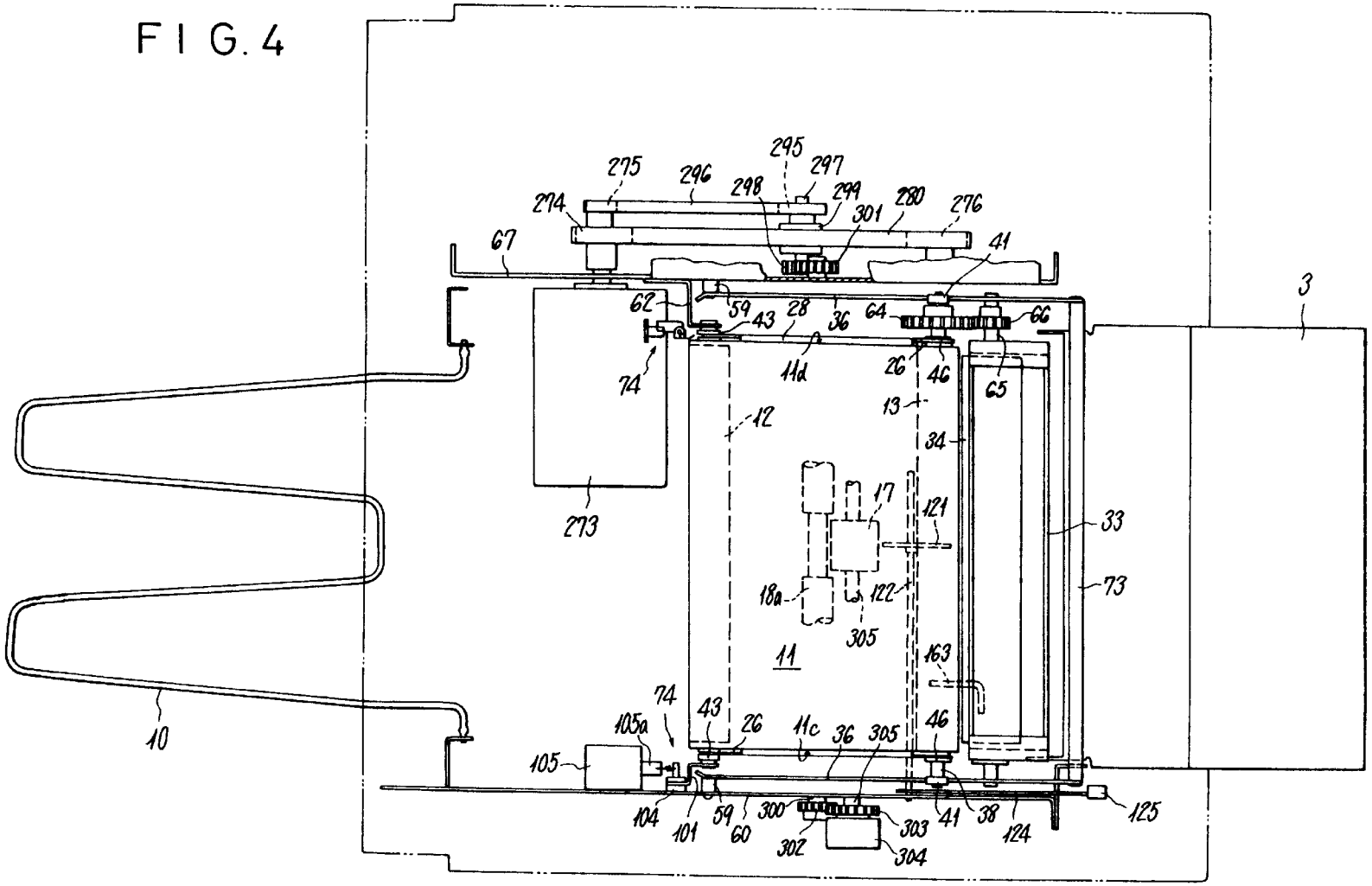
FIG. 4 is a schematic top view of the drive system.
Figure 8:
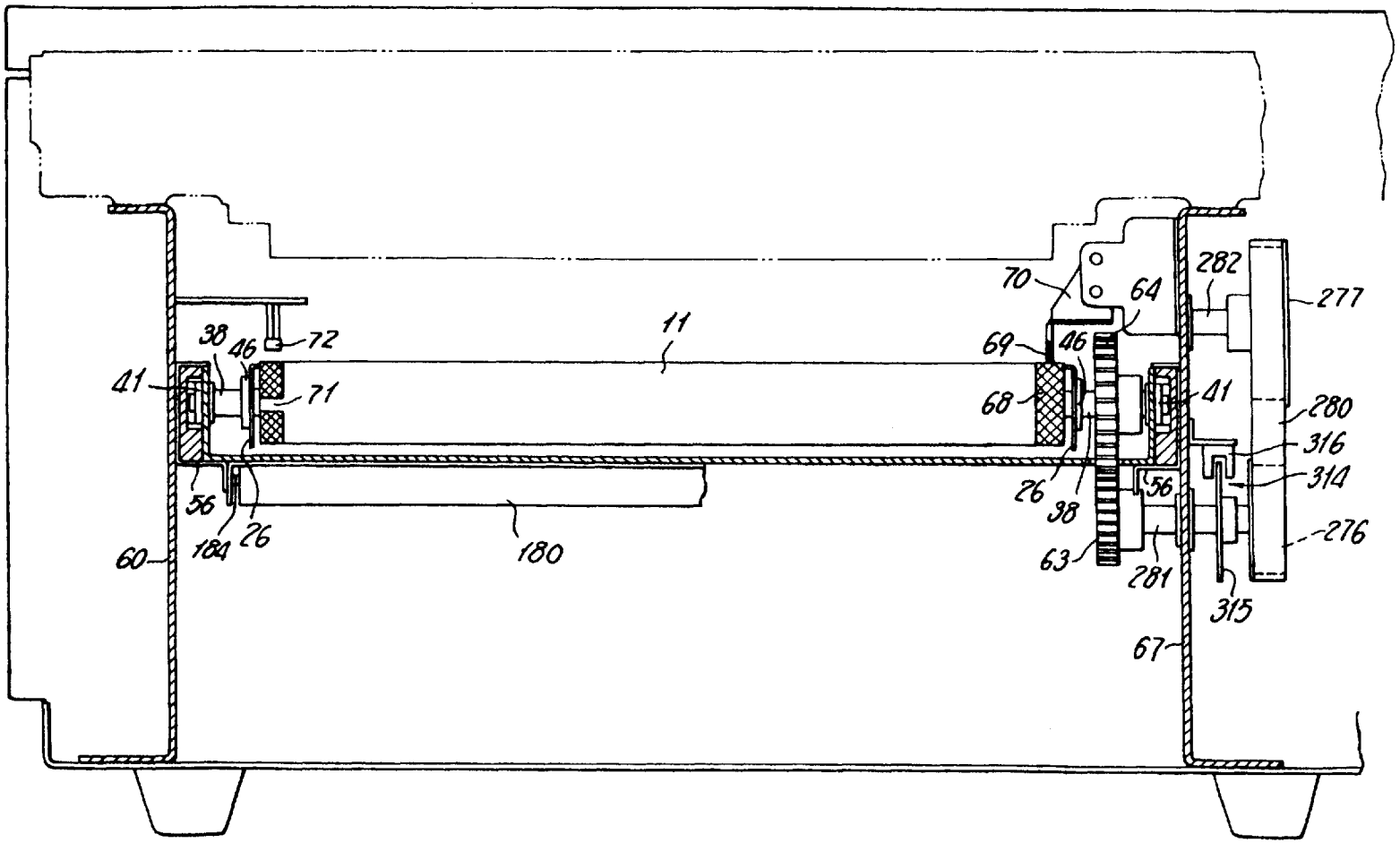
FIG. 8 is a front view of the record unit as mounted in place within the printer.
Figure 12:
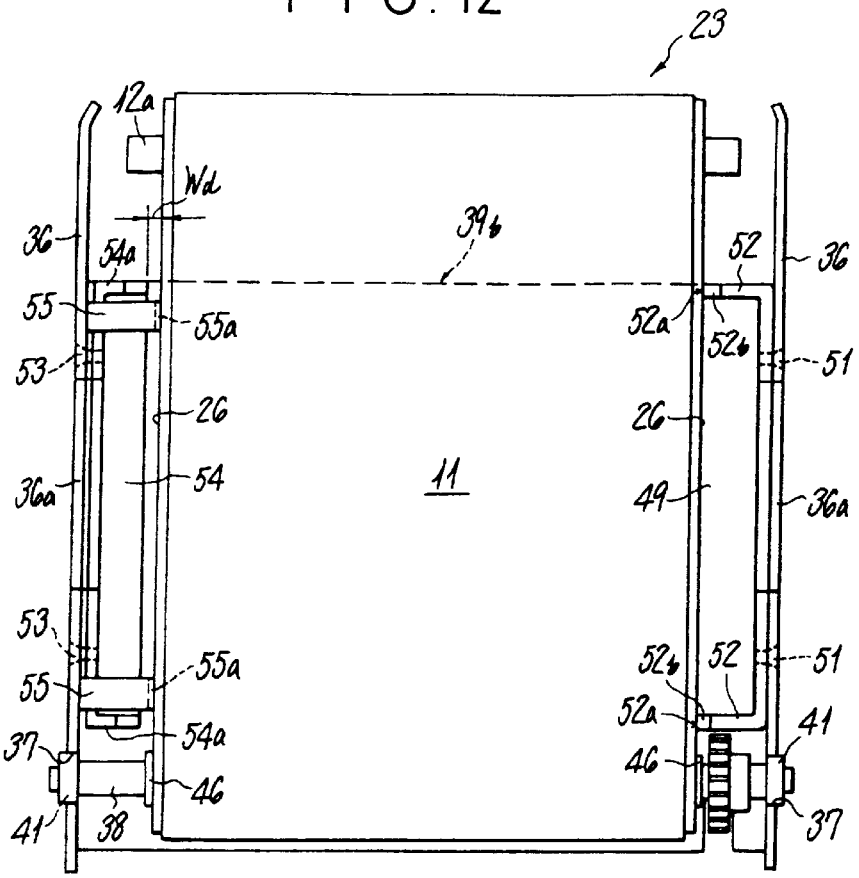
FIG. 12 is a top view of the mechanism.

As shown in FIGS. 4, 8 and 12, the drive roller 13 is fitted over a shaft 38 which is in turn rotatably carried by one end of the support plates 26 through bearings 46 interposed therebetween. The record 11 in the form of an endless belt extends around the drive roller 13, which is located at a fixed position and mounted for rotation, and the follower roller 12, which will be further described later.

Figure 78:
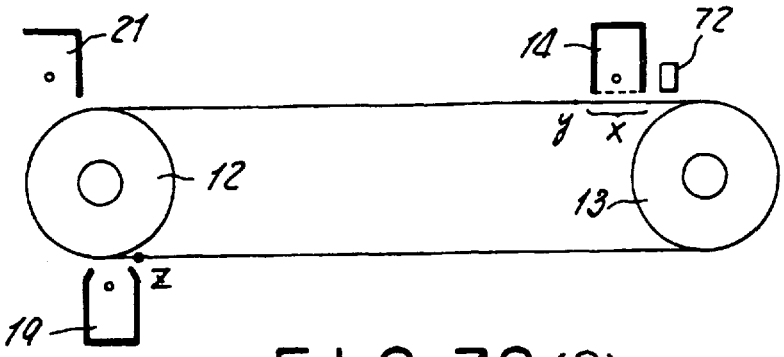
FIGS. 78(1) and 78(2) indicate the position where the record stops when the power supply is disconnected and when a print operation is enabled.
Figure 78:
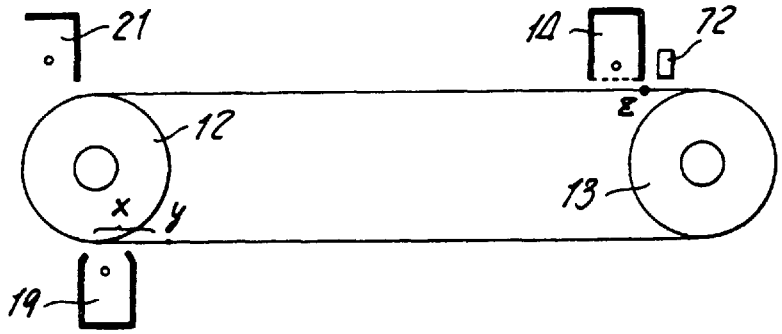

The record 11 has a length which is slightly longer than the record sheet, and is positioned so that a juncture or joint x therein is disposed above the transfer charger 19 whenever a main switch, to be described later, is turned on, as shown in FIG. 78 (2). When the main switch is turned off, the juncture x in the record 11 is disposed below the charger 14, as shown in FIG. 78 (1). Such position control of the record 11 will be further described later.

Figure 6:
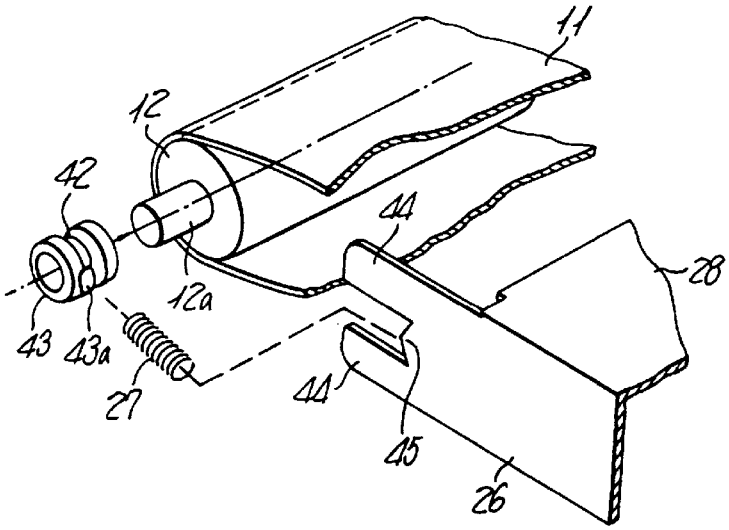
FIG. 6 is a fragmentary perspective view of one form of means which maintains a tension in the record.

The follower roller 12 is urged otward by means of springs 27 disposed in the support plate 26, thus tensioning the record 11. FIG. 6 shows one form of record tensioning mechanism. Specifically, the follower roller 12 carries a shaft 12a, over which a bearing 43 having a circumferential groove 42 is fitted. The outer priphery of the bearing 43 is formed with an abutment 43a, which receives one end of the spring 27. The support plate 26 is formed with a pair of limbs 44 which are received in the groove 42 formed around the bearing 43, and a spring anchorage 45 of a triangular form which projects into the space between the limbs. After fitting the bearing 43 over the shaft 12a, the follower roller 12 is mounted on the support plates 26 while the groove 42 in the bearings are guided by the limbs 44. The spring 27 is fitted between the abutment 43a and the anchorage 45. Consequently a tension F is maintained in the record 11 to achieve a good planer relationship thereof as a result of the follower roller being urged by the springs 27, as shown in FIG. 5.

Figure 15:
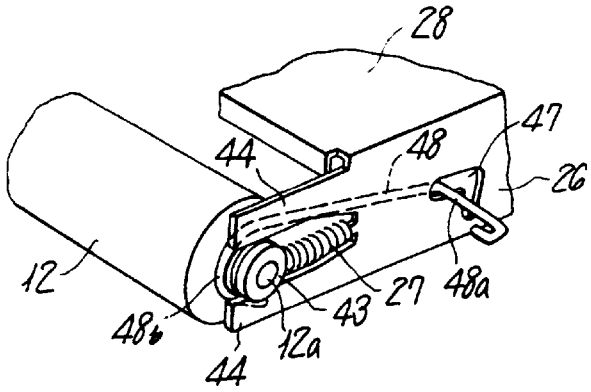
FIG. 15 is a perspective view of one form of record tension release mechanism.
Figure 16:
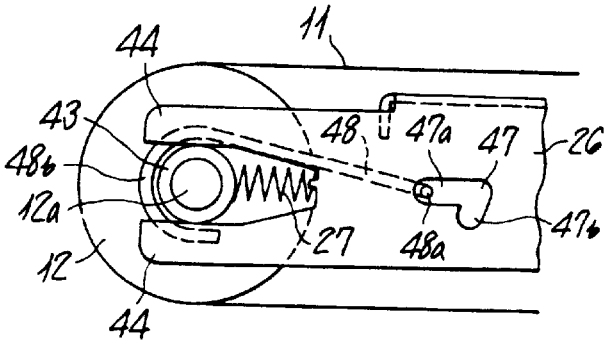
FIG. 16 is a side elevation of the release mechanism.

Specifically referring to FIGS. 15 and 16, the support plate 26 is formed with a lever guide slot 47 having an inverted L-shape. The slot 47 includes a portion 47a extending in a direction parallel to the direction in which the tension is applied to the record 11, and a detent portion 47b which intersects with the portion 47a at an angle which is less than the right angle. Fitted into the slot 47 is a folded end 48 of a release lever 48 which projects out of the support plate 26, while the other end 48b of the release lever 48 has a curved configuration so as to surround the periphery of the bearing 43 which is fitted over the shaft 12a of the follower roller 12.

Figure 17:
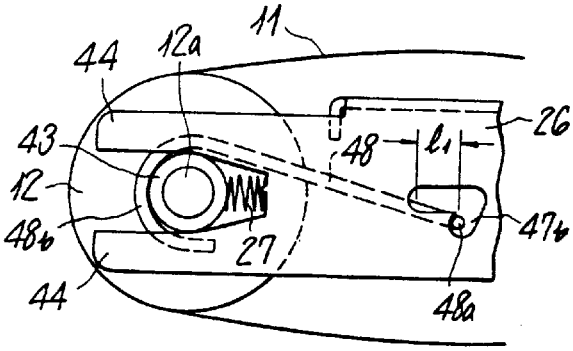
FIG. 17 illustrates the operation of the mechanism shown in FIG. 16.
Figure 18:
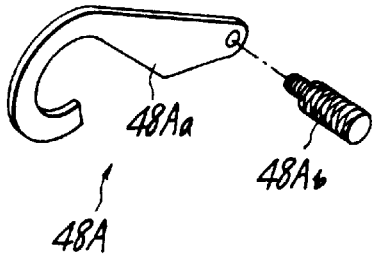
FIG. 18 is a perspective view of another form of release lever.

When the end 48a of the release lever is located within the portion 47a of the slot 47 as shown in FIG. 16, the other end 48b of the lever does not interfere with tensioning action upon the record 11 provided by the springs 27. However, when the tension in the record is to be released as when replacing the record, the end 48a is forcibly moved along the portion 47a and into the detent potion 47b so as to forcibly compress the spring 27. At this time, the other end 48b of the release lever 48 causes the bearing 43 to move to the right, as viewed in FIGS. 15 and 16, whereby the separation between the follower roller 12 and the drive roller 13 (not shown) is reduced by an amount corresponding to the length $l_1$ of the portion 47a, thus releasing the tension in the record 11. Consequently, the record 11 assumes a relaxed condition as indicated in FIG. 17, and can be easily removed from the belt rollers for replacement. After the replacement, the lever 18 is returned to the position shown in FIG. 16, whereupon the tension is again maintained in the record 11 by the spring 27 The release lever 48 shown in FIG. 15 is formed by folding a round rod of a small diameter, but it can be replaced by a release lever 48A shown in FIG. 18 which comprises a lever portion 48Aa formed of a sheet metal and a detent pin 48Ab formed by a rod. Returning to FIGS. 5 and 7, it will be seen that an oblong slot 26a is formed substantially centrally in the support plate 26 for allowing an engagement of a finger of an operator therewith when displacing the release lever 48 and when assembling the record/developing unit 5 (see FIG. 7) by mating the record unit 23 with a receiver 35.

Figure 2:
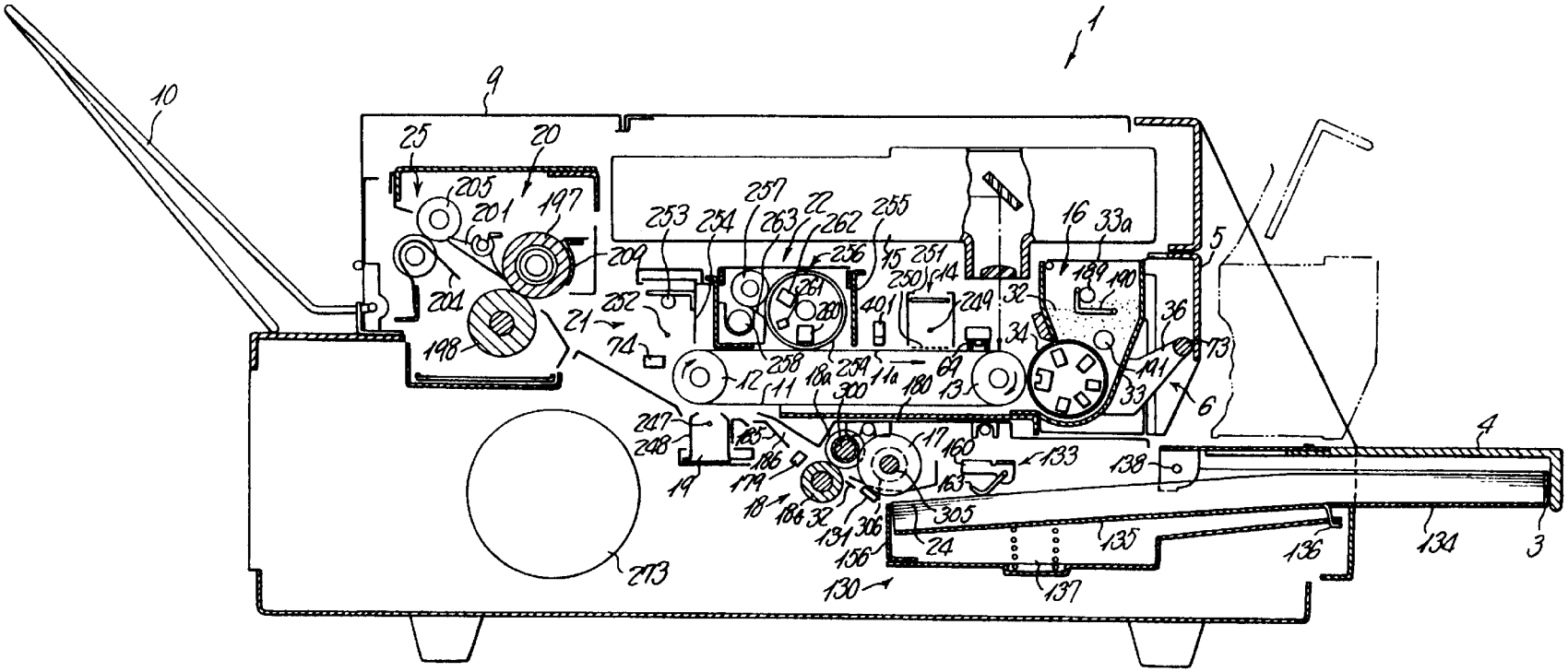
FIG. 2 is a schematic side elevation, illustrating the internal structure of the printer.

As shown in FIG. 5, a top plate 28 extends across the support plate 26 to provide a support for the upper run 11a of the record 11. The bottom of the support plate 26 is formed with a pair of projections 29, 30 which extend below the lower surface of the lower run 11b of the record 11. A developing unit 31 comprises a vessel 33 having a lid 33a, and containing a supply of developing toner 32, and a developing sleeve 34 which is disposed in the bottom of the vessel 33 for rotation. Both the side plates and the bottom plate of the developing vessel 33 extend in the horizontal direction from the region where the sleeve 34 is received, thereby forming the receiver *or frame* 35 which supports the record unit 23 *and has a rib 35a that can facilitate grasping by hand*. The receiver 35 includes a pair of side plates 36, in which a groove 37 is formed adjacent to the sleeve 34 and extend in a direction perpendicular to the length of the receiver. The shaft 38 which carries the driver roller 13 of the record unit 23 is received in the groove 37, thus positioning the record 11 with respect to the developing sleeve 34. It will be seen that the record unit 23 is merely placed on top of the bottom plate 39 of the receiver 35, with the shaft 38 being received in the groove 37, and hence is freely movable in the [vettical] *vertical* direction even though its movement in the lateral direction is constrained. When the record unit 23 is placed on top of the bottom plate 39, only the bottom projections 29, 30 extending from the support plates 26 of the record unit 23 bear against the bottom plate 39, thus avoiding any damaging effect upon the record 11. In its free end, the receiver 35 is formed with a horizontal groove 40, which serves positioning the developing unit 31 on the body of the printer. As shown in FIGS. 2 and 4, the rear ends of the side plates 36 are interconnected by a stay 73 for strengthening purpose.

Figure 7:
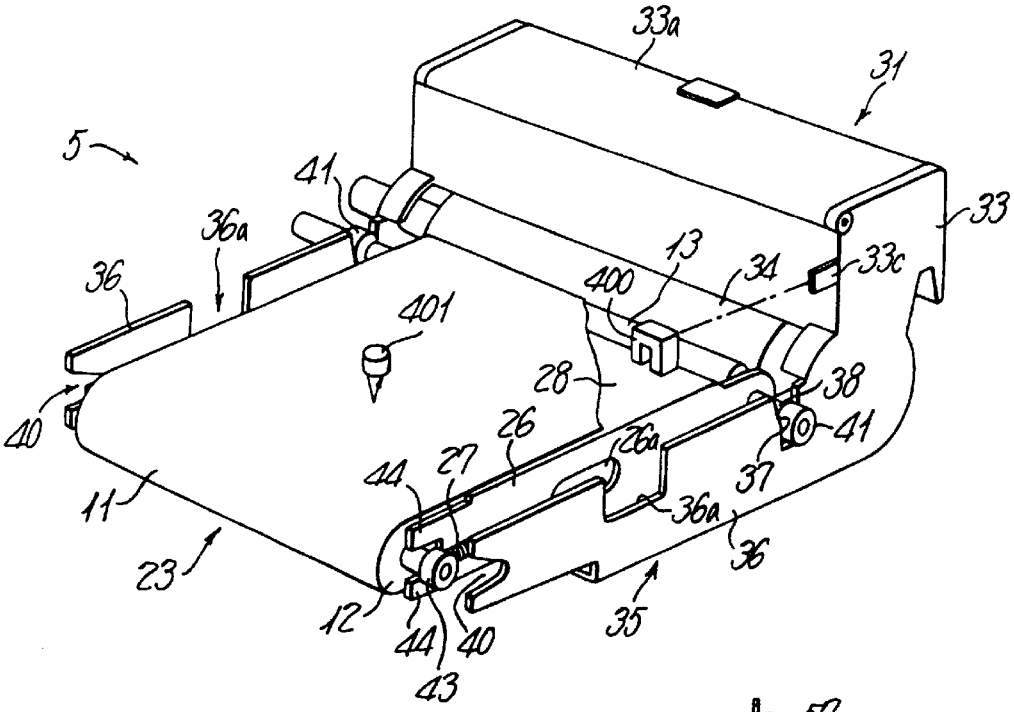
FIG. 7 is a perspective view of the record/developing unit illustrating the record unit and the developing unit as positioned relative to the direction of movement of the record.

FIG. 7 shows the record unit 23 and the developing unit 31 assembled together. In FIG. 7, it will be seen that the bearing 41 is shown as mounted on the shaft 38 of the drive roller 13 and engages the groove 37 formed in the receiver 35 of the developing unit 31. It will be understood that the use of such bearings is conventional and is available anywhere in the arrangement.

When placing the record unit 23 on the receiver 35, a touch of a finger of an operator with the surface of the record will modify the photosensitive response of the record in the region where the finger is touched. Hence, the unit 23 must be carried by fingers which are inserted into the slots 26a. To permit such mounting, notches 36a are formed in the side plates 36 to provide relieved areas for the fingers.

Figure 11:
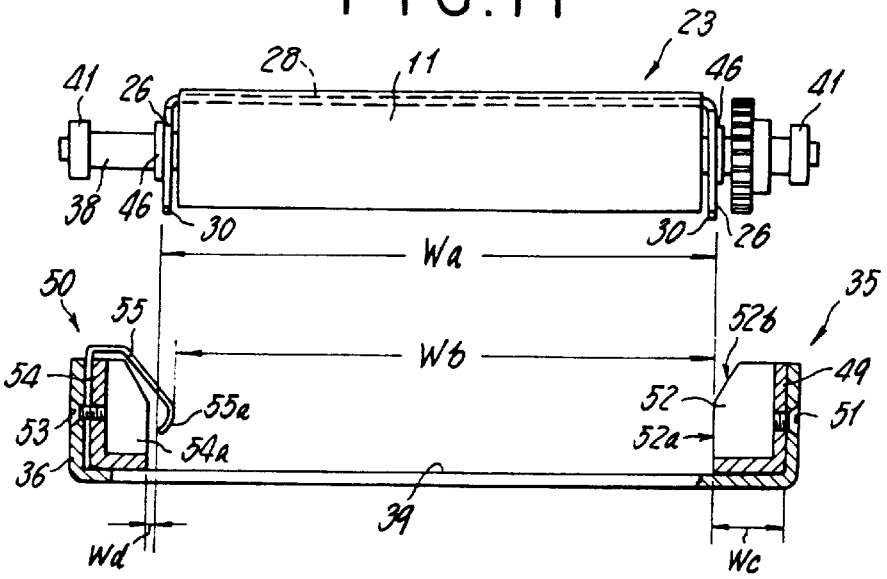
FIG. 11 is a front view of a mechanism for positioning the record unit in the direction of the width of the record.
Figure 19:
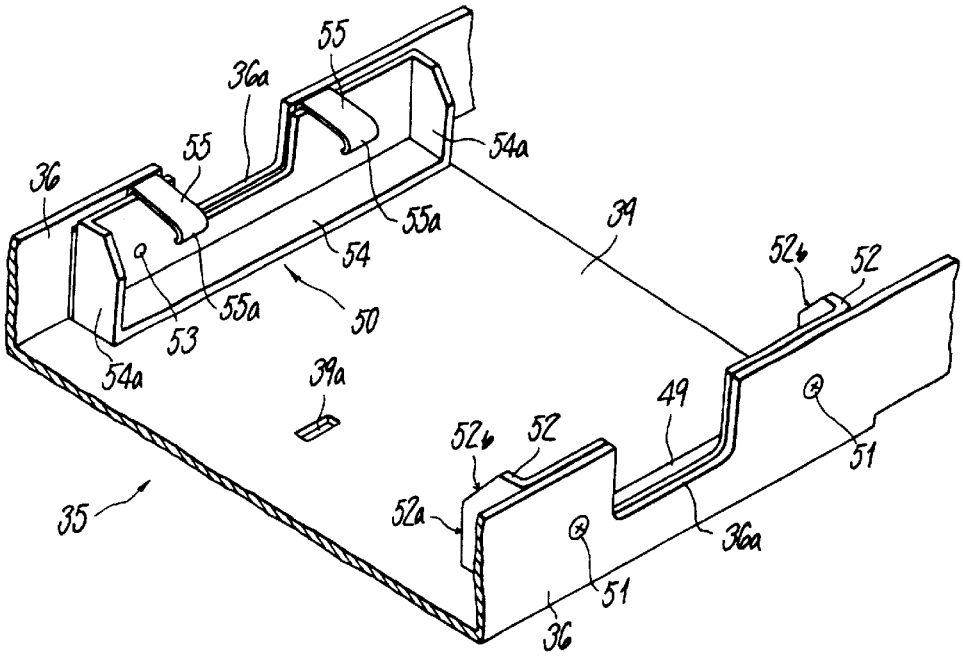
FIG. 19 is a fragmentary perspective view of a receiver which is provided with means for positioning the record unit.

Referring to FIGS. 11, 12 and 19, the side plates 36 of the receiver 35 are provided with a first member 49 and a second member 50, respectively. The first member 49 is secured to the side plate 36 by set screws 51, and is L-shaped in section as indicated in FIG. 19 and carries a pair of spacers 52 having a control surface 52a on its opposite ends. The upper end portion of the control surface is bevelled to provide a guide surface 52b which is utilized when mounting the record unit 23.

In the example shown, the second member 50 is similarly shaped as the first member 49, and is secured to the other side plate 36 by set screws 53. It comprises a guide member 54 carrying a pair of guides 54a on its opposite ends which are located opposite to the spacers 52, and a resilient member 55 which is clamped together with the guide member 54 to the other side plate 36. In the arrangement shown, a pair of resilient members 55 are provided. At least the resilient member 55 is formed of an electrically conductive material for electrical contact with the receiver 35, which is in turn connected to the electrical ground of the printer through a leader 56 (see FIG. 9). In the example shown, the resilient member 55 comprises a metal leaf spring, but may also be formed by a coiled metal spring.

The position of the record unit 23 relative to the receiver 35 is determined by the width Wc of the spacer 52 which is in turn determined in consideration of other devices disposed around the record 11. The projection length of the resilient member 55 is chosen such that the width Wa of the record unit 23, as measured across the support plate 26, is greater than the distance Wb between the control surface 52a and the distal end 55a of the resilient member in its free condition. It will be seen that the distance between the control surface 52a and the guide 54a is greater than the width Wa by a clearance Wd, the magnitude of which is chosen to permit an easy attachement or detachment of the record unit 23 with respect to the receiver 35.

When the record unit 23 is allowed to fall down over the receiver 35 as shown in FIG. 11, the pair of support plates 26 move down between the guide surfaces 52b and the guides 54a, and one of the support plates 26 is resiliently urged by the resilient member 55 to cause the other support plate 26 to abut against the control surface 52a, as shown in FIG. 12. Thus, the record unit 23 is positioned by moving down while flexing the resilient member 55 to cause the opposite support plate 26 to be resiliently urged against the control surface 52a until the projections 29, 30 (see FIG. 5) bear against the bottom plate 39. At the same time, the conductive member 55 achieves an electrical connection with the receiver 35. It will be seen that when removing the record unit from the receiver 35 of the developing unit which serves as a support unit, the resilient members 55 are again flexed, thus facilitating the removal.

In the embodiment shown in FIGS. 11 and 12, two spacers are used, one being the spacer 52 which is fixed and having the control surfaces 52a and another or guide member 54 having guides and which is associated with the resilient members 55. However, the second spacer or guide member 54 may be omitted, using only the resilient member 55 to form the second member. In this instance, the resilient member 55 may be electrically conductive, and it is desirable that it is located to bear against the central portion of the support plate 26, as viewed in the direction of movement of the record 11. Even such a simplified arrangement properly positions the record crosswise as a result of the support plates 26 being controlled by a pair of control surfaces 52a and a single resilient member while simultaneously achieving an electrical connection with the receiver.

The record in the form of the endless belt has its upper run 11a disposed to be guided by the top plate 28 of the support plate, and the rubbing action therebetween gives rise to static electricity, which is reflected by adhering of the record to the top plate 28 to cause an increased loading on the drive. Even a non-uniform feed rate of the record may result as a result of a slip occurring between the record and the drive roller 13. Consequently, it is essential that the support plates for the record be securely connected to the ground.

The record 11 comprises a base layer formed by flexible rubber or synthetic resin, a conductive layer formed by a thin aluminium film which is evaporated thereon, and a record layer or a photoconductive layer formed on top of the conductive layer. Additionally, it may include an insulating layer which occurs the photoconductive layer.

Accordingly, one lateral edge of the record 11 is stipped to expose the conductive layer, which is disposed for contact with a brush which is in turn connected to the ground. Such exposed portion may be applied with a reinforcing agent.

In FIG. 8, it will be noted that one lateral edge of the record 11 is formed with an exposed portion 68 where the conductive layer is exposed. The exposed portion 68 is disposed for contact with the free end of a brush 69 which is formed by conductive fibers. The brush 69 is supported by the side plate 67 in an electrically conductive manner, through a bracket 70. Referring to FIG. 2, it will be seen that the location of the brush 69, as viewed in the direction of movement of the record 11, is chosen to be on the tensioning side of the record 11 and in a region close to the drive roller 13 where the record travels straightforward. The choice of such location is a result of the recognition of the following problems: When the brush is disposed for contact with the endless belt or record 11 on the free or relaxing side thereof, undulations in the running belt cause a change in the condition of contact with time, resulting in a variation in the contact resistance and hence the impedance of the conductive path. The record assumes a most stable condition around the belt roller, but if the brush is disposed around the curved portion of the belt, the individual fibers which form the brush contact the record at mutually different angles, preventing an electrically effective contact from being achieved in a stable manner. Because the record unit 23 is detachable with respect to the printer and is assembled integrally with the developing unit 31, the belt portion around the follower roller 12 is left for utilization. However, the roller 12 is displaceable in order to permit a tensioning of the record, so that there is not obtained a fixed distance between the brush and the record, again preventing a stabilized conductive path from being formed.

As a result, it will be seen that the only location left for the record to assume a stable position will be close to the drive roller 13 having its shaft 38 fixedly mounted and on the tensioning side 11a where the belt assumes a straight configuration and where oscillations caused by the movement of the belt is minimized. In this manner, the relative position of the record 11 with respect to the brush is maintained constant, allowing a stabilized conductive path to be maintained.

As shown in FIG. 8, the other lateral edge of the record 11 is formed with a sub-scan sync mark 71, the significance of which be described later. As shown in FIG. 8, a sub-scan sync detector 72 is fixedly mounted on the side plate 60, so as to read the mark 71.

Record/Developing Unit

Figure 9:
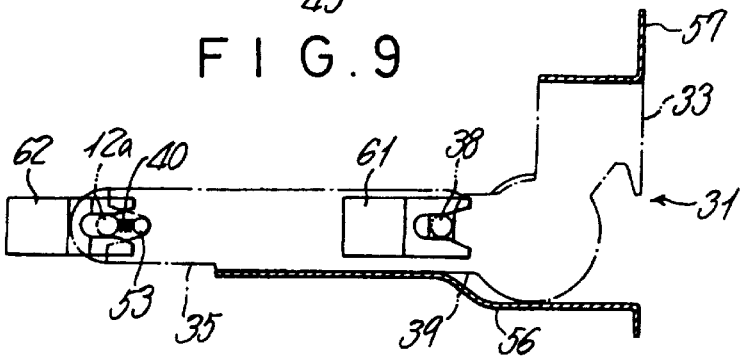
FIG. 9 is a schematic side elevation of the record/developing unit as positioned vertically with respect to the printer.
Figure 10:
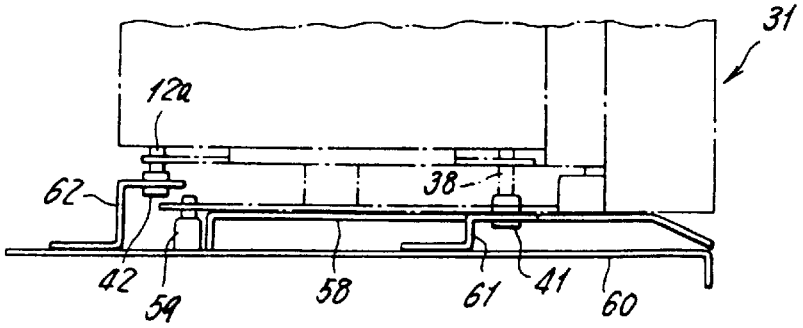
FIG. 10 is a schematic top view of the arrangement shown in FIG. 9.

The developing unit 31 which carries the record unit 23 in this manner is mounted so as to permit its insertion into or withdrawal from the printer. As shown in FIG. 9, the printer is provided with a guide plate 57 which cooperates with the top of the vessel 33, and with another guide plate 56 which cooperates with the bottom plate 39 of the vessel 33 of the developing unit 31, and the developing unit 31 is inserted into the printer within a space confined by these guide plates. As shown in FIG. 10, the printer is provided with a pair of guide plates 58 which cooperate with the opposite sides of the developing unit 31 to locate it crosswise or the record, with respect to the body of the printer. The printer also includes a side plate 60 carrying a pin 59 which is used to position the developing unit 51 as it is inserted. The pin 59 is adapted to engage the groove 40 (FIGS. 5 and 7) formed in the free end of the developing unit for positioning it. Brackets 61, 62 are suitably located on the side plates 60, 67 (FIG. 8) of the printer for supporting the bearings on the rotary shaft 38 of the drive roller 13 and bearings 42 on the rotary shaft 12a of the follower roller 12 of the record unit as the latter is inserted. These brackets cooperate with the respective rollers to position the record 11 in the vertical direction. In this manner, both of the rollers 12, 13 and the developing sleeve 34 are substantially aligned with each other in the horizontal direction and parallel to the direction of insertion. While the brackets 62 may be fixed to the side plates 60, 67 (FIG. 4), it is necessary that at least that bracket 62 which is mounted on the side plate 60 be rockably mounted where a belt offset correcting mechanism is to be provided.

It will be seen that the supporting arrangement described above is provided with a variety of positioning means, so that when the record/developing unit 5 (FIG. 7) including the record unit 23 and the developing unit 31 is inserted into the printer to a given location therein, a desired relative position of the unit 5 with respect to other members and devices disposed within the printer can be reliably and easily assured. Also, by withdrawing the developing unit 31 out of the printer as required, a replenishment of toner into the vessel 31 or a replacement of the record 11 is greatly facilitated.

As mentioned previously, the record/developing unit 5 comprises a unitary construction including the developing unit 31 and the record unit 23 which is supported therein. It is necessary to remove the unit out of the printer at regular or irregular intervals for a routine maintenance purpose such as the replenishment of developer or a change of the endless belt or record, for example.

Accordingly, in accordance with the invention, the degree of withdrawal of the record/developing unit 5 is selectively varied depending on the kind of maintenance work to be performed.

Figure 40:
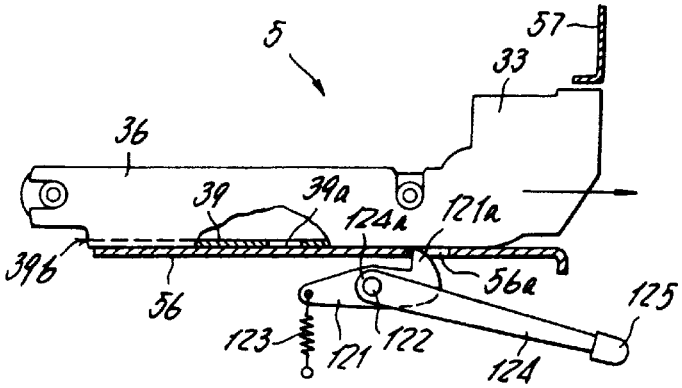
FIG. 40 is a side elevation of one form of a mechanism which is used to perform the maintenance of the record/developing unit.

Referring to FIG. 40, intermediate its length, the guide plate 56 is formed with a slot 56a in which a detent piece 121a of a stop 121 is disposed. As shown in FIG. 4, the stop 121 is fixedly mounted on a shaft 122 which extends across the side plates 60, 67. One end of the stop 121 is engaged with a spring 123, whereby it is urged to rock in a direction to cause the detent piece 121a to project into the slot 56a. Fixedly mounted on one end of the shaft 122 is one end 124a of an operating arm, the other end of which fixedly carries an operating knob 125, which extends externally of the printer as shown in FIG. 1. It is to be noted that the bottom plate 39 of the unit is formed with an engagement slot 39a.

Figure 41:
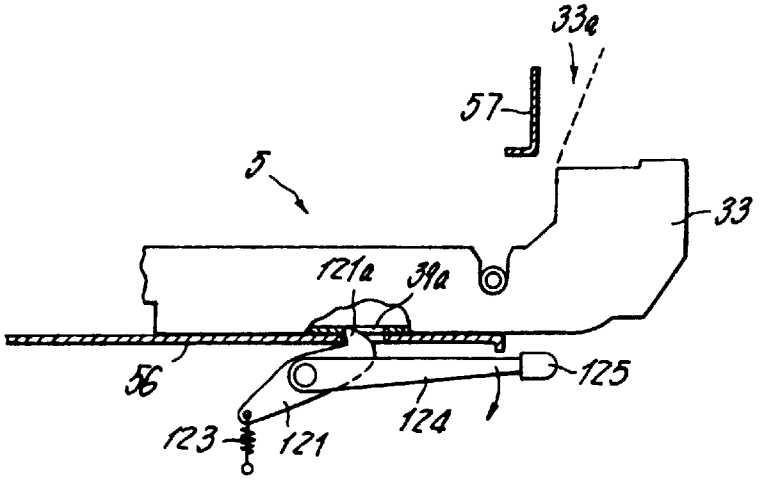
FIG. 41 illustrates the operation of the mechanism shown in FIG. 40.

When the record/developing unit 5 is mounted in place within the printer as shown in FIG. 40, the stop 121 bears against the lower surface of the bottom plate 39. As the unit 5 is pulled in the direction of an arrow from this position, the detent piece 121a slides along the lower surface of the bottom plate 39 until it engages the slot 39a, as shown in FIG. 41, whereupon a further withdrawal is prevented. In the position shown in FIG. 41, the vessel 33 is pulled out the printer, and the top cover 33a thereof can be either opened or closed, thus enabling a replenishment of developer. It will be noted that the record unit 23 remains within the printer at this time, thus preventing the record 11 from being exposed to the indoor illumination to cause a degradation of the response thereof.

When the record 11 is to be changed, the unit 5 is pulled to the position shown in FIG. 41, whereupon the operating knob 125 is pushed to cause the operating arm 124 to rock so that the detent piece 121a on the step 121 is retracted out of the engagement slot 39a. Subsequently, the unit may be pulled out of the printer. When replacing the unit in which the record is changed, into the printer, the tapered portion of the stop 121 is urged by the front edge 39b (FIG. 12) of the bottom plate 39 to move angularly, thus allowing a mounting operation without presenting any resistance thereto.

Figure 42:
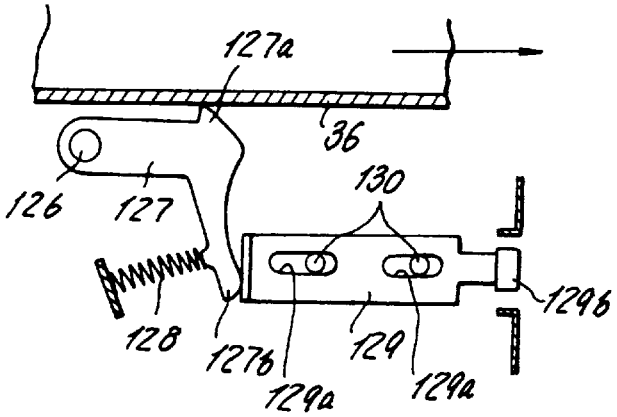
FIG. 42 is a fragmentary plan view of another form of maintenance mechanism.
Figure 43:
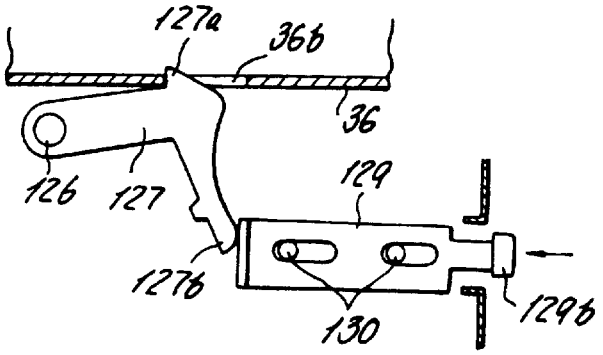
FIG. 43 illustrates the operation of the mechanism shown in FIG. 42.

In the arrangement of FIG. 40, the stop 121 is engaged with or disengaged from the bottom plate 39 of the unit 5. Alternatively, the stop may cooperate with the side plate 36 as shown in FIG. 42. In this instance, a stop 36 is mounted on a shaft 126 adjacent to the side plate 36. The stop 36 is urged by a spring 128 to cause its detent piece 127a into abutment against the side plate 36. The stop 127 includes an arm, the end 127b of which is disposed in abutment against one end of an operating slider 129. The slider 129 is formed with guide slots 129a in which stationary pins 130 are loosely fitted to permit a sliding movement thereof. The side plate 36 is formed with an engagement slot 36b (FIG. 43). As the unit 5 is pulled in a direction indicated by an arrow (FIG. 42) until the detent piece 127a moves into the slot 36b, a further withdrawal of the unit 5 is prevented at such position shown in FIG. 43. This position of the unit corresponds to the replenishment position illustrated in FIG. 41. As the stop 127 locks the unit, it simultaneously drives the operating slider 29 to cause an operating knob 129b to project externally of the printer. When it is desired to withdraw the unit completely out of the printer, the knob 129b may be pushed inward, as viewed in FIG. 43, causing the stop 127 to be disengaged from the slot 36b, whereupon a further withdrawal of the unit is enabled.

It will be seen that since a change of a record is performed by a user who is unskilled with such operation, it is hazardous to start the operation of a printer before it is confirmed that the record is properly loaded. It is frequently possible that only the support member may be loaded without mounting the record in place or the support member may be loaded at an improper position.

A loading operation of the record by the use means that a shakedown run is inhibited. In other words, a satisfactory image must be formed from the beginning after the record has been loaded. However, fine dirt may be deposited on a fresh record during its storage, or the record may bear static electricity. As a result, a first copy obtained may be disturbed in its image quality. In consideration of this, the invention provides an arrangement which allows a confirmation to be made that a change of the record has been properly done, thus assuring the formation of a satisfactory image from the beginning.

In FIG. 7, the developing vessel 33 is partly formed with a plate-shaped piece 33c, and a photo-sensor 400 of transmission type is disposed within the printer. The sensor is located so as to be engaged by the piece 33c whenever the record/developing unit 5 is properly inserted within the printer as indicated in FIG. 2.

A photo-sensor 401 of reflection type is disposed within the printer for detecting the presence or absence of the record 11 when the record/developing unit 5 is properly loaded. Since the sensor 401 detects light reflected from the record 11, it is located immediately behind the cleaning station as indicated in FIG. 2, thus operating in a region where a contamination of the record is minimized.

Figure 92:
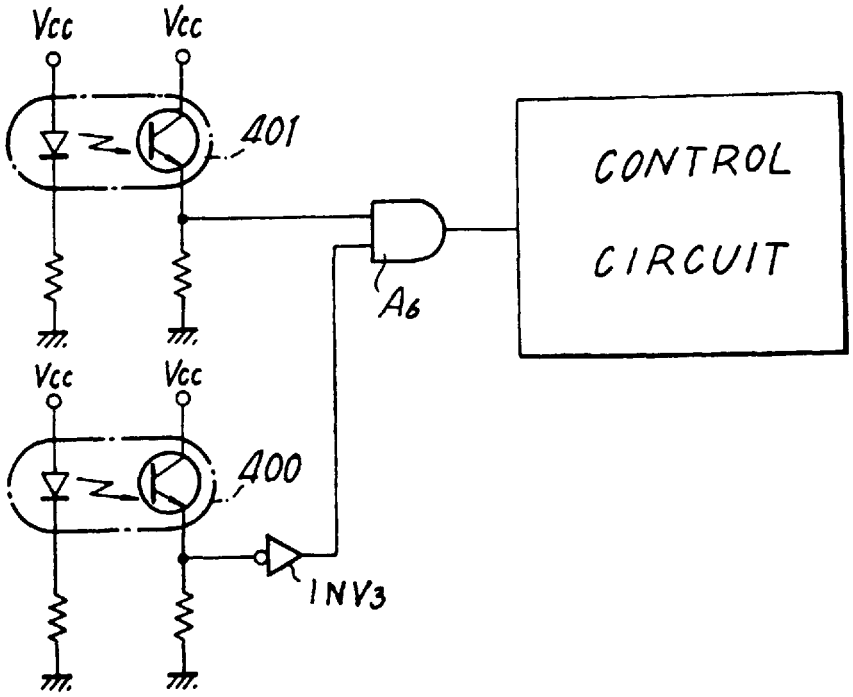
FIG. 92 is a circuit diagram showing one example of the circuit for detecting the record and the record/developing unit.

As indicated in FIG. 92, the photo-sensor 401 of reflection has its output connected to the input of AND gate A6 while the photo-sensor 400 of transmission type is connected through inverter INV3 to the input of the AND gate A6, the output of which is connected to an associated control circuit. When the record/developing unit is loaded into the printer, the sensor 401 detects the presence of the record 11 and produces a signal. When the record is properly loaded, the piece 33c engages the sensor 400 to cause the latter to produce a signal. The signal from the sensor 400 indicates that the unit 5 has been properly loaded and hence such signal can be applied to the control circuit to condition the operation of the printer in accordance with the presence of this signal. When the record unit 23 is not mounted or when the unit 5 is mounted without properly placing the record 11 therein, the printer is inoperable, thus preventing a malfunctioning. The same applies when the unit 5 is not properly loaded.

When the unit 5 which carries the record 11 is properly loaded, the control circuit produces a signal which allows the record unit 23 to be driven for a given time interval in preparation to the formation of an image, thus performing a neutralization and a cleaning operation of the record 11 to assure that a satisfactory image may be formed from the very first copy.

In other words, a change of the record can be simply performed by any one who has no skill or knowledge. Alslo, whenever a fresh record is loaded into the printer, the control circuit produces a signal which instructs the printer to perform a series of given operations in preparation to the formation of an image during a given time interval. Thus, it is assured that a satisfactory image is formed for the very first copy.

Developing Unit

The printer according to the invention adopts a magnetic brush developing process in which a magnetic developer is used to convert an electrostatic latent image into a visual image.

The printer of the invention includes a developing unit incorporating a developing process which prevents such white streaking form occurring. In this developing process, an electrostatic latent image is developed while establishing a distribution of magnetic field which prevents the existence of the developer in a region between a location where a magnetic developer is supplied to the sleeve and the developing station and extending parallel to the axis of the sleeve whenever the sleeve remains stationary. Also, in this developing process, during the development of an electrostatic latent image, a distribution of magnetic field is established so that the developer does not exist in a region between a location where the thickness of the developer on the sleeve is controlled by a control member and the developing station and extending parallel to axis of the sleeve whenever the sleeve remains stationary.

When the sleeve remains at rest, the configuration of the magnet or magnets disposed internally therein may be changed to cause the configuration of the magnetic brush formed on the sleeve to be varied under the influence of the magnetic force from the magnets. Magnets fixedly mounted within the sleeve are normally arranged so that adjacent magnets present poles of dissimilar polarities. However, in certain instances, two adjacent magnets are arranged to present poles of similar polarity to produce a crowd of developer by driving the magnetic developer which has been adhering to the sleeve surface toward the record.

To achieve the object of the invention, of the magnets which are disposed within the sleeve for use as means for generating a magnetic field, adjacent magnets located between a location where the developer is supplied and the developing station are disposed to present poles of similar polarity. The purpose of such disposition is not to drive the developer on the sleeve outwardly or to produce a crowd of developer. Driving the developer is undesirable in causing the problem of dispersion of the developer. In accordance with the invention, a distribution of magnetic field is produced to create a region extending parallel to the axis of the sleeve where the developer is absent whenever the sleeve remains at rest, by providing magnetic poles of similar polarity between the developer supply location and the developing station or between the location where the thickness of the developer layer on the sleeve is controlled and the developing station, without causing the developer to be driven.

Figure 34:
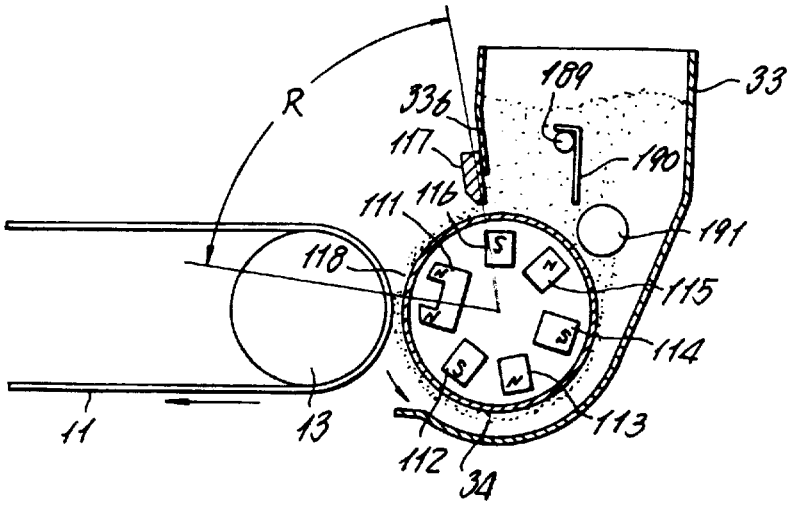
FIG. 34 is a side elevation, partly in section, of one form of developing unit.

In FIG. 34, the developing unit 16 comprises a non-magnetic cylindrical developing sleeve 34 which is disposed for rotation in the counterclockwise direction, and a plurality of magnets 111, 112, 113, 114, 115 and 116 which are arranged within the sleeve 34 and forming together means for generating a magnetic field. The sleeve 34 is disposed in the opening of the developer vessel 33 which contains a supply of developer. The developer used comprises a one-component developer formed by magnetic toner alone. The vessel 33 has a side wall 33b on the developer discharge side on which a developer control member 117 is mounted. The control member 117 is located opposite to the magnet 116. The magnet 111 presents main developing poles, and is centrally recessed as shown. The magnet 111 is disposed at a location which is slightly upstream, as viewed in the direction of rotation of the sleeve, 34, of a point on the sleeve which is closest to the record 11. Other magnets are disposed so that they present N- and S-poles alternately. As the sleeve 34 rotates, the developer is carried out of the vessel 33 in the direction of rotation of the sleeve 34. The provision of the control member 117 in the outlet opening removes an excessive amount of developer on the sleeve, thereby forming a developer layer of a given thickness. In this manner, a magnetic brush having a tuft of a given height is formed on the sleeve.

Figure 35:
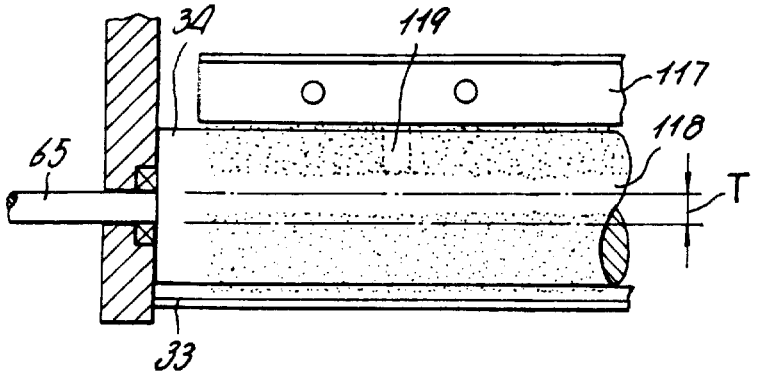
FIG. 35 is a fragmentary rear view of the developing unit shown in FIG. 34.

As mentioned previously, the main developing magnet 111 is centrally recessed. In terms of the magnetic strength at the surface of the sleeve 34, the magnitude of the flux corresponding to the opposite edges of the magnet will be approximately 1,200 Gauss while the magnitude of the flux corresponding to the central recess will be about 800 Gauss. The use of such a magnet enables the developer to be absent in a region of the sleeve 34 which corresponds to the central recess of the magnet when the sleeve 34 ceases to rotate. As indicated in FIG. 35, a region 118 is defined where the developer is absent and which extends parallel to the axis of the sleeve 34. The region 118 must be located within an extent R shown in FIG. 34. Specifically, such region must be located intermediate the location where the developer is supplied onto the sleeve and the developing station. As will be noted from FIG. 35, the region 118 where the developer is absent is slightly offset on the upstream side, as viewed in the direction of rotation of the sleeve, with respect to the developing station which is shown by reference character T in this figure.

Assuming that the space between the control member 117 and the sleeve 34 is plugged with foreign particles, the developer fails to be supplied to such area of the sleeve. Accordingly, an area 119 is formed on the sleeve 34 where the developer fails to be supplied, as shown in FIG. 35. However, the existence of the region 118 where the developer is absent before the arrival of the developer at the developing station T substantially avoids the insufficient supply caused by the control member 117 as a result of the absence of the developer axially all over the sleeve in a defined region. This is attributable to the facilitated migration of the developer to most stable position. As a result, any significant degree of insufficient supply of the developer is removed all over the full width of the developing station T.

When such developing unit is used to convert an electrostatic latent image on the record 11 into a visual image to thereby produce a copy, it is found that the occurrence of white streakings which result from the insufficient supply of developer is substantially eliminated and any remaining influence is minimal.

Figure 36:
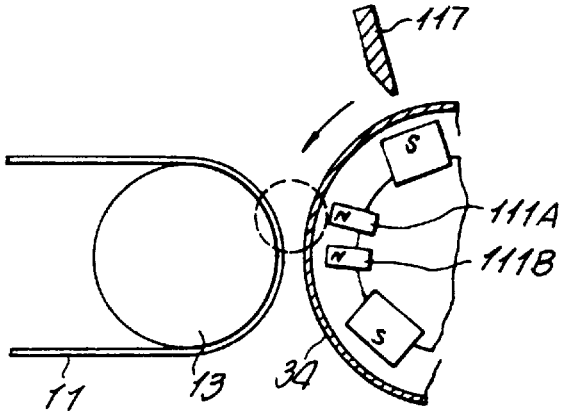
FIGS. 36 to 39 are side elevations, partly in section, of different forms of developing unit.

In the described magnetic brush developing unit, the main magnet 111 is replaced by a pair of magnets 111A, 111B of similar polarity and disposed close to each other, as shown in FIG. 36. As before, the developer is absent in a region on the surface of the sleeve 34 which corresponds to the spacing between the magnets 111A, 111B when the sleeve 34 ceases to rotate. The region where the developer is absent is indicated by broken line circle. A similar result is ottained as before when using this developing unit for the developing step.

Figure 37:
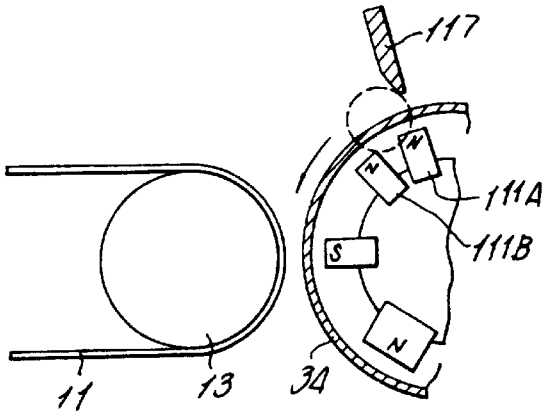

In the arrangement of FIG. 36, a group of magnets disposed within the sleeve 34 is rotated through about 60° clockwise, as indicated in FIG. 37. The pair of adjacent magnets 111A, 111B of similar polarity are then located opposite to the control member 117. It is found that a similar result as before is obtained so long as the region where the developer is absent on the sleeve 34 is situated between the developing station and the developer control member.

Figure 38:
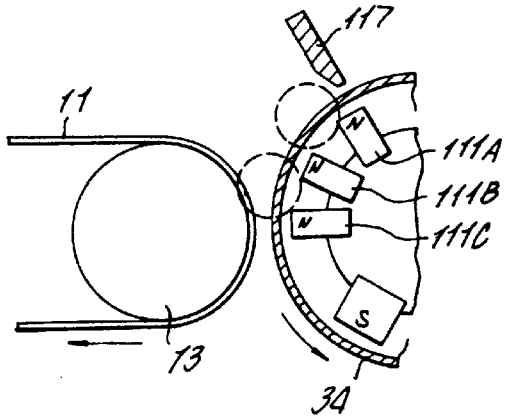

In an example shown in FIG. 38, a developing unit is provided for developing an electrostatic latent image in which two regions are formed between the developer control member 117 and the developing station where the developer is absent. At this end, three magnets 111A, 111B and 111C presenting magnetic poles of similar polarity are disposed at an equal spacing intermediate the developer control member 117 and the developing station. The occurrence of any area on the sleeve where the toner is insufficiently supplied in the region of the developer control member 117 cannot cause a white streaking, since as the developer is carried through the two regions where the developer are absent, such area is replenished with toner.

Figure 39:
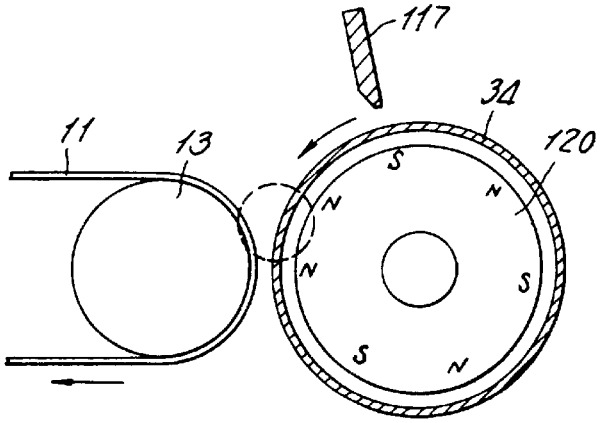

Another example is shown in FIG. 39 which is similar in principle of operation to the arrangement of FIG. 36, but in which a cylindrical magnet 120 presenting N- and S-poles alternately around its periphey is substituted for the rod magnets to serve as means for generating a magnetic field. The cylindrical magnet 120 affords advantages that the location of magnetization can be arbitrarily chosen and that the unit can be assembled to establish a spacing of high precision between the sleeve 34 and the surface of the magnet.

In one practical implementation, a magnetic toner having an average particle diameter of 10 to 13 microns is used, and linear speed of the records is 111 is chosen to be 70 mm/sec and the linear speed of the non-magnetic sleeve is chosen to be equal to 210 mm/sec, whereby a developed image of good quality is obtained which is free from any white streaking. Representing the linear speed of the record by Vp and that of the sleeve by Vs, good results are obtained in a range of the ratio Vs/Vp=1.5 to 4.0. It is found that good results are obtained when Vs has a value from 50 to 300 mm/sec, preferably from 150 to 300 mm/sec.

In the above description, the use of a single developer control member has been assumed. Where a plurality of such control members is used, it is only necessary that at least one region be magnetically formed where the developer is absent between the developing station and one of the control members which is closest to the developing station.

The printer of the invention is provided with a developing unit which overcomes described disadvantages and which is capable of removing any residual toner on the sleeve without contact therewith while preventing a damage to the sleeve and an agglomeration of toner, thus enabling an image of a stabilized, good quality to be obtained.

Referring to FIGS. 2 and 34, there are disposed within the developer vessel 33 a first agitating member 190 mounted on an agitator shaft 189, and a second agitating member 191 which is disposed out of contact with the developing sleeve, but extending parallel thereto. The second agitating member 191 is formed by a magnetic material and is in the form of a screw shaft having a thread 192, as shown in FIG. 58.

Figure 59:
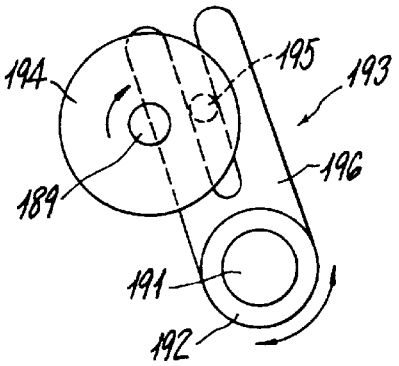
FIG. 59 is a side elevation of a mechanism for reciprocately rotating the second stirring member.

A mechanism 193 for reciprocately rotating the second agitating member 191 and for reciprocately translating it relative to the developing sleeve 34 is interposed between the agitator shaft 189 and the second agitating member 191. As shown in FIG. 59, the mechanism 193 comprises a circular flange 194 fixedly mounted on the end of the shaft 189, a pin 195 fixedly mounted on the flange 194, and a forked lever 196 having its one end fixedly mounted on one end of the second agitating member 191 and having its fork disposed in slidable fitting engagement with the pin 195. As the shaft 189 rotates in one direction, such rotating motion is converted by the lever 196 into a reciprocately angular motion of the second agitating member 191, which rotates through an equal angle in the forward and the reverse direction.

In the developing unit mentioned above the magnetic line of force from the second agitating member 191 is concentrated into a narrow space between the thread 192 and the sleeve 34 where part of the toner is retained, causing another portion of the toner which is subsequently fed to such space to be laterally displaced, as indicated by an arrow d in FIG. 58, thus achieving a lateral agitating effect. The angular motion of the second agitating member 191 causes a movement of the toner in a direction indicated by an arrow e, whereby the toner retained between the sleeve 34 and the agitating member 191 is gradually replaced by another portion of the toner, removing any residual toner from the sleeve 34 and agitating it with a remainder of the toner. It is to be noted that if the second agitating member 191 is caused to rotate in only one direction, the toner will be offset to one side within the vessel 33, producing an adverse influence upon the developing step. In addition, such rotation would urge the toner, promoting an agglomeration thereof. The reciprocately angular movement of the second agitating member 191 avoids the likelihood that the same toner may be maintained retained between the member 191 and the sleeve 34, and an angular motion at a low rate which is equal to or less than several revolutions per minute prevents the occurrence of any agglomeration of tone, thus assuring a removal of toner from the sleeve 34 and agitation thereof.

Figure 58:
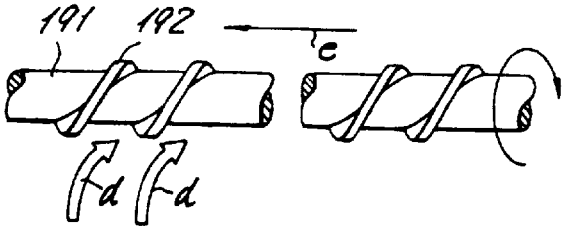
FIG. 58 is a front front view of a second stirring member.
Figure 60:
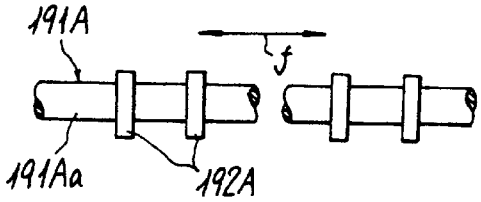
FIG. 60 is a view of another form of second stirring member.

It should be understood that the configuration of the second agitating member 191 is not limited to that of a screw shaft as indicated in FIG. 58, but may be constructed as shown at 191A in FIG. 60. In this instance, the second agitating member 191A includes a shank 191Aa carrying a plurality of axially spaced circular flanges 192A. In this instance, it is necessary that the member 191A be subject to a reciprocately translation relative to the developing sleeve 34 at a low rate. In this instance, the shank 191Aa need not be rotated. As a further alternative, the second agitating member may be configured with chevronshaped projections in an array parallel to the axis of the developing sleeve 34 and disposed for axial translation in a reciprocately manner. It need not be rotated is in the embodiment shown in FIGS. 58 and 59. Thus, the only requirement is that the toner be retained between the chevron-shaped projections and the sleeve so as to produce the similar functioning as described in the above embodiment.

It will be appreciated that the provision of the second agitating member which is located close to but out of contact with the developing sleeve and disposed for relative reciprocately motion with respect to the developing sleeve assures a removal of any residual toner from the developing sleeve and a subsequent agitation without accompanying a contact with the sleeve, thus preventing a damage to the sleeve and an agglomeration of toner while maintaining the printer in a condition which is capable of producing an image of good,stabilized quality.

Offset Detecting Means

The invention avoids the described difficulty by providing a belt offset compensating mechanism including offset detecting means and offset control means which provides a correction for the offset of the belt. The offset detecting means can be constructed according to a first and a second approach. Considering the first approach initially, the offset detecting means according to the first approach comprises a combination of a photo-interrupter including a light source and a light receiving element, and a light shield member which is movable to intercept the light path between the source and the element, thus allowing an offset in the record to be detected.

Figure 20:
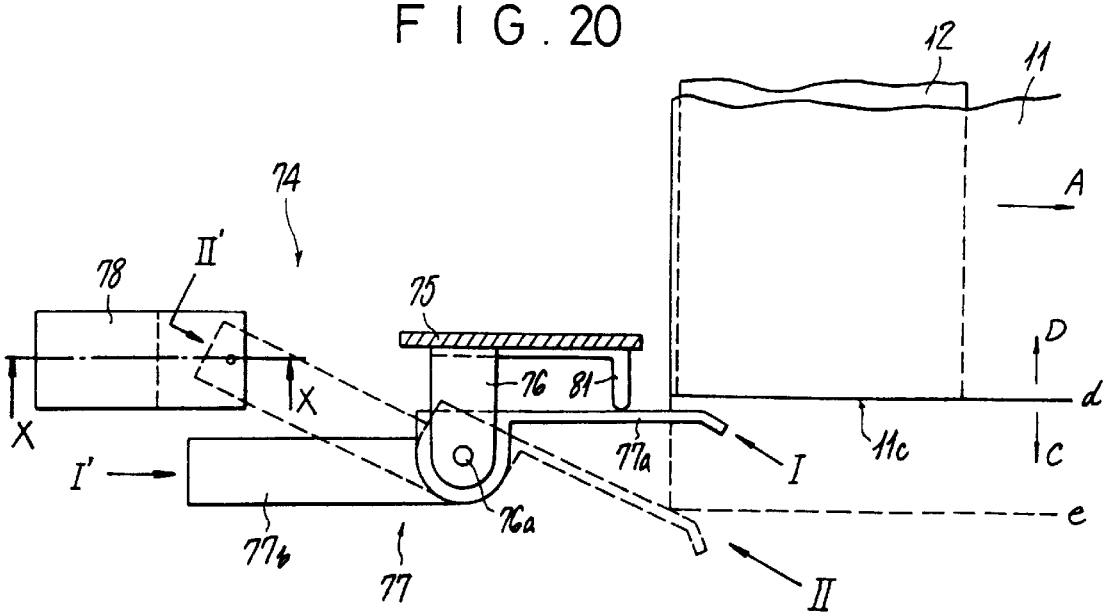
FIG. 20 is an enlarged plan view of one form of belt offset detecting means.

FIG. 20 shows a first embodiment of the offset detecting means according to the first approach. As indicated by numeral 74 in FIGS. 2 and 4, the detecting means 74 is disposed in opposing relationship with a region of the record 11 which extends around the roller 12, such region being hereafter referred to as a curved region.

In FIG. 20, the offset detecting means 74 comprises a support member 76 attached to a bracket 75 which is disposed in front of the record 11. The support member 76 includes a pivot 76a which rotatably carries a detection feeler 77. The detection feeler 77 includes a contact finger 77a which is located on one side of the support member 76 that is nearer the record 11, and the other side of the feeler is formed as a light shield 77b. The feeler is disposed so that the free endof the contact finger 77a can abut against the edge of the record 11. A photo-interrupter 78 is disposed on the path of angular movement of the light shield 77b.

Figure 21:
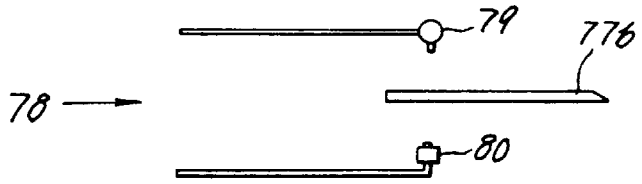
FIG. 21 is a cross section of a photo-interrupter.

FIG. 21 is a cross section taken along the line X—X shown in FIG. 20, illustrating the arrangement of the photo-interrupter 78. As shown, the photo-interrupter 78 includes a light source 79 and light receiving element 80, and produces an output signal in accordance with the amount of light from the source 79 which is received by the element 80. As shown, the light shield 77b is angularly movable so as to intercept the light path between the source 79 and the element 80.

In a region below the support member shown in FIG. 20, an L-shaped stop 81 is mounted on the bracket 75 in order to limit the rotation of the contact finger 77a in the counterclockwise direction. While not shown, tension means such as a coiled torsion spring or leaf spring is mounted on the detection feeler 77 to urge it to rotate in the counterclockwise direction, as viewed in FIG. 20. Consequently, the contact finger 77a is urged against the stop 81 unless it is engaged by the edge 11c of the record 11.

The operation of the offset detecting means 74 will be described. During a normal record operation, the record 11 travels in a direction indicated by an arrow A, with its edge indicated by a line d in FIG. 20. There occurs no contact between the contact finger 77a and the edge 11c under this condition, and hence the light shield 77b cannot intercept the light path from the light source 79 to the light receiving element 80 of the photo-interrupter 78. Accordingly, the photo-interrupter 78 produces an output signal, the magnitude of which depends on the amount of light passing through such path. However, the record 11 is offset in a direction by an arrow C, and the edge of the record 11 reaches a position e shown in FIG. 20, the edge 11c initially bears against the contact finger 77a at a position I (shown in solid line), whereupon the finger 77a moves clockwise about the pivot 76a asas the record 11 continues to shift in the direction C, with consequence that the finger 77a reaches its position II shown in broken lines in FIG. 20. Simultaneously with the angular movement of the contact finger 77a, the light shield 77b also moves angularly from its solid line position I' to its broken line position II', thus intercepting the light path between the source 79 and the element 80 of the photo-interrupter 78. When the light path is thus interrupted, a change occurs in the output signal from the photo-interrupter. In this manner, an offset occurring in the record 11 in the direction C is indicated by a change in the output signal from the photo-interrupter 78.

On the other hand, if the record is offset in the opposite direction or in a direction indicated by an arrow D shown in FIG. 20, such offset can be detected by another detecting means (FIG. 4) which is identical with the offset detecting means 74 mentioned above and which is disposed to cooperate with the other edge 11d (FIG. 4) of the record 11.

A change occurring in the output signal from the photo-interruptercontained in both of the offset detecting means is transmitted through a control circuit, to be described later, and which provides a suitable correction for the offset of the record 11.

Figure 22:
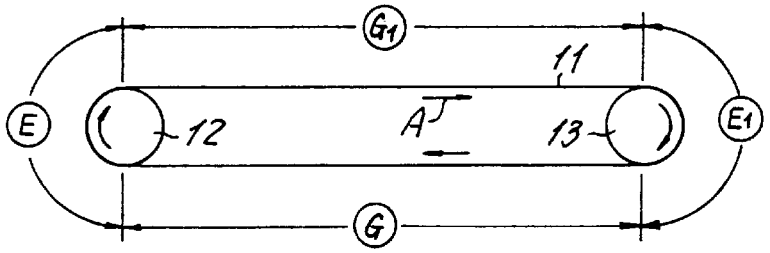
FIG. 22 is a side elevation illustrating curved regions and straight of the record in the form of an endless belt.

The offset detecting means is disposed so as to be opposite to the curved region of the record 11, and the reason herefor will now be described with reference to the drawings. FIG. 22 shows the record 11 in the form of an endless belt, and rollers 12, 13 around which the record extends. In FIG. 22, the the curved region of the belt mentioned above is indicated by a both-ended arrow E. There is another curved region $E_1$ corresponding to the other roller 13. In regions located between these curved regions and which are indicated by bothended arrows G, $G_1$, the record is linear. Accordingly, regions G, $G_1$ will be referred to as linear regions. Assuming that a force is externally applied to the edge of the record 11 in a direction to cause an offset thereof in a direction perpendicular to the direction of drive A, it will be seen that the record 11 is easily susceptible to deformation in the linear regions G, $G_1$ but is less susceptible to deformation in the curved region E. Accordingly, it is preferred to choose the curved region E where the susceptibility to deformation is reduced as compared with the linear regions G, $G_1$ for bringing a contact finger into contact therewith. In this manner, the angular movement of the contact finger is stabilized while minimizing deformation of the edge of the record 11.

Figure 23:
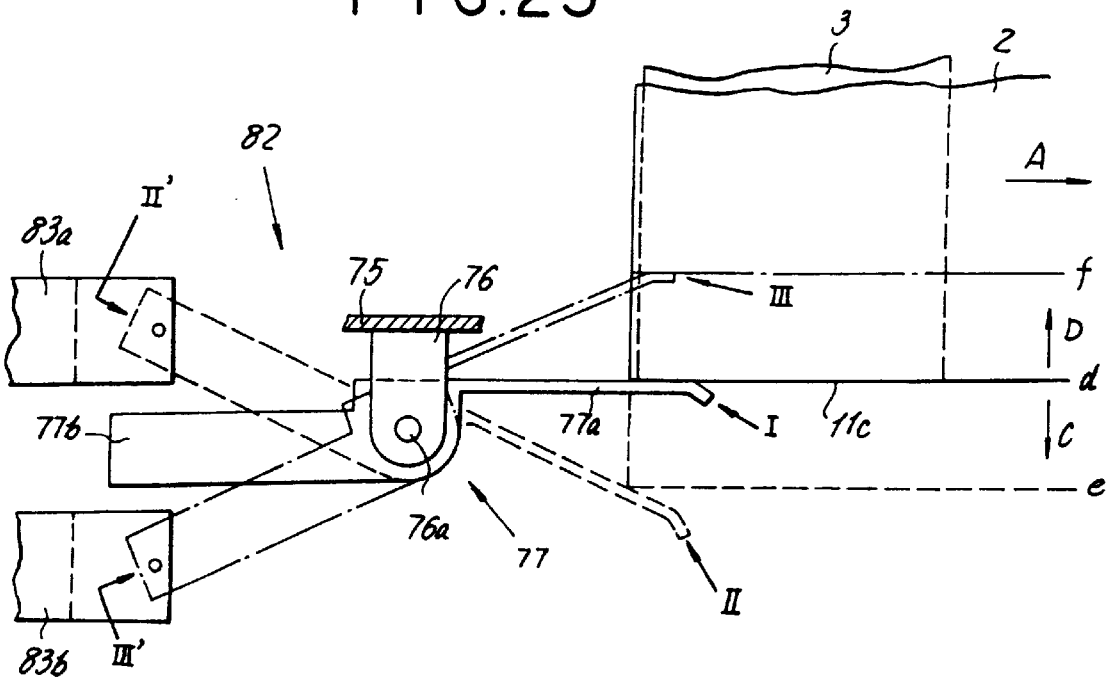
FIG. 23 is an enlarged plan view of another form of belt offset detecting means.

FIG. 23 shows offset detecting means according to a second embodiment which is based on the first approach initially mentioned. A amjor difference over the first embodiment shown in FIG. 20 resides in the fact that offset detecting means 82 shown includes a pair of photo-interrupters 83a, 83b which are suitably spaced in a region of angular movement of the light shield 77b, and the stop 81 shwwn in the first embodiment is removed. In this arrangement, resilient means, not shown, urges the contact finger 77a so that it is maintained in abutment against the edge of the record 11 and moves angularly as the edge shifts. By way of example, if the edge of the record 11 shifts from its solid line position d to its broken line position e, the contact finger 77a moves angularly from its solid line position I to its broken line position II. Conversely, when the edge of the record 11 shifts to a position indicated by phantom lines f, the contact finger 77a moves angularly to phantom line position III. As the contact finger 77a moves angularly to either position II or position III, the light shield 77b moves angularly to either position II' or position III', respectively. The photo-interrupters 83a, 83b are arranged such that the light path of the phot-interrupter 83a is intercepted when the light shield 77b reaches the position II' while the light path of the photo-interrupter 83b is intercepted when the light shield 77b reaches the position III'. In other respects, the arrangement is similar to that of the first embodiment shown in FIG. 20, and accordingly corresponding parts are designated by like numerals and will not be described.

In this embodiment, the record 11 normally travels in the direction of the arrow A with its edge aligned with the line d during the normal record operation. Under this condition, the light shield 77b intercepts the light path of neither photo-interrupter 83a nor 83b, which therefore produces an output signal depending on the amount of light passing through the light path thereof. However, if the record 11 is offset in the direction C and the edge thereof shifts to the position e, the contact finger 77a moves angularly to its position II and the light shield 77b simultaneously moves angularly to its position II'. In this position, the light shield intercepts the light path of the photo-interrupter 83a, producing a change in the output signal therefrom. On the other hand, if the record 11 is offset in the direction D and its edge shifts to to the position f, the contact finger 77a moves angularly to its position III and the light shield 77b simultaneously moves angularly to its position III'. In this position, the light shield 77b intercepts the light path of the photo-interrupter 83b, causing a change in the output signal therefrom. In this manner, the single offset detecting means 82 may be utilized to detect either offset of the record 11 in the direction C or D, in terms of a change in the output signal fom either photo-interrupter 83a or 83b. As before, such change in the output signal from the photo-interrupter 83a or 83b is transmitted to belt offset control means to be described later.

Figure 24:
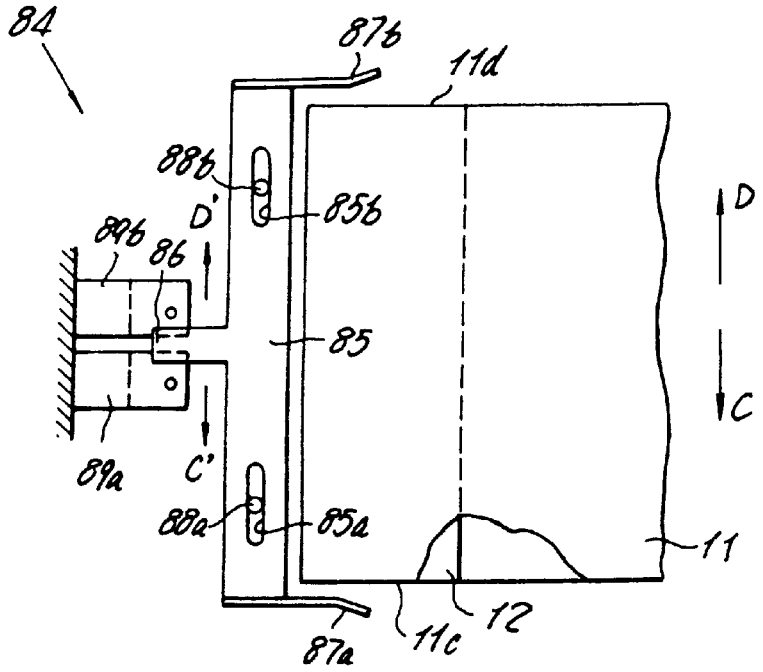
FIGS. 24 and 25 are plan views showing different forms of belt offset detecting means.

FIG. 24 shows a third embodiment of offset detecting means. In this embodiment, offset detecting means 84 comprises a slide bar 85 disposed in opposing relationship with or in front of (or to the left, as viewed in FIG. 24) of the roller 12 associated with the record 11 and extending in the axial direction of the roller 12 and having a length which slightly exceeds the width of the record 11. The slide bar 85 is centrally formed with a light shield 86 which projects forwardly, or to the left as viewed in FIG. 24, and is also provided with a pair of contact fingers 87a, 87b on its opposite ends which extends rearwardly or to the right as viewed in FIG. 24. The slide bar 85 is formed with a pair of spaced, axially elongate slots 85a, 85b, which are fitted over stationary pins 88a, 88b, respectively. The cooperation between the pins 88a, 88b and the slots 85a, 85b provide a guiding action which allows the slide bar 85 to move in a direction parallel to the roller 12 and through a stroke corresponding to the length of each slot 85a, 85b. The direction of such movement is indicated in FIG. 24 by arrows C' and D'. The projection length of the contact fingers 87a, 87b is chosen to permit the abutment of either edge 11c or 11d of the record 11 against such fingers as the record 1 shifts in a direction indicated by arrow C or D. It will be seen that the light shield 86 moves simultaneously with the slide bar 85 as the latter moves in either direction C' or D'. A pair of photo-interrupters 89a, 89b are juxtaposed along a direction parallel to the direction of movement of the light shield 86 so as to be located within along a direction parallel to the direction of movement of the light sheild 86 so as to be located within the extent of movement of the light shield 86.

In operation, when the record 11 is offset in the direction C, its edge 11c bears against the contact finger 87a to urge it, thus causing the slide bar 85 to move in the direction C'. Simultaneously, the light shield 86 moves in the direction C', with the light shield intercepting the light path of the photo-interrupter 89a, whereupon a change is produced in the output signal therefrom. In this manner, an offset of the record 11 in the direction C is indicated by a change in the output signal from the photo-interrupter 89a. On the other hand, an offset of the record 11 in the direction D is indicated by a change in the output signal from the photointerrupter 89b.

Figure 25:
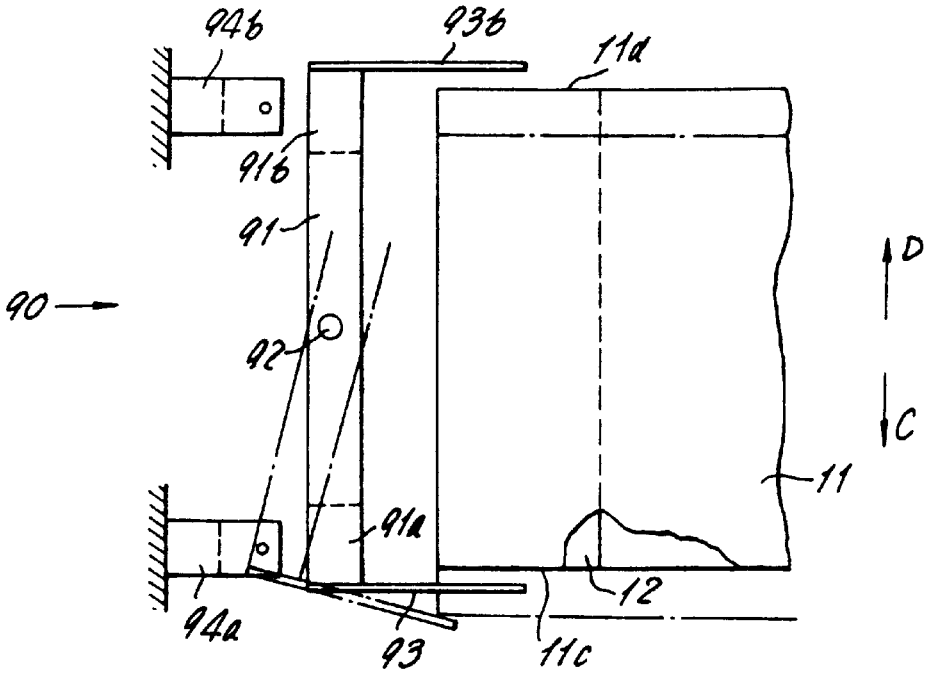

FIG. 25 shows a fourth embodiment of offset detecting means which is constructed on the basis of the first approach. In FIG. 25, offset detecting means 90 shown comprises an angularly movable arm 91 disposed in front, or to the left, as viewed in FIG. 25, of, the curged region of the record 11 corresponding to the roller 12 and extending in a direction parallel to the axis of the roller 12 and having a length which slightly exceeds the width of the record 11. At its center, the arm 91 is pivotally mounted on a pin 92. On its opposite ends, the arm 91 carries a pair of contact fingers 93a, 93b which extend rearwardly, or to the right, as viewed in FIG. 25. The projection length of the contact fingers 93a, 93b is chosen to permit the abutment of either edge 11c or 11d of the record 11 against a corresponding one of the contact fingers whenever the record 11 is offset in a direction indicated by either arrow C or D. A pair of photointerrupters 94a, 94b are disposed forwardly, or to the left, as viewed in FIG. 25, of the arm 91, generally in alignment with the opposite ends thereof. These photo-interrupters 94a, 94b, are constructed in the same manner as the photo-interrupter 78 shown in FIG. 21. It is to be understood that the opposite ends of the arm 91 are formed to function as light shields 91a, 91b having a thickness wihich is less than the lenght of optical path in respective photo-interrupters 94a, 94b. Accordingly, as the arm 91 moves angularly through a given stroke, the light shield 91a or 91b is capable of intercepting the light path of the associated photo-interrupter, in the same manner as illustrated in FIG. 21.

In operation, when the record 11 is offset in the direction C, its edge 11c bears against the contact finger 93a to urge it to cause a clockwise movement of the arm 91. Consequently, the arm 91 reaches a condition which is indicated by phantom lines. In this position,the light shield 91a intercepts the light path within the photo-interrupter 94a, thus producing a change in the output signal therefrom. In this manner, an offset of the record 11 in the direction C is indicated by a change in the output signal from the photo-interrupter 94a. Similarly, an offset of the record 11 in the direction D is indicated by a change in the output signal from the other photo-interrupter 94b.

In each of the embodiments described above, the combination of a photo-interrupter and a light shield may be replaced by a combination of a microswitch and a contact finger or a combination of a reed switch and a magnet or any other known detecting elements.

In contrast to the offset detecting means based on the first approach, the second approach initially mentioned is based on detecting an offset of the record by the combination of a photo-sensor or reflection type which is disposed adjacent to an edge of the record, and a detection patter having an optical reflectivity which is different from the optical reflectivity of the record and movable into a zone detectable by the photo-sensor whenever the edge of the record shifts in a direction perpendicular to the direction in which it is normally driven.

Figure 26:
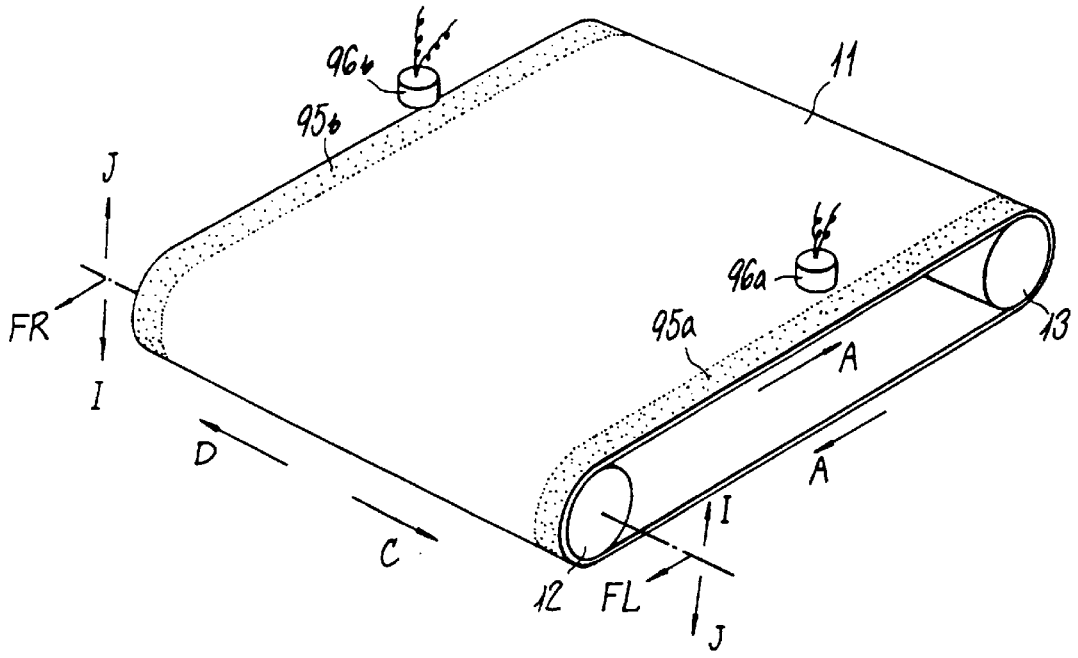
FIG. 26 is a view showing a further form of belt offset detecting means and also illustrating the principle of operation of offset control means.

FIG. 26 shows a first embodiment of offset detecting means which is based on the second approach. In FIG. 26, the record 11 in the form of an endless belt extends around belt rollers 12, 13 so as to be driven in a direction indicated by arrows A. Both lateral edges of the record 11 are formed with detection patterns 95a, 95b along their full length. These patterns are formed by using a material which exhibits an optical reflectivity different from the optical reflectivity of the record 11. A pair of photo-sensors 96a, 96b of reflection type are disposed above the opposite edges of the record 11 in the planar or straight region thereof, namely, in a region of the record 11 other than those disposed around the rollers 13, 12.

Figure 27:
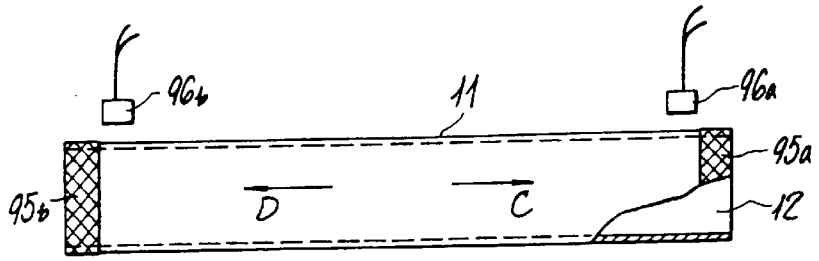
FIG. 27 is a front view of the arrangement shown in FIG. 26.

FIG. 27 is a front elevation of the arrangement shown in FIG. 26, illustrating the relative position of the photo-sensors 96a, 96b. In FIG. 27, the record 11 is shown as being driven in a normal manner, and hence, there is no offset of the control 11 in either direction C or D, which is perpendicular to the direction in which the record 11 is driven. Under this condition, it will be noted that the photo-sensors 96a, 96b are located above the record 11 in zones which are offset inwardly from the detection patterns 95a, 95b, as viewed in the lateral direction. Thus, the record 11 is present in the detectable zones of the sensors 96a, 96b. Accordingly, the sensors 96a, 96b produce output signals which corresponds to the optical reflectivity of the record 11. It is to be understood that devices disposed around the record 11 as shown in FIG. 2 are omitted from illustration in FIGS. 26 and 27 for purpose of clarity.

If an offset of the record 11 occurs in the direction C as it is driven in the direction A, the detection pattern 95b also shifts in the direction C. After the detection pattern 95b has travelled through a suitable distance, it moves into the detectable zone of the photo-sensor 96b, whereupon a change beings to occur in the output signal from the latter since the optical reflectivity of the detection pattern 95b is different from that of the record 11. Accordingly, an offset of the record 11 in the direction C is indicated by a change in the output signal from the photo-sensor 96b. Similarly, an offset of the record 11 in the direction D is indicated by a change in the output signal from the photo-sensor 96a.

Figure 28C:
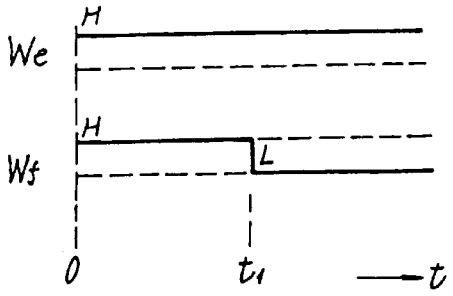
FIGS. 28(c) and 28(d) are timing charts showing a change in an output signal from a photosensor of reflection type shown in FIG. 26.
Figure 28D:
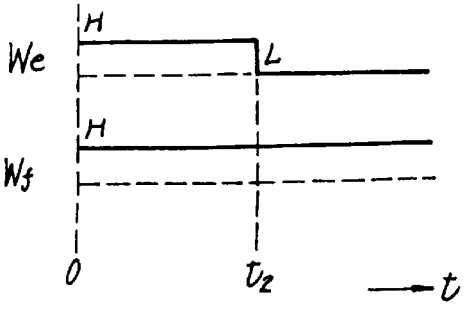

FIG. 28 shows timing charts which illustrate a change occurring in the output signal from either photo-sensor 96a or 96b as a result of an offset of the record 11. The graph (c) illustrates an offset of the record 11 in the direction C while the graph (d) illustrates an offset of the record 11 in the direction D. In the graph (c), the record 11 is present in the detectable zones of both sensors 96a, 96b from the instant (t=0) when an offset of the record 11 occurs in the direction C until the detection pattern 95b moves into detectable zone of the sensor 96b ($t=t_1$), and hence an output signal We from the sensor 96a and an output signal Wf from the sensor 96b both assumes an H level. After time $T_1$, the record 11 is present in the detectable zone of the sensor 96a while the detection pattern 95b is present in the detectable zone of the sensor 96b, and hence the signal We assumes an H level while the signal Wf assumes an L level. It is understood that the H and the L level depend upon the optical reflectivity of the record 11 and the detection pattern 95b. For example, if the optical reflectivity of the record 11 is greater than that of the detection pattern 95b, the H level will be a high level and the L level will be a low level.

Similarly, referring to the graph (d), both output signals We, Wf assume an H level as in the graph (c) from the instant (t=0) when an offset of the record 11 begins to occur in the direction D until the detection pattern 95a, moves into the detectable zone of the sensor 96a ($t=t_2$). After time $t_2$, the detection pattern 95a is present in the detectable zone of the sensor 96a while the record 11 is present in the detectable zone of the sensor 96b, and hence the signal We assumes an L level while the signal Wf assumes an H level.

Figure 29:
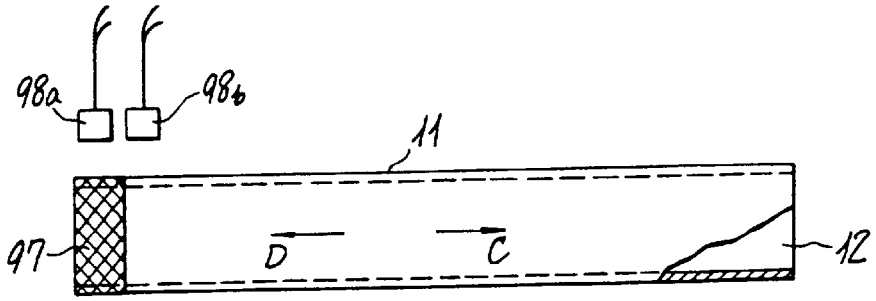
FIG. 29 is a front view of still another form of belt offset detecting means.

FIG. 29 shows a second embodiment of offset detecting means which is based on the second approach. The record 11 is shown as supported by the roller 12, and is formed with a detection pattern 97 on only its one edge, which pattern exhibits a different optical reflectivity from the record 11. In FIG. 29, the record 11 is shown is being normally driven. Hence, no offset occurs in a direction perpendicular to the direction in which the record 11 is driven, namely, in a direction C or D shown. A photo-sensor 98a of reflection type is disposed directly above the detection pattern 97 under this condition of the record, and another photo-sensor 98b of reflection type is aligned with the sensor 98a laterally, or in a direction perpendicular to the direction in which the record 11 is driven and located inwardly offset from the detection pattern 97. Un the condition shown, the detection pattern 97 is present in the detectable zone of the sensor 98a while the record 11 is present in the detectable zone of the sensor 98b. Accordingly, the sensor 98a produces an output signal which corresponds to the optical reflectivity of the detection pattern 97 while the sensor 98b produces an output signal which corresponds to the optical reflectivity of the record 11.

If an offset of the record 11 occurs in the direction C, the detection pattern 97 also shifts in the direction C. After the detection pattern 97 has travelled through a suitable distance, it moves into the detectable zone of the photo-sensor 98b, whereupon a change begins to occur in the output signal therefrom. It will be noted that no change occurs in the output signal from the sensor 98a since the detection pattern 97 continues to be present within the detectable zone thereof. Accordingly, an offset of the record 11 in the direction C is indicated by a change in the output signal from the sensor 98b.

Similarly, an offset of the record 11 in the direction D is indicated by a change in the output signal from the sensor 98a since the record 11 moves into the detectable zone of the sensor 98a. The record 11 continues to be present within the detectable zone of the sensor 98b during such offset, and there occurs no change in the output signal from the sensor 98b.

Figure 30D:
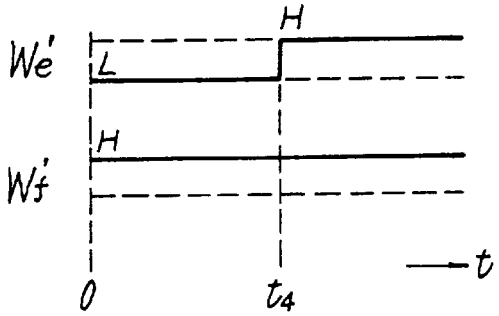
FIGS. 30(d) and 30(c) graphically illustrate a change in the output signal from the photosensor shown in FIG. 29.
Figure 30C:
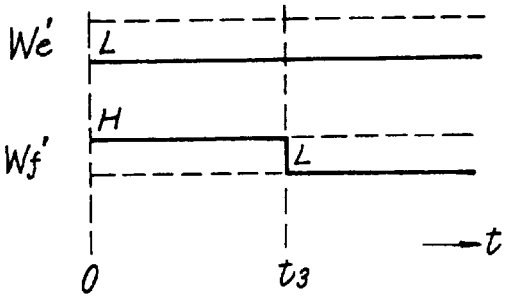

FIG. 30 shows timing charts illustrating a change occurring in the output signal from either sensor 98a or 98b shown in FIG. 29. Graph (c) illustrates an offset of the record 11 in the direction D. In the graph (c), the detection pattern 97 is present in the detectable zone of the sensor 98a from the instant (t=0) when an offset of the record 11 begins to occur in the direction C until the pattern 97 moves into the detectable zone of the sensor 98b ($t=t_3$). During such interval, the record 11 continues to be present in the detectable zone of the sensor 98b. Accordingly, the sensor 98a produces an output signal We' of an L level while the sensor 98b produces an output signal Wf' of an H level. After the time $t_3$, the detection pattern 97 is present in the detectable zone of both sensors 98a, 98b, so that both of the signals We' and Wf' assume an L level. The significane of the H or L level remains the same as before.

In the graph (d), the detection pattern 97 is present in the detectable zone of the sensor 98a from the instant (t=0) when an offset of the record 11 begins to occur in the direction D until the record 11 moves into the detectable zone of the sensor 98a. At this time, the record 11 continues to be present in the detectable zone of the sensor 98b. Accordingly, the signal We' assumes an L level while the signal Wf' assumes an H level. After time $t_4$, the record 11 is present in the detectable zones of both sensors 98a, 98b, which therefore produce signals We' and Wf' of an H level.

Figure 31:
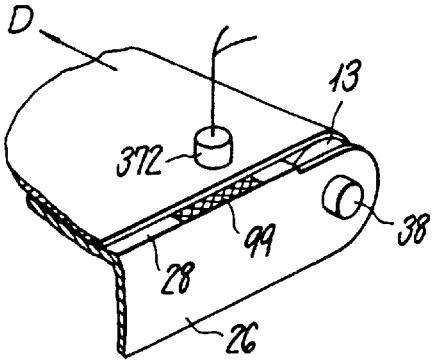
FIG. 31 is a perspective view of yet another form of offset detecting means.

FIG. 31 shows a third embodiment of offset detecting means which is based on the second approach. A series of detection patterns 99, which are spaced apart in a direction perpendicular to the direction in which the record 11 is driven are formed on the surface of part of the top plate 28 of the support plate 26 which is located adjacent to the roller 13. As before, the detection patterns 99 exhibit an optical reflectivity which is different from that of the record 11. A photo-sensor 372 of reflection type is disposed above the detection patterns 99 so as to be aligned with the edge of the record 11. If an offset of the record 11 occurs in the direction D as viewed in FIG. 31, the detection patterns 99 on the top plate 28 are sequentially exposed. When the exposed detection pattern 99 enters the detectable zone of the sensor 372, a change occurs in the output signal therefrom, thus indicating the occurrence of an offset of the record 11.

Belt Offset Control Means

FIG. 26 illustrates the principle of operation of offset control means. In FIG. 26, the record 11 is carried by the belt rollers 12, 13 so as to be driven in directions indicated by arrows A. As mentioned previously, the drive roller 13 has its rotary shaft 38 fixedly mounted while the other roller 12 is disposed so that it is tiltable about the axis thereof which lines in a plane including the rollers 12, 13, as indicated by arrows I, J. If the opposite axial ends of the roller 12 are tilted in the direction of the arrow I, and offset of the record 11 in the direction D. Conversely, if the opposite axial ends of the roller 12 are tilted in the direction of the arrow J, an offset of the record 11 occurs in the direction C. Such phenomenon is remarkable when the record 11 is formed of a material such as polyester terephthalate which has a low elastic modulus.

Figure 32:
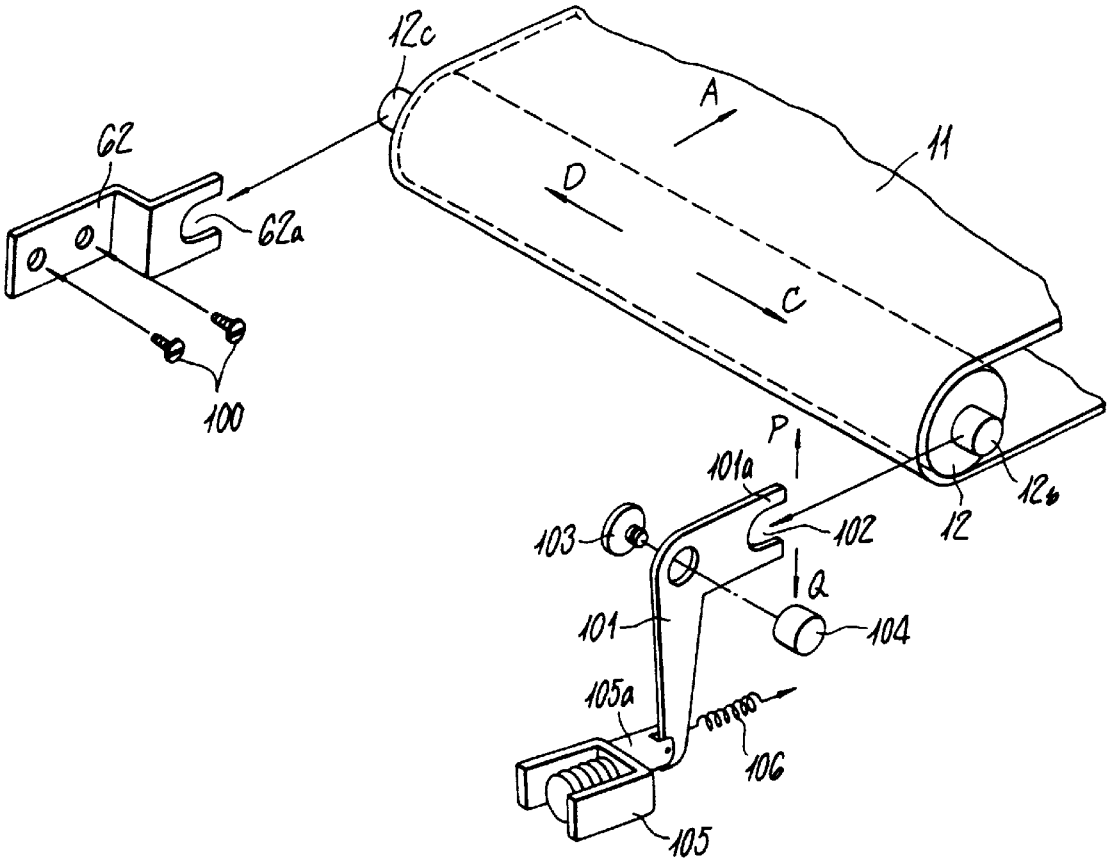
FIG. 32 is a perspective view of one form of offset control means.

FIG. 32 shows one form of offset control means. Specifically, one axial end 12c of the roller 12 which carries the record 11 is received in a notch 62a formed in the bracket 62 which is fixedly mounted on the side plate 67 (FIG. 8) of the printer by set screws 100. The other axial end 12b the roller is received in a notch 102 formed in a control piece 101a which is formed on one end of a generally L-shaped control arm 101.

At its bend, the control arm 101 is rotatably mounted on a pin 104 which is secured to the side plate 60 (FIG. 4) by set screw 103. The opposite end of the control arm 101 which is remote from the control piece 101a is connected with one end of a tension spring 106 and also with a rod 105 of a solenoid 105. When the solenoid 105 is deenergized, the spring 106 urges the control piece 101a to move in the direction of an arrow P, thus tilting the roller 12 in the same direction about the end 12c. However, when the solenoid 105 is energized, the rod 105a is retracted, thus urging the control piece 101a to move in the direction of an arrow Q, thus tilting the roller 12 in the same direction about the end 12c.

When the solenoid 105 is deenergized during the movement of the record 11 in the direction of the arrow A, the roller 12 is urged by the spring 106 to be tilted in the direction of the arrow P. Consequently, the record 11 has a tendency to produce an offset in the direction of the arrow D. If an offset of the record 11 in the direction D exceeds an allowable limit, the solenoid 105 is energized to tilt the roller 12 in the direction of the arrow Q. The resulting tilting prevents a further offset of the record 11 in the direction of the arrow D, and the record 11 then tends to shift in the direction C, thus compensating for an offset in the direction D. If an offset of the record 11 in the direction C which occurs as a result of energization of the solenoid 105 exceeds an allowable limit, the solenoid 105 may be deenergized, thus compensating for an offset in the direction C.

In the arrangement described above, it is necessary to provide a tilting motion of the roller of a magnitude which is greater than necessary to provide an offset control. Accordingly, stops, not shown, may be suitably located on the path of movement of the control arm 101, thus preventing greater movement of the control arm than necessary.

In the offset control means shown in FIG. 32, the follower roller 12 is disposed so as to be tiltable about its one end which serves as a fulcrum point while permitting a vertical movement of the other end to compensate for an offset of the belt. However, an offset of the belt may also be compensated for by changing the distance between the opposite axial ends of the follower roller 12 and the opposite axial ends of the drive roller 13. As mentioned previously, a tension is maintained in the record 11 by the spring 27 (FIGS. 5 and 6). If the spring force FL and FR (FIG. 26) applied to the opposite axial ends of the follower roller 12 is chosen such that FL>FR, for example, the record 11 is biased to be offset in the direction of the arrow D. On the other hand, the axial end (shown at 12b in FIG. 32) of the follower roller 12 to which the spring force FL is applied may be engaged with the control arm so that when the sensor 96a produces an offset detection signal, the control arm is rocked to change the forces applied to the opposite sides of the record 11 such that FL>FR. As a result, the record 11 will be displaced in the direction of the arrow C. Such displacement in the direction of the arrow C can be stopped when the sensor 26a detects the detection pattern 95a.

Alternatively, the opposite ends of the follower roller 12 may be engaged with separate control arms so that the roller may be tilted either vertically or horizontally in response to an offset detection signal from offset detecting means.

While a combination of solenoid and tension spring is used as drive means associated with the control arm in the described arrangement, it should be understood that such drive means is not limited thereto, but may utilize a motor, the rotation of which is transmitted through an electromagnetic clutch and a cam or gear to drive the control arm.

Figure 33:
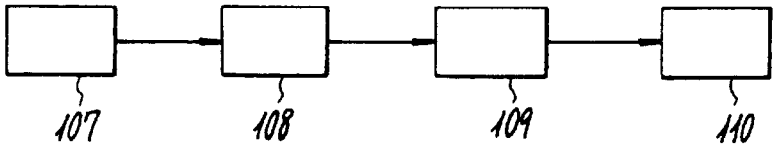
FIG. 33 is a block diagram of a control system which operates offset detecting means and offset control means in a coordinated manner.

The offset detecting means and the offset control means are effectively used in a combination. A specific example will be described with reference to FIG. 33, which represents a block diagram of an arrangement to drive the offset control means in response to a signal from the offset detecting means. Specifically, offset detecting means 107 produces a signal which indicates an offset of the record. The detection signal is fed to a decision circuit 108, which determines the direction in which and the time when the control is to occur. Such information is supplied to control signal generator 109, which in turn produces a control signal fed to offset control means 110 in order to drive or stop drive means such as solenoid contained in the offset control means 110.

The belt offset control means is located adjacent to the follower roller 12. However, as mentioned previously, the transfer charger 19 is located below the follower roller 12. In other words, the space below the follower roller 12 represents a transfer region where the toner image is transferred onto a record sheet.

Figure 88:
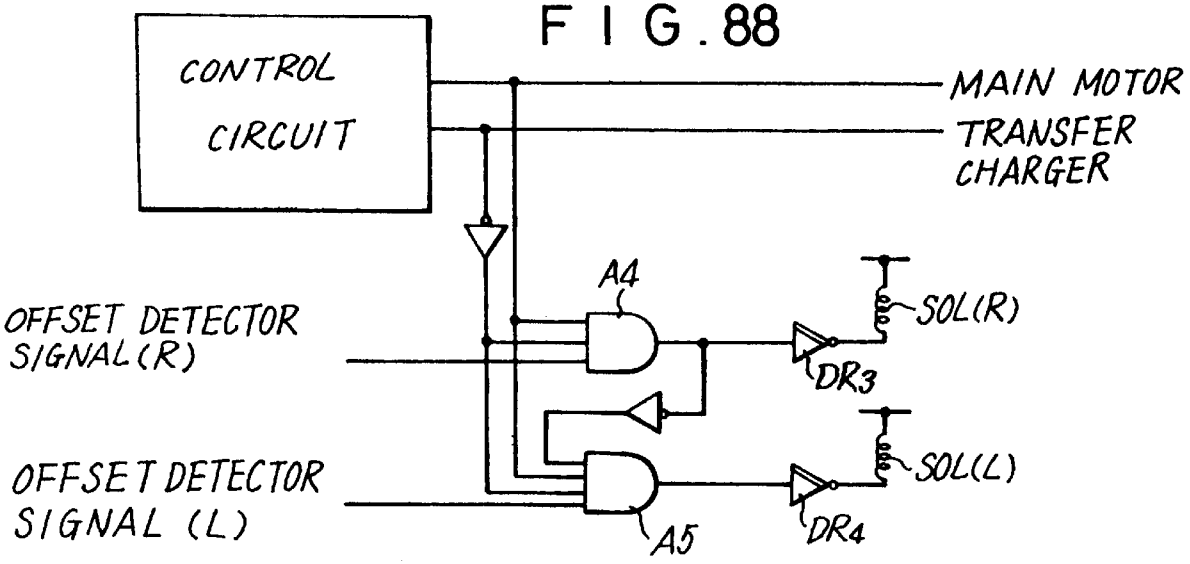
FIG. 88 is a block diagram of a circuit arrangement which detects and controls the offset of the record.
Figure 89:
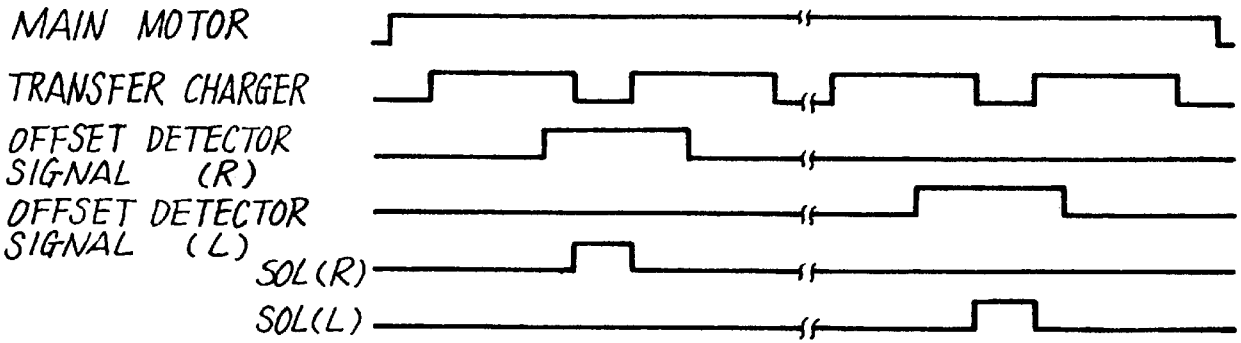
FIG. 89 is a series of timing charts, principally indicating the timing for the offset control.

FIGS. 88 and 89 show an arrangement including a pair of offset detectors (R) and (L) which are disposed adjacent to the opposite lateral edges of the record to detect an offset thereof, and also including solenoids SOL(R) and SOL(L) which cause either end of the follower roller 12 to be tilted. FIG. 89 is a series of timing charts which illustrate the operation thereof.

Specifically, an offset detection signal which is detected by a detection feeler (shown at 77 in FIG. 20) is supplied to AND gates A4, A5 together with a main motor control signal and the inversion of a transfer charger control signal, both of which are produced by a control circuit, thus driving either solenoid SOL(R, L) such as that shown at 105 in FIG. 32, for example, through a driver. To prevent the solenoids from being energized simultaneously as a result of noises, the inversion of one of the output signals is utilized as a gate signal to the other gate. It will be apparent from FIG. 88 that the solenoid can be energized or the offset control can take place only when the main motor is driving and the transfer charger is not in operation. In this manner, the offset control occurs when no transfer operation takes place, thus voiding adverse influences upon the image being formed. This also minimizes the power dissipation since the solenoid ceases to be energized whenever the main motor is at rest.

It will be understood from the foregoing description that a deformation of the record is avoided since no force is applied to the edge of the record which constrains a movement thereof. The provision of offset detecting means and the offset control means associated with the roller which operate in response to the detection signal avoids the need for a high accuracy in the construction of the record and the rollers. It will be appreciated that both the offset detecting means and the offset control means are simple in construction, preventing a complication, an increased size and an increased cost of the printer.

Drive System

Figure 13:
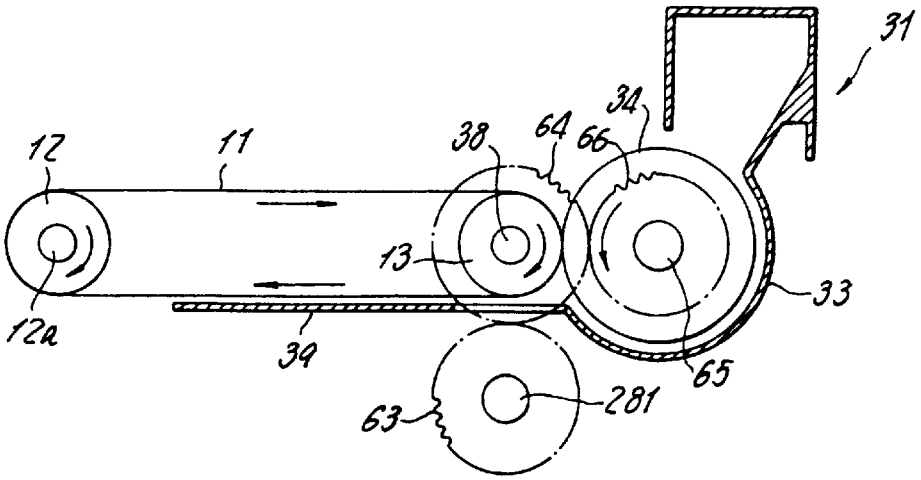
FIG. 13 is a schematic side elevation of one form of drive means associated with the record/developing unit.
Figure 14:
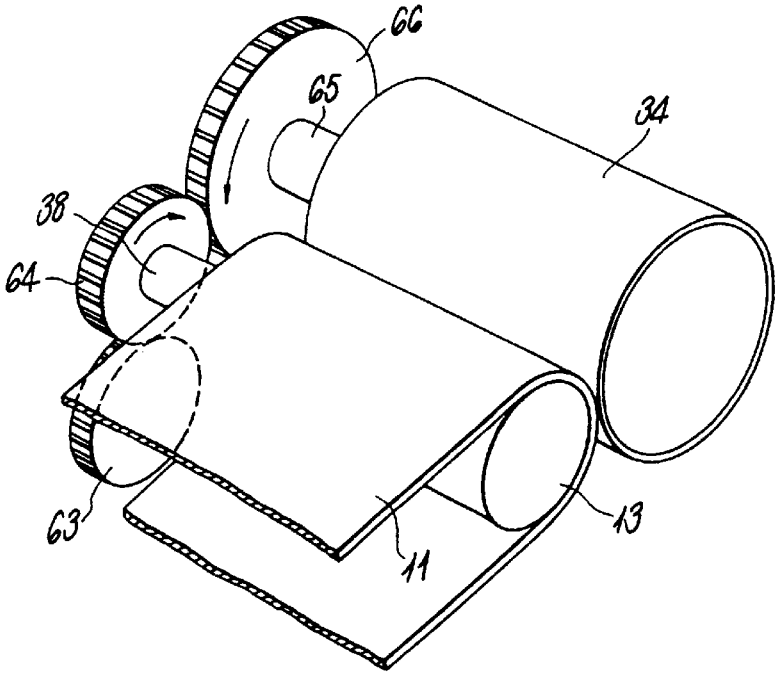
FIG. 14 is a perspective view of such drive means.

FIG. 13 shows a drive system used in the support arrangement mentioned above. The rollers 12, 13 which support and drive the record 11 and the developing sleeve 34 are substantially aligned with each other in a direction parallel to the direction in which the developing unit 31 is inserted or withdrawn. A power transmission gear 63 is disposed so as to be offset in a direction substantially normal to the direction of alignment, and is connected to a drive source associated with the printer. The gear 63 meshes with a drive gear 64 which is fixedly mounted on the rotary shaft 38 of the drive roller 13. In the example shown, the power transmission gear 63 meshes with the drive gear 64 in the lower part thereof, but it may be disposed to mesh with the gear 64 in the upper region thereof. The drive gear 64 in turn meshes with a driven gear 66 fixedly mounted on the rotary shaft 65 of the developing sleeve 34. In this manner, the power from the drive source of the printer is transmitted through the gears 63, 64 and 66. FIG. 14 is a perspective view illustrating this arrangement. This arrangement of the drive system facilitates the insertion or withdrawal of the developing unit 31 while assuring a positive power transmission when the unit 31 is inserted. As discussed above, since the record unit and the developing unit are assembled as separate unitary construction, they can be easily mounted on or dismounted from the printer while allowing a positive control of positioning. It will be understood that the clearance between the record and the developing sleeve and the individual chargers must be very closely maintained, but that according to the invention, these clearances are easily achieved to a high accuracy by the provision of a variety of positioning means even though the record/developing unit is detachable from the remainder of the printer, thus dispensing with a position adjustment while avoiding any likelihood of misalignment. It will also be noted that a large opening need not be provided as required in prior arrangements, but instead a small opening and simple guide means allow a replacement or repair of the record as well as the replenishment of a developer. The unitary construction of the record and the developing unit results in a compact and simple arrangement, and enables a facilitated replacement of the entire record, thus eliminating the likelihood that the surface of the record may be damaged or marred by the developer during the replacement. The drive system is constructed in a manner to facilitate the mounting or dismounting of these units while assuring a positive power transmission, thus preventing undue stresses from being produced during the mounting or dismounting of these units.

Figure 3:
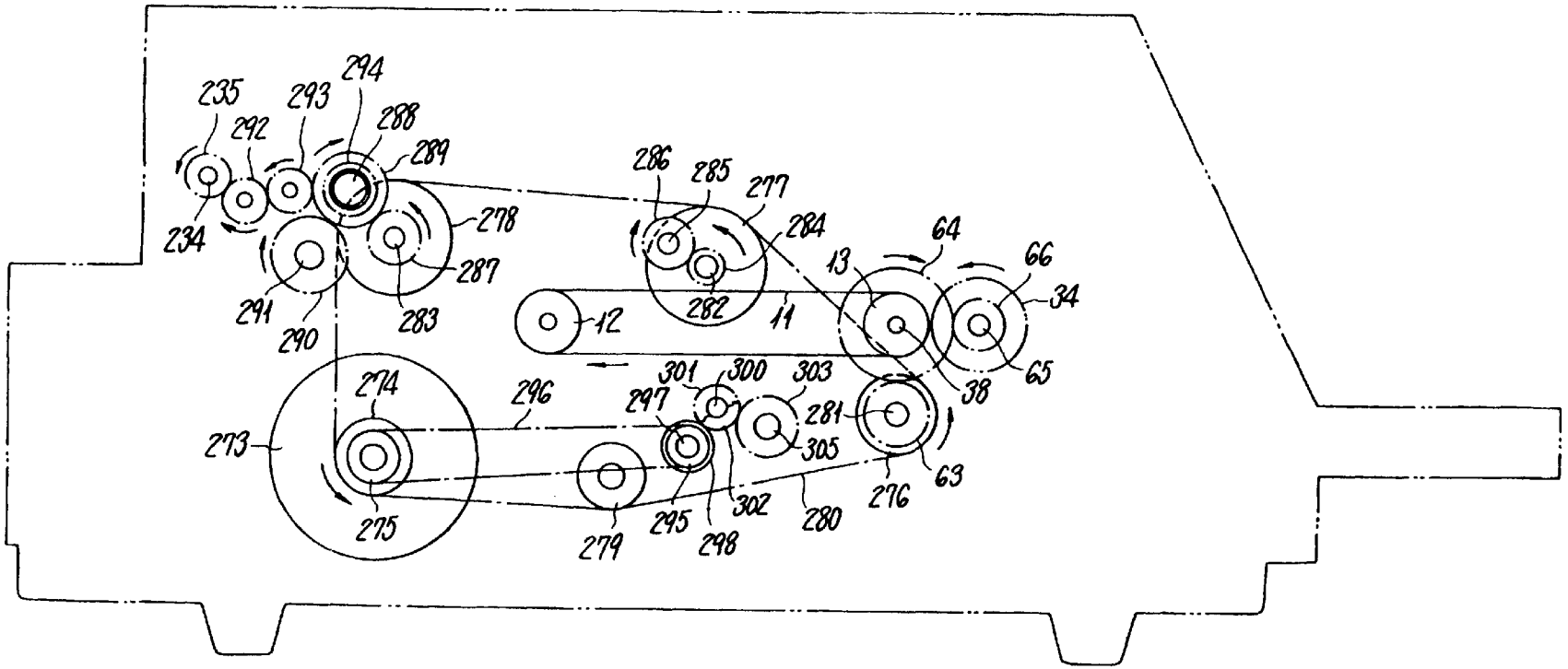
FIG. 3 is a side elevation of a drive system.

Referring to FIG. 3, a drive system used in the printer of the invention will be described. A motor 273 is utilized as a drive source, and a pair of pulleys 274, 275 are integrally mounted on its rotary shaft. An endless timing belt 280 extends around the pulley 274 as well as pulleys 276, 277, 278 and a tension pulley 279. The pulleys 276, 277, 278 are fixedly mounted on their respective shafts 281, 282, 283, respectively, Which are in turn rotatably mounted in the side plate 67 (FIGS. 4 and 8).

The gear 63 is fixedly mounted on the shaft 281, and meshes with the gear 64 which is substantially integral with the drive roller 13, as shown in FIGS. 8 and 13. The gear 64 meshes with the gear 66 on the developing sleeve 34.

The gear 284 is fixedly mounted on the shaft 282 associated with the pulley 277, and meshes with a gear 286 which is fixedly mounted on the shaft 285 associated with the cleaning roller 256.

Figure 62:
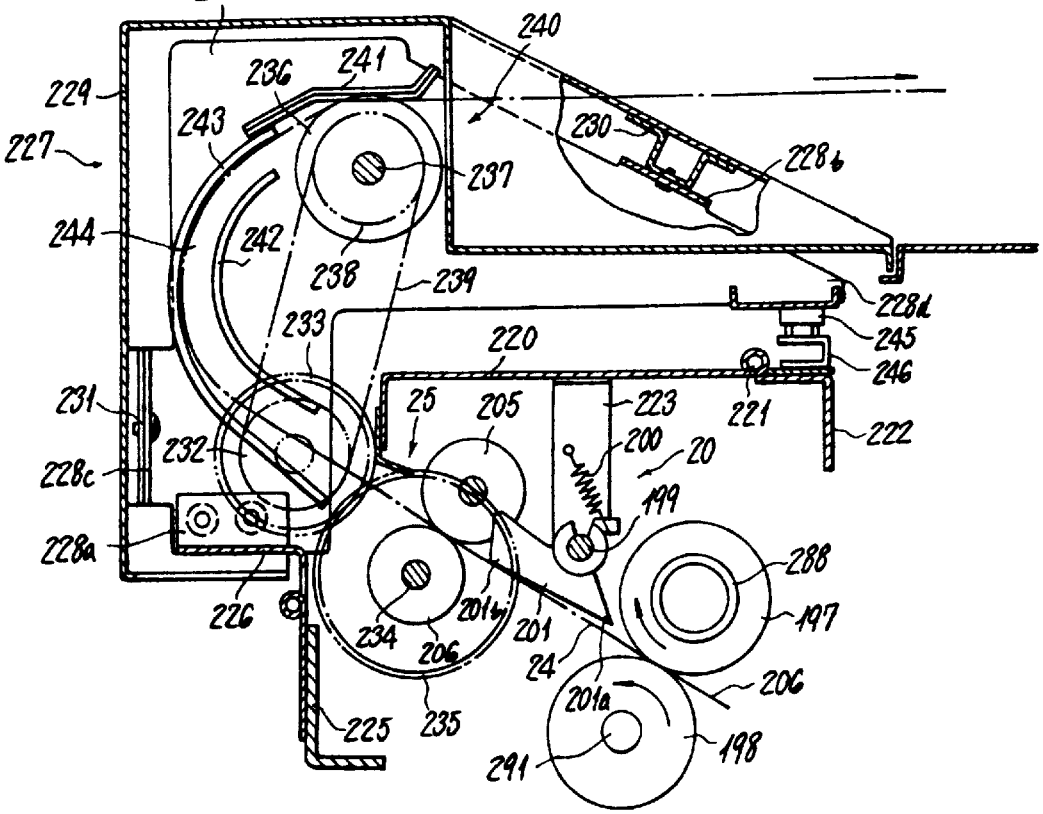
FIG. 62 is a side elevation, partly in section, of a different form of sheet delivery means, also illustrating the operation of the fixing unit.

A gear 287 is fixedly mounted on the shaft 283 associated with the pulley 278, and meshes with a gear 289 which is fixedly mounted on the shaft 288 associated with the fixing roller 197. The gear 289 meshes with a gear 290 which is integral with the shaft 291 associated with the pressure roller 198. Thus, the rollers 197, 198 rotate without relative slip therebetween. As shown in FIG. 62, a gear 235 is fixedly mounted on the shaft 234 associated with the delivery roller 206, and a pair of idle gears 292, 293 are interposed between gears 235, 289 in meshing engagement therewith. A one-way clutch 294 is provided between the gear 289 and the shaft 288 so that the drive is transmitted only in a direction from the gear 289 to the shaft 288. Consequently, when the drive system is at rest, the fixing roller 197 is freely rotatable in the conveying direction of the record sheet.

A timing belt 296 extends around the other pulley 275 on the shaft of the motor 273 and around a pulley 295. As shown in FIG. 4, the pulley 295 is mounted on the shaft 297 associated with the lower roller 18b of the conveyor roller pair 18, with a conveyor clutch 299 interposed therebetween which comprises a solenoid clutch. When the conveyor clutch 299 is energized, the pulley 295 and the shaft 297 are coupled together for integral rotation. This condition is referred to as an on-condition of the clutch. A gear 298 is fixedly mounted on the shaft 297 associated with the lower roller 18b, and meshes with a gear 301 fixedly mounted on one end of the shaft 300 associated with the upper roller 18a. As shown in FIG. 4, a gear 302 is fixedly mounted on the other end of the shaft 300, and meshes with a gear 303 which is in turn mounted on the shaft 305 associated with the feed roller 17, with a feed clutch 304 interposed therebetween which comprises a solenoid clutch. When the feed clutch 304 is energized, the rotation of the gear 303 is transmitted to the shaft 305, causing the feed roller 17 to rotate in the feed direction. The feed roller 17 is mounted on the shaft 305 with a one-way rotary clutch 306 interposed therebetween as shown in FIG. 2, and is freely rotatable when the shaft 305 does not rotate. It will be seen from the above description that the single motor is utilized as the sole drive source in the printer of the invention. The drive from the motor as well as the operation of various sensors and solenoid clutches will be described later.

Exposure/Charging Unit

Referring back to FIG. 22, it was mentioned that the record 11 is divided into four regions which are differentiated from each other in respects of the planarity and the speed response. Of these four regions, a variation in the relative position of the record surface with respect to other devices or units is minimized in the tensioned, linear region G and the driven, curved region $E_1$. The feed rate of the record is stabilized in the driven, curved region $E_1$ and the tensioned, linear region $G_1$ in the proximity of the region $E_1$. The other or slackened linear region G is subject to a variation in the position and the feed rate of the record surface as a result of undulations while the other or follower, curved region E is subject to a variation in the feed rate.

In consideration of the varying responses of the individual regions of the record 11 as mentioned above, it is found that it is desirable to perform the charging, exposure and developing steps, all of which are most significant in the formation of an image, during a movement of the record 11 from the tensioned, linear region $G_1$ toward the driven, curved region $E_1$.

More specifically, the above requirement can be satisfied by choosing the exposure station at a location within the linear region $G_1$ which is immediately before the point where a contact between the record 11 and the drive roller 13 occurs and where a variation in the record surface is minimal and a variation in the speed is minimized. Similarly, the developing station is chosen in the curved region $E_1$ where the record 11 is in contact with the drive roller 13 to minimize a change in the developing gap and the running speed. Finally, the charger 14 is disposed in the tension region $G_1$ where the record extends rectilinearly and a variation of the record surface is minimized.

The exposure unit 15 comprises a gas laser such as He-Ne laser or a semiconductor laser as a light source, the beam of which is modulated and deflected to scan the record surface with a beam spot having a varying light intensity (sub-scan). However, it should be understood that the printer of the invention is not limited to this type of exposure. By disposing the exposure unit so that it irradiates the record 11 in its planar region (or linear region) before the planar region turns into a curved region, the adjustment of the parallelism of the scan beam crosswise of the record is facilitated.

Specifically, referring to FIG. 2, it will be seen that the charger 14 is disposed in the tension, linear region of the record 11, the exposure unit 15 is disposed to direct its imagewise radiation toward the linear region of the record immediately before the linear region enters the curved region. It is to be noted that the charger 14 is of Scorotron type.

The charger 14 is of Scorotron type as shown in FIG. 2, and includes a discharge electrode 249 and a grid 250 connected to respective voltage sources, not shown, and which are encased within a shielded casing 251. The charger 14 is also detachably mounted on the printer and is movable in the same direction as the transfer charger 19. It will be recognized that both the charger 14 and the transfer charger 19 radiate a corona discharge of the same polarity toward the record 11 and the rear surface of the record sheet.

Sheet Feeder

In accordance with the invention, when the top cover of a tray is opened, a bottom plate is automatically lowered to permit a replenishment of record sheets.in to the tray. When the top cover is closed, the bottom plate is resiliently urged upward in an automatic manner, thus enabling a sheet feeding operation. Thus, with this sheet feeder, a simple operation of opening or closing the top cover is all that is required to perform a replenishment of record sheets. Also, in this sheet feeder, the printer need not be provided with a raising member, thus simplifying the construction of the printer.

The printer of the invention includes a detector assembly in which a single sensor is capable of detecting the presence or absence of record sheets and also capable of detecting whether the bottom plate urges the record sheets against the feed roller to enable a normal feed operation whenever the top cover is closed. In addition, the printer is provided with a paper reset mechanism which positively returns those record sheets which are held between the feed roller and the friction pad into the tray as the bottom plate is lowered during a replenishment of record sheets.

In FIG. 2, a sheet feeder is generally shown by numeral 130. Record sheets contained in the sheet feeder can be fed, one by one, beginning with the uppermost one, by the cooperation between the feed roller 17 and a friction pad 131 to move along a guide plate 132 into the nip between a pair of conveyor rollers 18. The presence or absence of a record sheet or sheets in the sheet feeder 130 is detected by a paper end sensor 133.

The sheet feeder 130 includes a tray 3 in the form of a box having an open top. A rear portion of the bottom of the tray 3 is defined by a fixed bottom plate 134 while a front portion is formed by a movable bottom plate 135. The movable bottom plate 135 is in effect pivotally mounted on the tray 3 at its rear end 136 so as to be tiltable in a vertical plane about the rear end. A coiled compression spring 137 urges the movable bottom plate 135 upward, as viewed in FIG. 2. A top cover 4 is pivotally mounted on a pin 138 at its one end and is adapted to cover the top of the tray 3.

Figure 44:
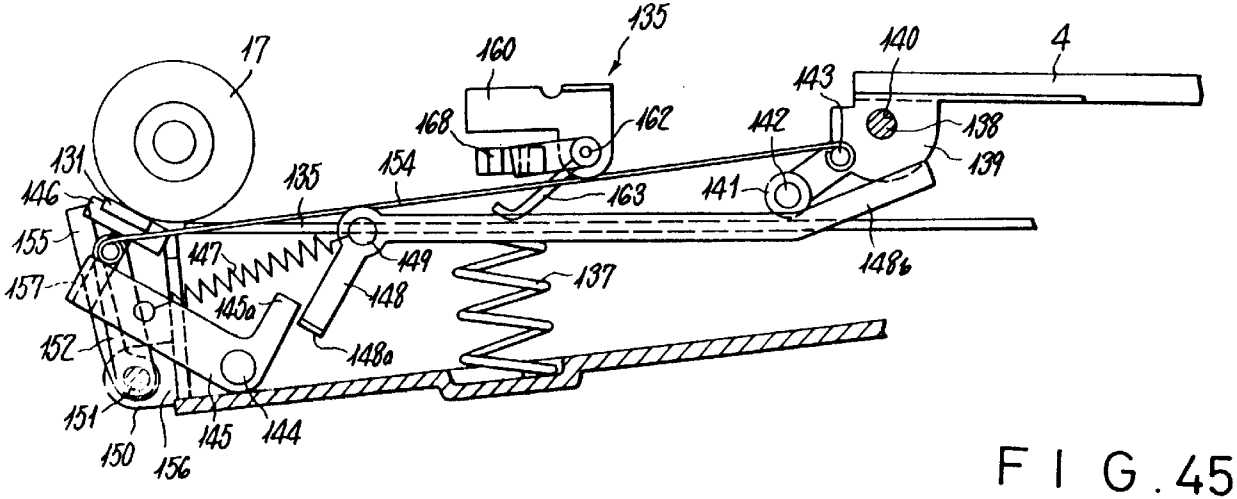
FIG. 44 is a side elevation of essential parts of sheet feeder, with a side plate of a tray containing record sheets removed.

Referring to FIG. 44, it will be noted that the front end of the top cover 4 is provided with a pair of bearing pieces 139 on the opposite sides thereof. The pin 138 is fixedly mounted on side plates (not shown) of the tray 3. The bearing piece 139 includes a stub shaft 142 on which a roller 141 is mounted. It is to be understood that a pair of rollers 141 are provided in opposing relationship with each other on the opposite lateral sides of the movable bottom plate 135. A detent pin 143 is fixedly mounted on the bearing piece 139.

At the front end, the side plate of the tray fixedly carries a pivot pin 144 on which a friction arm 145 is rockably mounted. On its one end, the friction arm carries a friction pad 131 formed by a material such as rubber or the like and secured to a support 146. The friction pad 131 is maintained in abutment against the feed roller 17 under the resilience of a coiled tension spring 147 which has its one end engaged with the arm 145. It is to be understood that a pair of friction arms 145 are pivotally mounted on the opposite side plates of the tray and are connected with each other so that the friction pad 131 is located substantially midway therebetween. The other end of the spring 147 is anchored to a pin 149 which is fixedly mounted on the side plate, not shown, of the tray. An interlock lever 148 is rockably mounted on the pin, and includes one end 148a which is folded to be located opposite to one end 145a of the arm 145. The other end 148b of the interlock lever 148 extends to a location below the stub shaft 142 on which the roller 141 is mounted. It is to be understood that the shaft 142 extends long enough to be engageable with the other end 148b of the lever.

Figure 46:
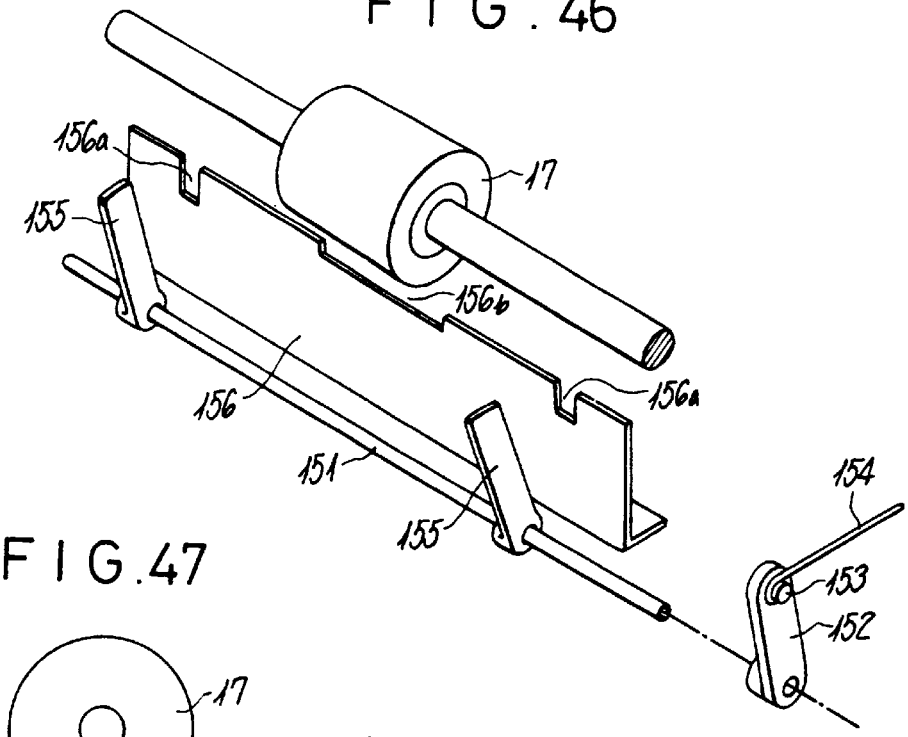
FIG. 46 is a fragmentary perspective view of the sheet feeder.

At the front end of the tray 3, both of the side plates are formed with a pair of arms 150 (only one being shown), across which a support shaft 151 extends. As shown in FIG. 46, a rocking lever 152 is fixedly mounted on one end of the support shaft 151, and fixedly carries a pin 153 on its free end, to which one end of a connecting rod 154 is connected.

Figure 45:
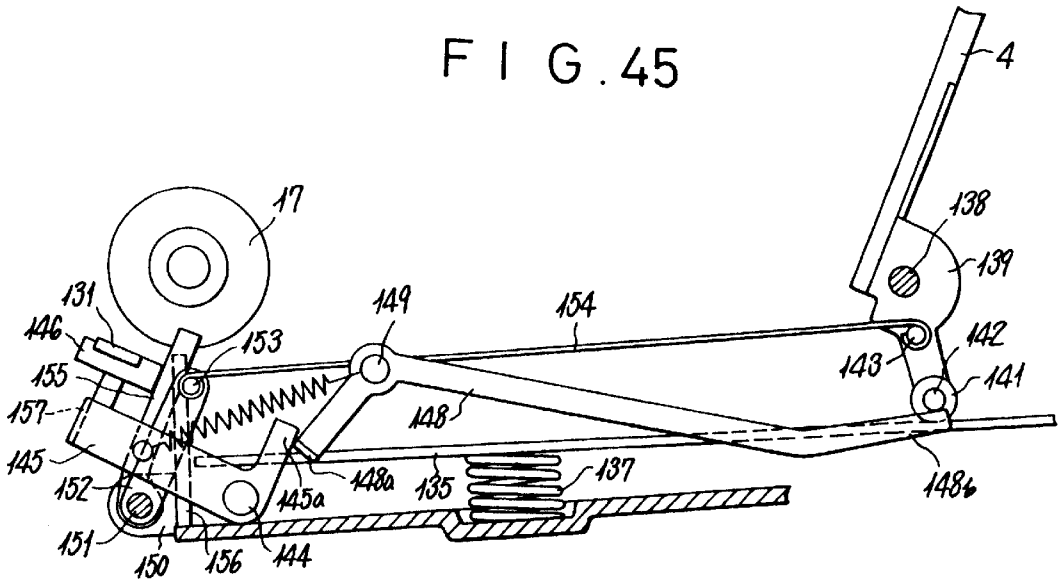
FIG. 45 illustrates the operation of the sheet feeder shown in FIG. 44.

The other end of the connecting rod being secured to the detent pin 143. A pair of paper reset levers 155 are fixedly mounted on the support shaft 151, and are spaced apart to locate the feed roller 17 therebetween, as shown in FIG. 46. It is to be noted that the free end of the paper reset levers 155 is located above the upper edge of a front plate 156 of the tray (FIGS. 44 and 45). The front plate 156 is formed with notches 156 to receive the levers 155 as they rock, and are also formed with a notch 156b which is adapted to receive the friction pad 131.

As shown in FIG. 44, when the top cover 4 is closed, the friction pad 131 bears against the feed roller 17 while the paper reset levers 155 are removed from the front plate 156. The compression spring 137 urges the movable bottom plate 135 upward against the lower periphery of the feed roller 17. If a stack of record sheets is placed on the bottom plate 135, an uppermost one of the record sheets will be held against the lower periphery of the feed roller 17.

A loading operation of record sheets will now be described.

The top cover 4 which assumes its closed position in FIG. 44 may be opened by turning it counterclockwise about the pin 138, whereupon the rollers 141 mounted on the bearing pieces 139 bear against the movable bottom plate 135 to move it down against the resilience of the spring 137, as shown in FIG. 45. Subsequently, a stack of record sheets may be inserted between the top cover 4 which assumes an open position and the movable bottom plate 135 and moved forward until their leading edge bears against the front plate 156. Subsequently, the top cover 4 may be closed as shown in FIG. 44, whereupon the spring 137 urges the bottom plate 135 upward, whereby an uppermost one of the record sheets in the stack is held against the peripheral surface of the feed roller 17.

It will be appreciated that the record sheets may be replenished when the paper end sensor 133, to be described later, detects the absence of record sheets and provides a corresponding indication to an operator, and also when it is desired to add record sheets to the remaining supply of record sheets within the tray. In the latter instance, a plurality of record sheets have their leading end held between the feed roller 17 and the friction pad 131, and hence, these record sheets must be returned into the tray.

When the record sheets are added to the remaining supply of record sheets within the tray, as the top cover 44 which is closed as shown in FIG. 44 is moved to its open position shown in FIG. 45, a corresponding movement of the connecting rod 154 acts through the rocking lever 152 and the support shaft 151 to rock the paper reset levers 155 clockwise. Simultaneously, the shaft 142 engages the end 148b of the interlock lever 148 to cause it to rock clockwise, whereby the other end 148a of the lever causes the friction arm 145 to rock counterclockwise. Thus, the friction pad 131 moves way from the feed roller 17 to release the leading end of any record sheet held between the pad 131 and the feed roller 17, as the top cover 4 is opened. Simultaneously, the paper reset levers 155 rock into abutment against the leading end of the record sheets which are thus released, thus returning them into the tray. In this manner, when record sheets are added to the remaining record sheets within the tray, there is no record sheet which is held between the feed roller 17 and the friction pad 131, and the added record sheets are placed on top of record sheet which are properly oriented on top of the movable bottom plate 135 which then assumes a lowered position.

Figure 47:
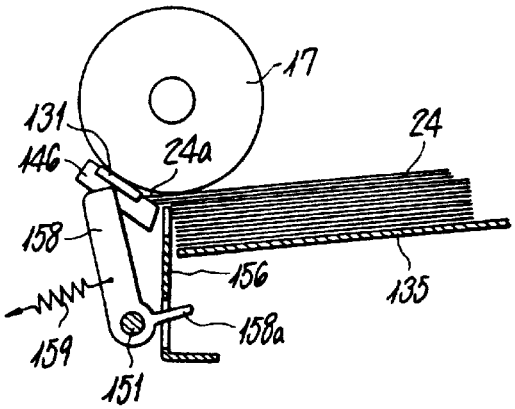
FIG. 47 is a side elevation illustrating another form of paper reset mechanism.
Figure 48:
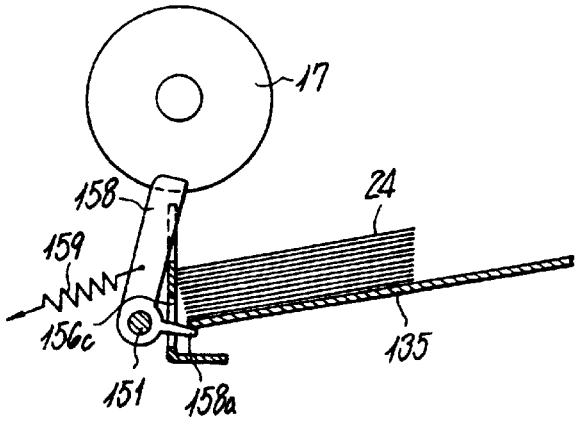
FIG. 48 illustrates the operation of the paper reset mechanism.
Figure 49:
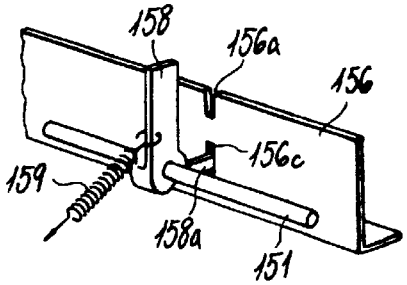
FIG. 49 is a perspective view of the reset mechanism.

In the arrangement shown in FIG. 44, the paper reset levers are caused to be moved in direct association with a movement of the top cover 4, but may be driven in association with a rocking motion of the movable bottom plate 135 which is interlocked with the top cover 4. Referring to FIGS. 47 to 49 which illustrate such an arrangement, a paper reset lever 158 is fixedly mounted on the support shaft 151, and is engaged by a spring 159, which urges it in a direction away from the front plate 156. The lever 158 is formed with an engaging piece 158a, which projects through a slot 156c formed in the front plate into the tray so as to be engageable with the front edge of the movable bottom plate 135.

In FIG. 47, as the top cover 4 is opened (FIG. 44), the movable bottom plate 135 is lowered as shown in FIG. 48. At the same time, the friction pad 131 moves away from the periphery of the feed roller 17, releasing the leading edges 24a of any record sheets 24 held therebetween. As the bottom plate 135 moves down, its front edge engages the engaging piece 158a to cause the paper reset lever 158 to rock to an angular position shown in FIG. 48. As the lever 158 rocks in this manner, record sheet which is located above the upper edge of the front plate 156 is urged, at its leading edge, by the lever 158 to be returned onto the remainder of record sheets which move down together with the bottom plate. After replenishment of fresh record sheets, closing the top cover allows the movable bottom plate 135 to move upward, whereby the paper reset lever 158 is returned to the position shown in FIG. 47 under the resilience of the spring 159.

Figure 50:
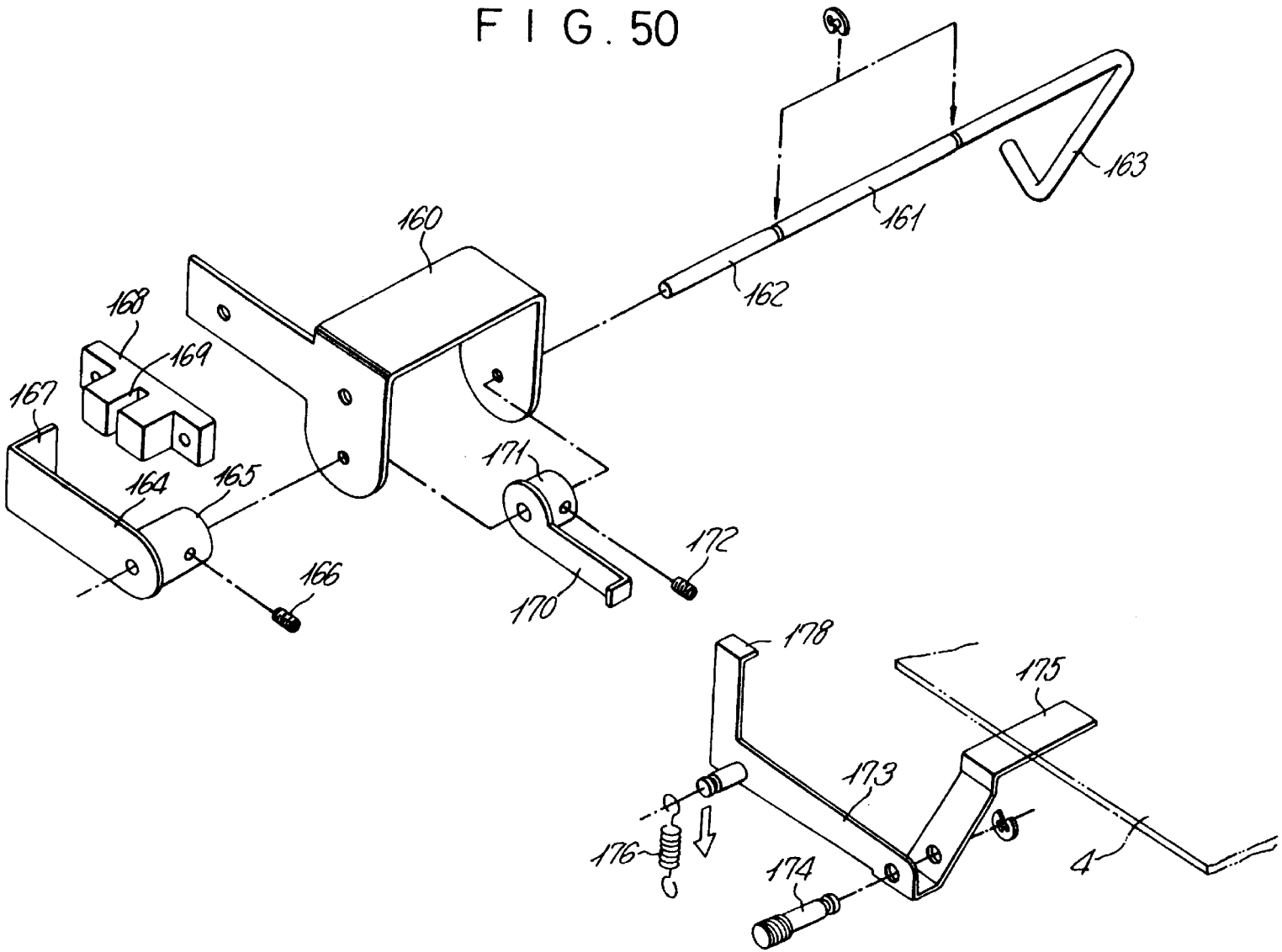
FIG. 50 is an exploded, perspective view of a record sheet sensor.
Figure 51:
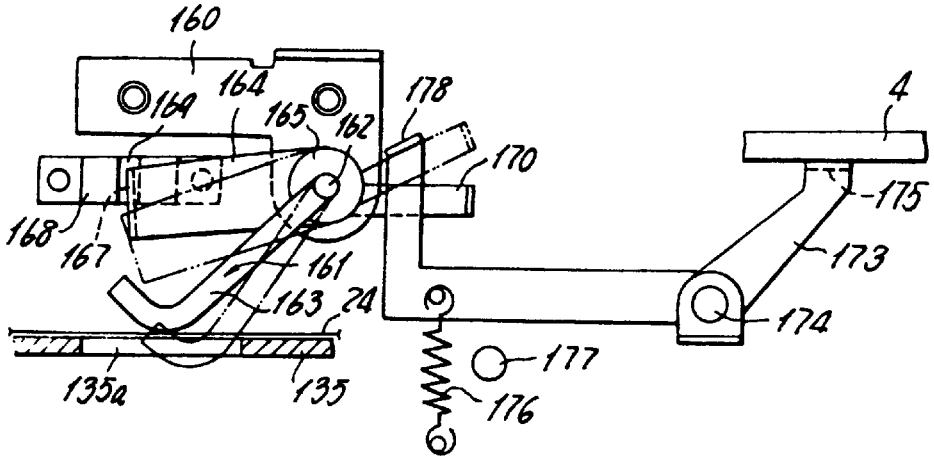
FIGS. 51 and 52 are side elevations illustrating the operation of the sensor.
Figure 52:
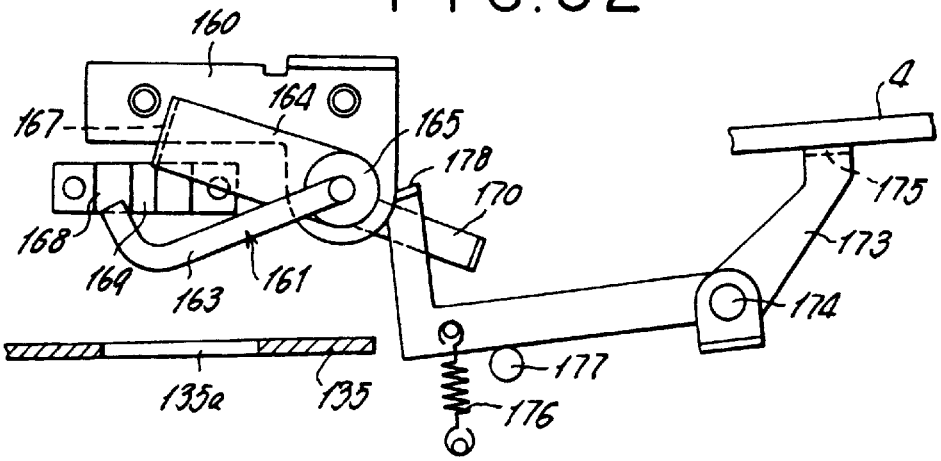
Figure 53:
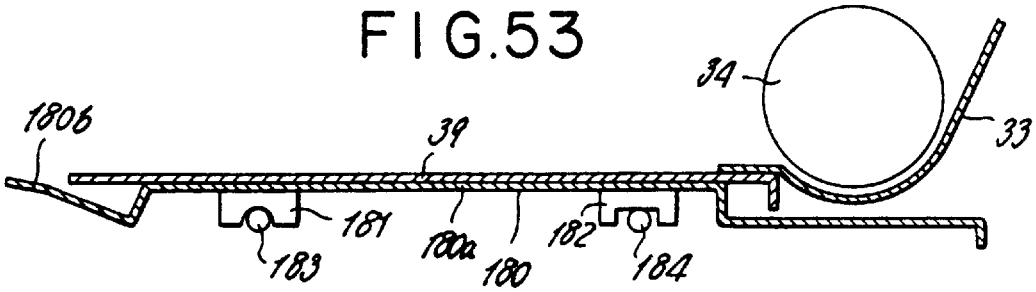
FIG. 53 is a side elevation, partly in section, of one form of record sheet guide cover.

Returning to FIG. 44, a bracket 160 is fixedly mounted above the bottom plate 135, as viewed in FIG. 44. As shown in more detail in FIGS. 50 to 52, the bracket 160 rotatably carries the shank 162 of a feeler 161 having an active end 163 which is aligned with an opening 135a formed in the movable bottom plate 135. If any record sheet 24 is present in the bottom plate 135, it rests thereon to assume an angular position shown in solid line in FIG. 51. However, when there is no record sheet on the bottom plate, it falls into there opening 135a by gravity, and assumes an angular position shown in phantom line in FIG. 51. A detector plate 164 is integral with a hub 165 which is secured to the end of the shank 162 by means of a screw 166, and carries a shutter blade 167 on its free end which is disposed for selective movement into a gap 169 formed in a photoelectric switch 168 comprising oppositely disposed light emitting element and light receiving element, thus selectively intercepting the optical path between these elements. The detector plate 164 is positioned so that the shutter blade 167 is disposed within the gap 169 whenever the feeler 161 assumes the angular position shown in solid line in FIG. 51 while the shutter blade 167 is disposed within the gap 169 whenever the feeler 161 assumes the angular position shown in solid line in FIG. 51 while the shutter blade 167 is located out of the gap 169 whenever the feeler 161 assumes the angular position shown in phantom line in FIG. 51. Accordingly, the photoelectric switch 168 produces a signal when the optical path is intercepted, which is different from a signal produced when the optical path is not intercepted. This signal is fed to a control unit. Such control may enable a record operation for the sheet feeder only when the optical path is intercepted. It will be noted that an interlock wing 170 having a hub 171 is secured to the shank 162 of the feeler 161 by means of a screw 172. Another feeler 173 is pivotally mounted on a pin 174 which is secured to the side plate of the tray 3 and includes an active end 175 which is adapted to selectively engage the lower surface of the top cover 4. When the top cover 4 is in its normally closed position, the feeler assumes an angular position spaced from a stop pin 177 against the resilience of a bias spring 176, as indicated in solid line in FIG. 51. When the top cover 4 is swung more than a given angle in the opening direction from its closed position shown, the feeler 173 moves angularly into abutment against the stop pin 177 under the resilience of the spring 176, as shown in FIG. 52. The other end 178 of the feeler 173 is adapted to engage the interlock wing 170 selectively. When the top cover 4 assumes its closed position, it permits a free movement of the active end 163, detector plate 164 and interlock wing 170 between their solid line positions as indicated in FIG. 51. However, when the top cover 4 is swung from its closed position and the feeler is caused by the spring 176 to move counterclockwise, the end 178 of the feeler 173 engages the interlock wing 170 to thereby drive the detector plate 164 until the shutter blade 167 thereof moves out of the gap 169.

Accordingly, the shutter blade 167 of the detector plage 164 can be placed within the gap 169 of the photoelectric switch 168 when at least one record sheet 24 is present on the movable plate 153 and the top cover 4 is in its normal closed position, as shown in solid line in FIG. 51. When no record sheet 24 is present on the bottom plate 135, the active end 163 of the feeler 161 falls into the opening 135a, as indicated in phantom line in FIG. 51, whereby the detector plate 164 moves counterclockwise, as viewed in FIG. 51, causing the shutter blade 167 to move downwardly and out of the gap 169. When the top cover 4 is not in its normal closed position, the combination of the feeler 173 and the interlockwing 170 causes the detector plate 164 to move clockwise, as viewed in FIG. 52, thus moving the shutter blade upwardly and out of the gap 169. At this time, the feeler 163 is raised upward above the bottom plate 135, thus facilitating a replenishment of record sheets. It will be seen that the single photoelectric switch allows the detection of the presence or absence of a record sheet or sheets on the bottom plate and the detection of open or closed position of the top cover.

The feed roller 17 is located above the front plate 156 of the tray 4, and is substantially centered crosswise of the tray (FIGS. 2 and 4). As will be evident from FIG. 4, the feed roller 17 is in staggered relationship with the peripheral surface of the upper roller 18a in the roller pair 18. The upper roller 18a and the lower roller 18b are disposed in abutment against each other. The drive to these rollers will be described later.

A register sensor 179 is disposed downstream of the roller pair 18, as viewed in the direction in which the record sheet 24 is conveyed (FIG. 2). The purpose of the register sensor is to detect a record sheet from the tray 4 which is held between the roller pair 18. When it detects a record sheet, it produces a signal to interrupt the rotating drive to the roller pair 18 and the feed roller 17, as will be further described later.

Figure 54:
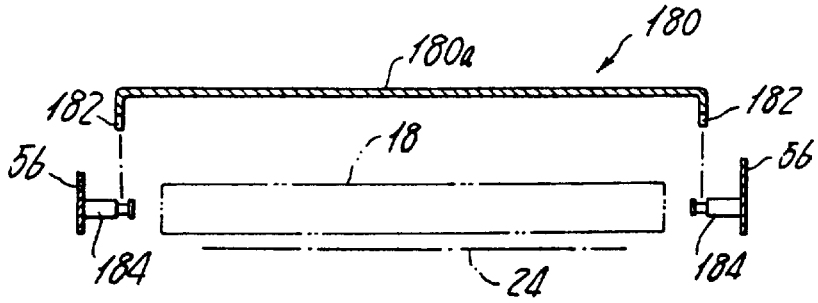
FIG. 54 is a front view of the guide cover.

A mechanism which prevents the sheet feeder from being contaminated will now be described. Referring to FIG. 2, a record sheet guide cover 180 is disposed below the record/developing unit 5, and extends over a region which is sufficient to protect the record sheet and its conveying path from any falling developer. The guide cover 180 is disposed intermediate the side plates 60, 67 by having positioning pieces 181, 182 formed on their opposite sides (only one each of them being shown) engaged with positioning pins 183, 184, which are fixedly mounted on the guide plates 56, FIGS. 8 and 54 showing only one of them.

The guide cover 180 comprises a cover body 180a on which the positioning pieces 181, 182 are formed, and a front guide 180b which is shaped by folding the front edge of the body 180a. The guide cover 180 is detachably mounted on the positioning pins 183, 184 in a space which is left after the record/developing unit 5 has been removed out of the printer. The cooperation between the positioning pins 183, 184 and the positioning pieces 181, 182 allows the location of the guide cover to be adjusted in the fore-and-aft direction. FIG. 54 illustrates that the guide cover extends over a region which is greater in lateral width than the roller pair 18 and a record sheet 24. After the record/developing unit 5 is loaded into the printer when the guide cover 180 is mounted in place, the bottom plate 39 of the receiver 35 prevents an upward movement of the cover.

When mounted in place within the printer, the front guide 180b of the guide cover 180 defines a record sheet passage 186 by cooperating with a guide plate 185 which is fixedly mounted within the printer. It will be seen that the guide cover 180 provides an isolation between an image forming region inclusive of the record 11 and the cleaning unit 22 on one hand and the record sheet and its passage on the other hand even though the unit 5 is either entirely or partly withdrawn from the printer for replacing the record or replenishing the developer, thus preventing a contamination which is attributable to a falling developer or floating developer.

In addition, the front guide 180b of the cover 180 defines a passage for the record sheet so as to maintain a proper orientation of the record sheet as it is being conveyed to the transfer station. An advantage can be obtained by avoiding the fixed mounting of the cover on the printer. Specifically, the feed roller 17 must be cleaned periodically since a reduction in the coefficient of friction of the peripheral surface of the roller prevents a normal feed operation. During such cleaning operation, the unit 5 may be withdrawn and then the guide cover 180 can be dismounted from the positioning pins 183, 184 by shifting it upwardly, whereupon an access through the opening of the printer is obtained to perform a maintenance work.

Figure 55:
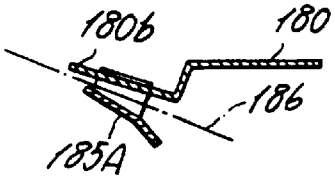
FIG. 55 is a fragmentary side elevation, partly in section, of a different form of guide cover.

In the above description, the guide plate 185 which defines the passage 186 is mounted on ths printer, but a guide plate 185A which is substantially integral with the front guide 180b may be provided as illustrated in FIG. 55.

Figure 56:
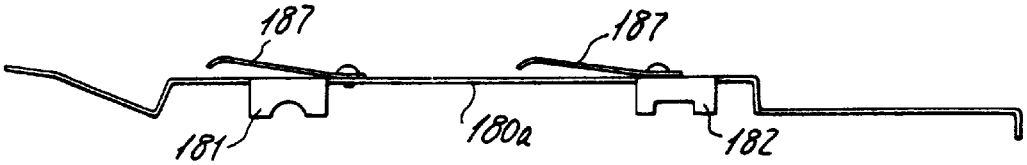
FIGS. 56 and 57 are side elevations of different forms of guide covers.
Figure 57:
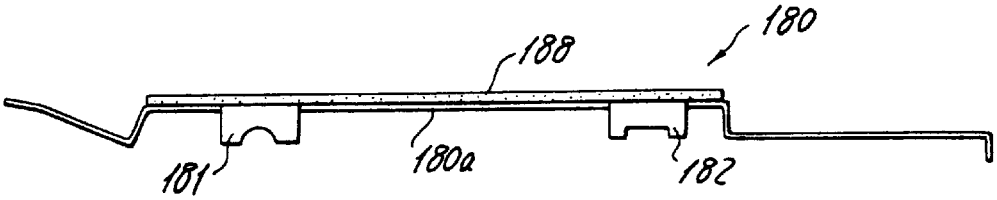

FIGS. 56 and 57 show different forms of guide cover 180. Specifically, leaf springs 187 or a strip of foam material 188 may be secured to the upper surface of the cover body 180a to prevent any unintended movement or rattling between the bottom plate 39 of the unit 5 and the upper surface of the cover.

Transfer Unit

The transfer charger 19 comprises a discharge electrode 247 connected to a high tension voltage source, not shown, encased within a shielded casing 248. By opening the side plate 8 of the printer (FIG. 1), the transfer charger 19 can be withdrawn in a direction indicated by the arrow.

Fixing Unit

The printer of the invention employs a fixing unit of roller type.

In the fixing unit of the invention, a delivery roller is driven at a peripheral speed which is greater than that of the fixing roller so that a tension is maintained in the record sheet as it is being conveyed by both of the rollers, and acts as a drive source, which cooperates with a member projecting into a path of movement of the record sheet to cause an angular movement of the separation claw so that it is removed from the roller. In this manner, the separation claw can be moved into contact with or away from the fixing roller in a simple arrangement.

Figure 61:
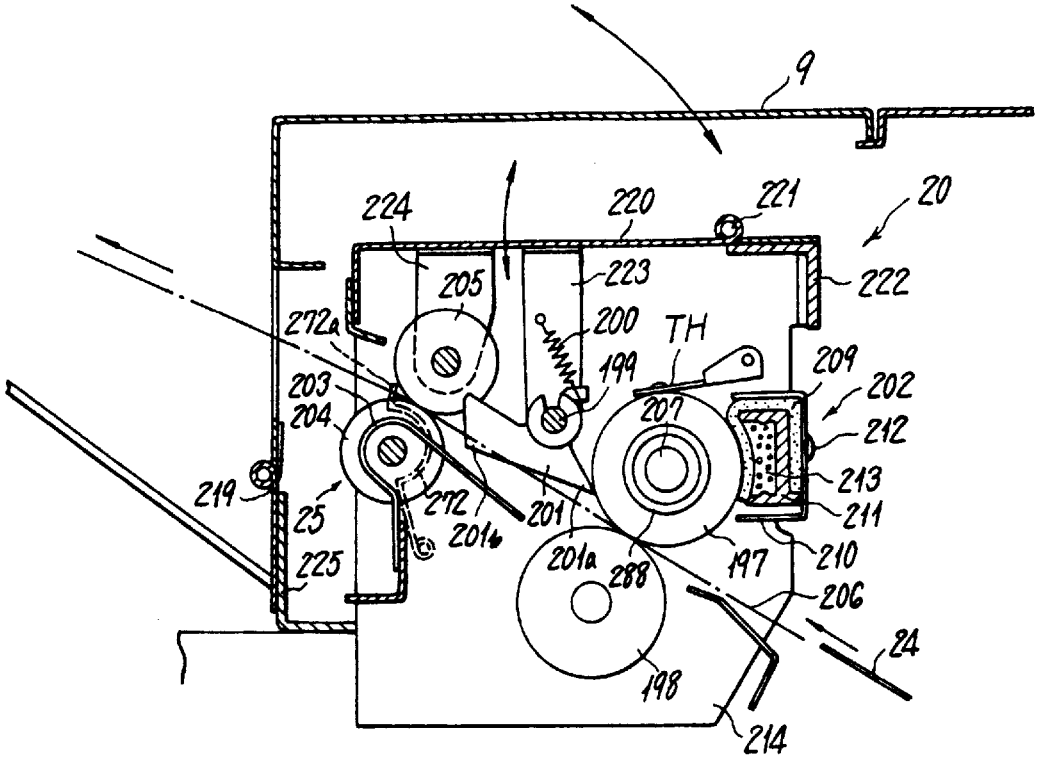
FIG. 61 is a side elevation, partly in section, of a fixing unit and sheet delivery means.

Referring to FIG. 61, the fixing unit includes a pair of fixing roller 197 and pressure roller 198 which are disposed in abutment against each other. Either heat or pressure fixing technique may be employed. For example, when heat fixing technique is employed, there is provided one-revolution clutch or slip friction mechanism which operates to apply a required magntitude of pressure between the rollers only during the time when the record sheet 24 passes therebetween. The fixing roller 197 is associated with a separation claw 201 which is rotatably mounted on a shaft 199 and urged to rotate counterclockwise by a spring 200 and having its free end 201a disposed in contact with the surface of the fixing roller 197, and a cleaning mechanism 202 which operates to wipe off any toner which may be deposited on the roller surface. A delivery roller pair 25 including a pair of rollers 204, 205 are disposed on the exit side of the fixing roller pair, with a guide plate 203 interposed therebetween. In this manner, a coveying path 206 for the record sheet is defined as shown in phantom line in FIG. 61. A delivered sheet sensor 272 is disposed along the path 206 to detect the presence of any record sheet which moves along the path. In FIG. 61, only the feeler of the sensor 272 is shown, with its free end 272a located on the path 206.

It is to be noted that the peripheral speed of the fixing roller 197 is chosen to be less than the peripheral speed of the roller pair 25. The separation claw 201 is also formed with a protuberrance 201b which is located on the opposite site from the free end 201a and which projects onto the path 206 when the free 201a is maintained in contact with the fixing roller 197.

In operation, the record sheet 24 bearing an unfixed toner image thereon is fed between the fixing roller 197 and the pressure roller 198 for purpose of fixing. The leading end of the record sheet 24 is separated from the fixing roller 197 by the free end 201a of the claw 201 which is maintained in contact with the roller 197 under the resilience of the spring 200, and moves along the guide plate 203 toward the delivery roller pair 25. When the leading end of the record sheet 24 reaches the nip between the roller pair 25, it is fed while it is being held between the pair of fixing roller 197 and pressure roller 198 and between the roller pair 25. Since the peripheral speed of the roller pair 25 is greater than the peripheral speed of the fixing roller 197/pressure roller 198, it will be seen that a tension is produced in the record sheet 24 located on the path 206, and the sheet is pulled toward the roller pair 25. However, the pressure acting between the fixing roller 197 and the pressure roller 198 is greater in magnitude, thereby avoiding any interference with the fixing operation. It will be seen that the protuberance 201b projects into the conveying path 206, and is urged by the tensioned record sheet 24 to cause a clockwise movement of the claw 201 as shown in FIG. 62, whereby the free end 201a moves away from the fixing roller 197. At this end, the resilience of the spring 200 which brings the claw 201 into contact with the fixing roller 197 is chosen to be less than the magnitude of the tension. As the trailing end of the record sheet 24 moves out of the nip between the fixing roller 197 and the pressure roller 198, no tension is maintained in the sheet, whereby the claw 201 returns to its initial position under the resilience of the spring 200, thus returning the free end 201a into contact with the fixing roller 197.

Accordingly, the claw 201 can be maintained removed from the fixing roller 197 during the time the record sheet 24 is being conveyed by both the pair of fixing roller 197 and pressure roller 198 and the delivery roller par 25. The free end 201a is otherwise maintained in contact with the fixing roller 197 so as to be effective in its original functioning to separate the record sheet 24 while allowing a standby mode to be available. The use of the tension in the record sheet 24 as a drive source avoids any need for the provision of a separate drive source or member to move the claw 201 into contact or away from the fixing roller, thus allowing a cost reduction in a simple manner. A difference in the peripheral speed between the fixing roller 197 and the delivery roller pair 25, which is designed to produce a tension in the record sheet 24 which is effective to serve as a drive source to move the separation claw 201, also enables a paper jamming to be prevented as a result of conveying the sheet in its taut condition. In this manner, any damage to the fixing roller 197 when the separation claw 201 is maintained in contact therewith or a reduced reliability in separating the record sheet which is attributable to the toner deposition on the free end 201a is both eliminated in a simple manner while increasing the useful life of the fixing roller 197 and the separation claw 201 to improve the separation performance, avoiding the occurrence of a jamming and increasing the operational reliability.

Figure 63:
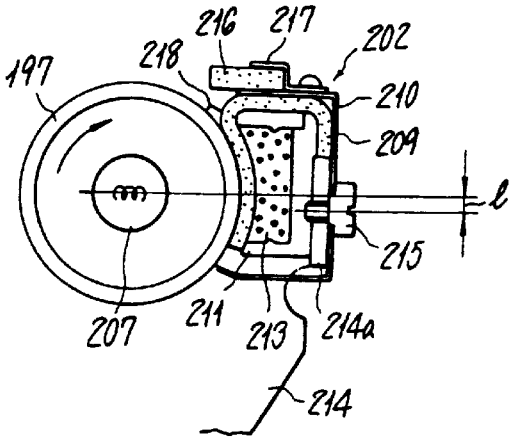
FIG. 63 is a side elevation of a cleaning mechanism.
Figure 64:
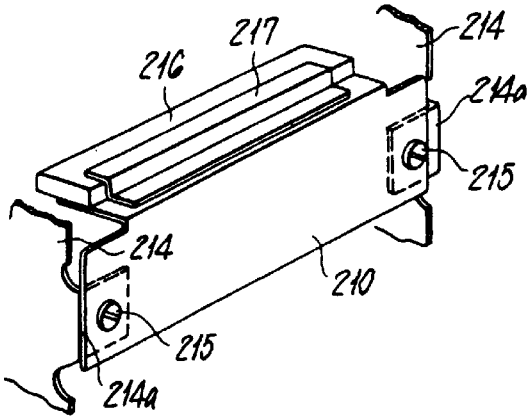
FIG. 64 is a perspective view of the cleaning mechanism.

It will be recognized that the peripheral surface of the fixing roller must be maintained clean in connection with the reliability of the fixing unit. In FIGS. 61 and 63, in a region opposite from the region which is contacted by the record sheet, the fixing roller 197 is contacted by the a thermistor TH which provides a temperature control of a heater 207 disposed within the roller 197. The cleaning unit 202 is disposed on the entrance or advance side of the fixing roller 197. A pad 209 formed of beat resistant felt has its one end held between a bracket 210 and an aluminium holder 211, which are secured together by a screw 212, and has its other end disposed in abutment against the peripheral surface of the fixing roller 197. A cushion 213 formed of soft, heat resistant material such as foamed silicone rubber is disposed inside the pad 209 to urge it gently against the fixing roller, thus preventing the roller 197 from being damaged by contact with the pad. As shown in FIG. 64, the opposite ends of the brabket 210 are secured to tabs 214a, folded from a frame 214, by stepped screws 215. It is to be noted that the axis of the screws 215 is downwardly offset from the center of the fixing roller 197 by a distance l. The height of the stopped screw 215 is chosen to be greater than the thickness of the sheet of the bracket 210, with a difference between the height of the step and the thickness of the bracket 210 being suitably chosen so that it is available to the restoring effect of the pad 209 and the cushion 213. A magnetic member 216 is secured on top of the bracket 210 by a securing bracket 217, and is located close to the fixing roller 197.

In operation, since the bracket 210 is urged by the stepped screws 215 at a point which is by a distance l below the center of the fixing roller 197, it tilts outwardly about the fulcrum defined by the lower end of the tab 214a extending from the frame 214. As a consequence, the pad 209 is most strongly urged against the peripheral surface of the fixing roller 197 in its bottom region, and such bias gradually decreases toward the top region of the pad 209. Consequently, any toner deposited on the fixing roller 197 is partly removed by an upper region of the pad 209 while the remainder is completely cleaned off by the lower region of the pad. In this manner, an efficient cleaning operation takes over the entire surface of the pad 209, minimizing the deposition or accumulation of toner on the top of the pad 209. Any accumulation of toner 218 on the top portion of the pad 209 is attracted by the magnetic member 216, thus preventing such pad from creeping under the abutting surface of the pad 209.

Delivery Unit

The cover 9 of the printer (FIG. 1) is partly movable by being connected with a hinge 219 which is mounted on a bracket 225 of the printer, as shown in FIG. 61. The fixing unit 20 includes a top cover 220 which can be opened and closed by its being connected to a hinge 221 which is mounted on a stay 222. Secured to the top cover a bracket 223 which supports the shaft 199 and a holder 224 which supports the paper delivery roller 205. When the top cover 220 is moved to is open position; an access is available to the conveying path 206 within the fixing unit, thus facilitating the removal of any jammed paper or the inspection of the internal construction.

As shown in FIG. 1, the printer of the invention is provided with the sheet abutment 10 which is located farthest from a user's position. Hence an operator must extend his hand to get the recorded sheets or copies. Accordingly, it is convenient to construct the delivery means in a manner such that the recorded sheets are accessible to an operator while he sits on his chair.

Figure 65:
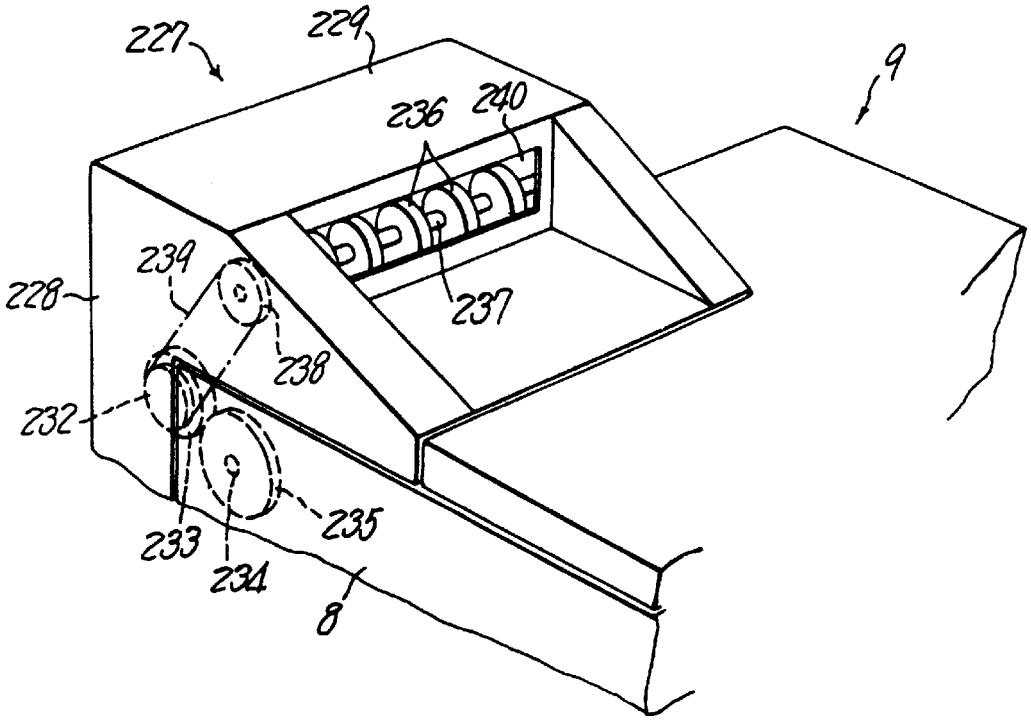
FIG. 65 is a perspective view of a sheet delivery unit.

In FIG. 61, the cover 9 is disengaged from the hinge 219, which is then replaced by a hinge 226 shown in FIG. 62. A delivery unit 227 includes a pair of side plates 228 (only one being shown), the lower end 228a of which is connected to the hinge 226. The side plate 228 includes folded portions 228b, 228c, to which a unit cover 229 is secured by set screws, with fastener plates 230, 231 interposed therebetween. As shown in FIGS. 62 and 65, one of the side plates 228 rotatably carries a pulley 232 and a gear 233 which are disposed in coaxial relationship. The gear 233 meshes with a gear 235 integrally mounted on a shaft 234 for delivery roller 206. The delivery roller 206 represents a drive roller, the drive system of which will be described later. A delivery roller 236 is mounted on a shaft 237 which is rotatably journalled in both the side plates 228 (only one being shown). A pulley 238 is fixedly mounted on one end of the shaft 237, and a belt 239 extends around the pulleys 238, 232.

Figure 66:
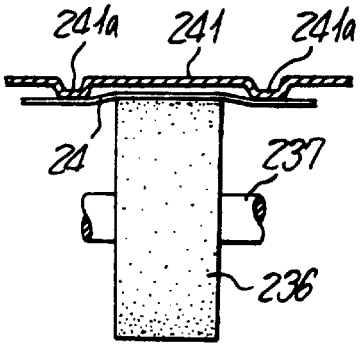
FIG. 66 is a front view of a sheet delivery roller.

The unit cover 229 is formed with a delivery port 240, and the delivery roller 236 is located inwardly of the delivery port. The roller 236 is formed of an elastic material such as foamed polyurethane rubber, and is disposed so that its upper peripheral surface is held in abutment against a keep plate 241. A record sheet is conveyed by being held between the rotating roller 236 and the keep plate 241. However, it should be noted that the roller 236 and the plate 241 may be spaced apart from each other as illustrated in FIG. 66. In this instance, the keep plate 241 is formed with a pair of projections 241a in it on the opposite sides of the roller 236 so that the peripheral surface of the roller and these projections are staggered with respect to each other, as viewed in the axial direction even though there is no direct contact between thekeep plate and the roller.

Curved guide members 242, 243 are disposed between the delivery roller pair 25 and the delivery roller 236 to define a record sheet turning path 244. In FIG. 62, the record sheet is conveyed along the conveying path 206 and the turning path 244 and through the delivery port 240 onto the top cover of the printer, generally in a direction indicated by an arrow. An operator, sitting on a chair, is easily accessible to the record sheet which is delivered onto the top cover of the printer.

It will be seen that the hinge 226 permits the delivery unit 227 to be opened and closed with respect to the rest of the printer. It can be opened to open the top region of the fixing unit, generally in the same manner as described above in connection with the cover 9 shown in FIG. 61. A magnet 245 is attached to one end 228d of the side plate 228 so as to be magnetically anchored to an abutment plate 246 which is secured to the hinge 221, thus assuring a positive meshing engagement between the gears 233 and 235.

Neutralizer

In the arrangement shown in FIG. 2, the neutralizer 21 comprises a discharge electrode 252 which produces an a.c. corona or a.c. corona which is d.c. biased to the opposite polarity from the polarity to which the record is charged, and a neutralizing lamp 253, both of which are housed within a shielded casing 254. The arrangement shown is designed to neutralize the record sheet as well as the record, and at this end, its charge is offset to the left, and the left-hand side of the shielded casing 254, as viewed in FIG. 2, is left open in order to avoid a jamming of the record sheet. In conjunction with the separation which takes place at the curvature, the disposition of the neutralizer for cooperation with the curved region of the record 11 disposed around the roller 12 improves the separation of the record sheet from the record.

Cleaning Unit

Referring to FIG. 2, the arrangement of the cleaning unit 22 will now be described. The cleaning unit essentially comprises a casing 255 which is detachably mounted on the printer so as to be movable in the same direction as the charger, and a cleaning roller 256, a magnetic roller 257 and a recovering shaft 258, all of which are rotatably supported by the casing in parallel spaced relationship with each other. The cleaning roller 256 comprises a non-magnetic sleeve 259 having fibers of short lengths implanted on its surface and a plurality of magnets 260, 261, 262, which are three in the example shown, and which are disposed inside the sleeve. The sleeve 259 is driven for rotation in a clockwise direction, by a drive system to be described later. The non-magnetic sleeve may be formed of aluminium, for example, on the surface of which are applied fibers having lengths on the order of 0.3 to 1 mm, formed from materials such as synthetic fibers of nylon and rayon, natural fibers such as cotton or wool, or conductive fibers of carbon and metals. It is maintained at a spacing from the record surface which is on the order of 0.2 to 0.5 mm. Thus, lengths on the order of 0.1 to 0.5 mm of the fibers implanted on the sleeve surface are maintained in contact with the record surface while the sleeve rotates, thus removing any residual magnetic toner on the record surface. Any residual magnetic toner on the record is mechanically separated therefrom by the fibers implanted on the sleeve surface, and is also attracted to the sleeve surface under the influence of the magnetic force from the magnets disposed therein. The toner removed is conveyed away as the sleeve rotates.

The cleaning unit 22 used in the printer of the invention comprises a cleaning roller capable of producing a magnetic field on its surface which is effective to remove any residual magnetic toner on the record surface, and a magnetic member which is located opposite to the cleaning roller with the record interposed therebetween, the arrangement being such that at least one of the cleaning roller or the magnetic member is disposed in virtually freely movable manner to permit the record to be held between the cleaning roller and that the magnetic member under the influence of the magnetic force from the cleaning roller. This assures a uniform contact between the cleaning roller and the record surface to enable a satisfactory cleaning effect, with a simple construction which is simple and easy to manufacture and assemble.

The magnetic roller 257 has its peripheral surface disposed in contact with the cleaning roller 256 for magnetically transferring any developer removed from the record surface by the roller 256. A blade 263 is disposed in abutment against the peripheral surface of the magnetic roller 257 to scrape off any developera that has been transferred. The scraped developer calls down onto the recovering shaft 258, which is peripherally formed with a helical groove or provided with a coiled spring so that the developer can be conveyed in the axial direction into a vessel which is provided externally of the casing during the rotation of the shaft in one direction.

As mentioned previously, the record 11 extends around the pair of belt rollers 12, 13, which are in turn supported by the support plates 26 (FIG. 7). It has also been mentioned previously that the position of the follower roller 12 is not fixed in order to allow a correction of the belt offset and that the arbor of the drive roller 13 is fixed to secure the location of the exposure station and to provide the ground connection It is to be noted that there is a certain clearance between the bearing 43 on the follower roller 12 and the groove 40 (FIG. 6). In other words, when the record unit 23 is mounted in place, the support plate 26 is slightly rockable about the shaft 38 of the drive roller 13.

Figure 67:
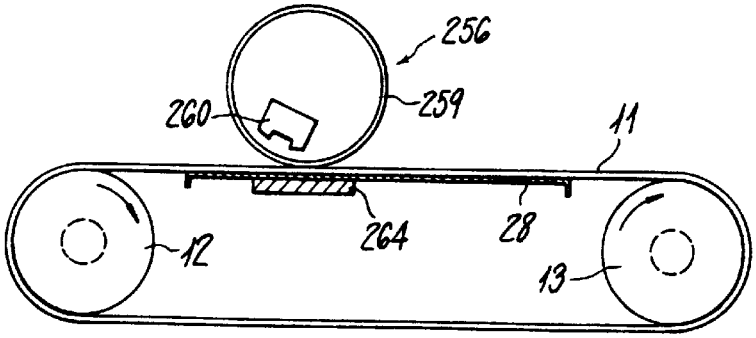
FIG. 67 is a side elevation of part of a cleaning unit.

Referring to FIG. 67, it will be noted that an opposing member 264 formed of a magnetic material is secured to the lower surface of the top plate 28 extending from the support plate 26, over the entire axial length of the cleaning roller 256. Any suitable fastening means such as the use of adhesive, adhesive tape or screw may be employed at this end. Accordingly, the opposing member 264 is substantially disposed so as to be freely movable, and moves upwardly under the attraction exerted by the magnet within the non-magnetic sleeve 259 and is held attracted to the surface of the non-magnetic sleeve with the record 11 and the top plate 28 interposed therebetween. As a result, if a perfect parallelism is not maintained between the surfaces of the non-magnetic sleeve 259 and the record 11, the record 11 is caused to contact the surface of the sleeve 259 in a uniform manner, thus uniformly cleaning any residual magnetic toner on the record 11.

The magnetic toner deposited on the surface of the non-magnetic sleeve 259 is conveyed as it rotates, to be transferred onto the magnetic roller 257 and thence scraped off by the blade 263 to be carried by the recovering shaft 258 to the exterior of the cleaning unit. In this embodiment, if the rotary shafts of the belt rollers 12, 13 are parallel the rotary shaft of the sleeve 259, and the top plate 28 is parallel to the surface of the sleeve 259, it is not always necessary to provide a clearance between the rotary shafts of the rollers 12, 13 and their support members 26.

Figure 68:
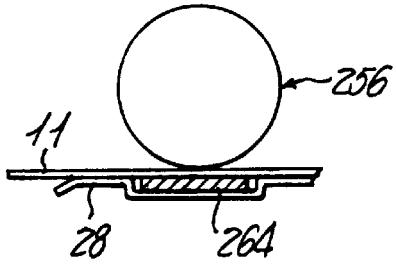
FIGS. 68 and 69 are side elevations of different forms of mating members.

In the example mentioned above, the record unit inclusive of the record 11 is adapted to be lifted. FIG. 68 diagrammatically illustrates another example in which an opposing member 264 is simply placed in a depression formed in the top plate 28 of the support member 26. In this instance, only the opposing member 264 is lifted to bring the record 11 into uniform contact with the surface of the cleaning roller 256. Accordingly, it is unnecessary to provide a clearance between the rotary shaft of the belt roller 12 and the support member 26, the only requirement being that a given gap be provided between the opposing member 264 and the surface of the cleaning roller 256 so that the opposing member 264 can be lifted.

Figure 69:
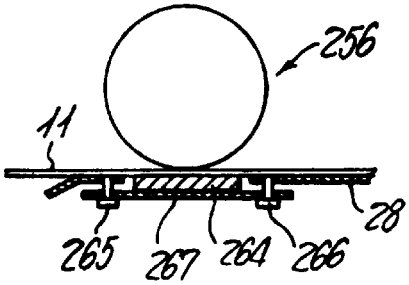

Another modification is illustrated in FIG. 69 in which the top plate 28 of the support member 26 is formed with an opening to receive the opposing member 264 therein and in which the opposing member 264 is placed on a receiver plate 267 which is carried by the top plate 28 by means of pins 265, 266. Again, only the opposing member 264 is held attracted to the surface of the cleaning roller 256 together with the record 11. Where the opposing member 264 is secured to the receiver plate 267, the pins 265, 266 may be loose fit with the receiver plate 267 so that the opposing member 264 can be lifted together with the plate 267.

Figure 70:
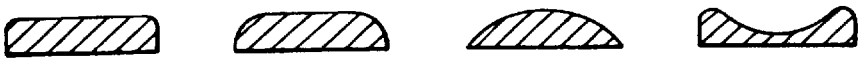
FIG. 70 is a cross section illustrating different cross-sectional configurations of the mating member.

In an arrangement in which the opposing member 264 directly contacts the moving record 11, the surface of the opposing member 264 which faces the record 11 can be formed in various profiles as illustrated in FIG. 70, in order to minimize the resistance of contact to reduce the loading effect or to increase the area of contact with the sleeve 259 as much as possible to thereby enhance the cleaning efficiency. Thus, the surface of the opposing member which engages the record 11 may be formed with rounded corners or with convex or concave surface. The purpose of the opposing member in such cleaning unit is not only bringing the record surface into uniform contact with the cleaning roller in a so-called "confirming" manner as a result of magnetic attraction from the cleaning roller, but is to produce an effective movement of any residual toner on the record under the influence of the magnetic field formed thereon to enhance the cleaning effect. However, in respect of the latter, variations during the manufacturing process or the aging effect may make it difficult to form a magnetic field which is effective to move the residual magnetic toner from the record surface. To cope with this problem, in the cleaning unit of the invention, an arrangement is made such that the relative position between the opposing member and the cleaning roller can be changed. Either the cleaning roller or the opposing member may be shifted in position, but it is preferable to adjust the location of the opposing member in consideration of the power transmission system.

Various means may be employed to adjust the location of the opposing member. For example, the opposing member 264 may be formed with a slot which is elongate in a direction parallel to the direction of movement of the record 11 and which is engaged by a set screw, extending therethrough, so as to position and clamp it to the top plate 28.

As mentioned previously, the unit is characterized in that at least one of the cleaning roller or the opposing member is disposed in substantially displaceable manner. It will be apparent from the foregoing description that the term "substantially" is used to connote not only that the cleaning roller or opposing member itself is disposed in a displaceable manner, but also that it is fixedly mounted on another member which is disposed in a displaceable manner. The term "displaceable" refers to a "movable condition" which is allowed by a "play" or "rattling" provided. Since "at least one of the cleaning roller or the opposing member" must be displaceable, it will be seen that the cleaning roller may be disposed to be displaceable or both the cleaning roller and the opposing member may be disposed in a displaceable manner, in contradistinction to the embodiments described above.

Disposing the opposing member 264, formed of a magnetic material, on the rear surface of the record 11 as means which brings the record 11 into contact with the cleaning roller 256 brings forth another advantage. It will be understood that the cleaning effect can be improved by determining their relative position so that a sliding contact between the record 11 and the cleaning roller 256 is achieved. However, in the printer of the invention, the record 11 is movable, as it is contained in the record unit, in a direction perpendicular to the axial direction of the cleaning roller 256. Hence,if the record and the cleaning roller are maintained in contactact with each other regardless of the position assumed by the record unit during its withdrawal, a sliding contact between them will occur to damage the record surface when the unit is mounted or dismounted. However, in the present unit, the use of the opposing member 264 which is disposed to be attracted by the magnet 260 internally housed within the cleaning roller 256 minimizes such likelihood of damaging the record. Specifically, it is only after the record/developing unit 5 has been inserted to a given position within the printer that the opposing member 264 is subject to attraction by the magnet 260 (FIG. 67) to bring the record 11 into contact with the cleaning roller 256. Accordingly, the record 11 will be disengaged from the peripheral surface of the roller 256 if the opposing member 264 has been moved to a point where it is not suficiently ifluenced by the magnet 260 to bring the record into contact with the peripheral surface of the roller 256.

Figure 71:
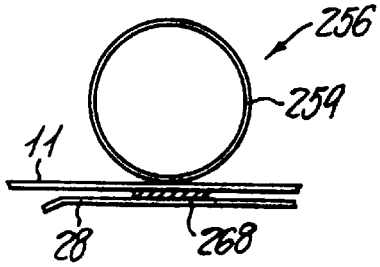
FIGS. 71 and 72 are side elevations of different forms of mating members.

Alternative means, which is a substitute for the opposing member 264 formed of a magnetic material and which brings the record 11 into contact with the cleaning roller 256, will now be described. Such means represent an example which causes the record 11 to contact the cleaning roller 256 with a force which is uniform, as viewed in the axial direction of the roller 256. In FIG. 71, there is shown a non-magnetic sleeve 259, and an opposing member 268 formed of a pliable material and having substantially the same length as the sleeve 259 is secured to the top plate 28 at a point directly opposite to the sleeve 259. Such a pliable material may comprise rubber, sponge, felt, brush hair, or an enclosure containing a material such a jelly or liquid. Even though a pliable material having flexibility is sufficient for the purpose of the invention, a pliable material having elasticity is more preferred. Since it is only necessary that the pliable material be present in at least region of the opposing member 268 which contacts the record 11, the opposing member 268 may comprise a rigid material to which the pliable material is applied. However, it is necessary in such instance that the pliable material has a sufficient thickness to allow a sufficient shrinkage when constricted.

Since the top plate 28 is inherently designed to support and guide the upper run of the record 11, the surface of the top plate 28 is in contact with or very close to the rear surface of the record 11, and the surface of the cleaning roller 256 is in contact with or very close to the surface of the record 11. When the opposing member 268 of a given thickness is interposed between the cleaning roller 256 and the top plate 28 which are located in this manner, the pliable material, which forms the opposing member 268, shrinks "in conformity to" the sleeve surface when contricted, thus urging the record 11 to contact the sleeve surface gently and uniformly. As a consequence, any residual magnetic toner on the record 11 is uniformly cleaned.

Figure 72:
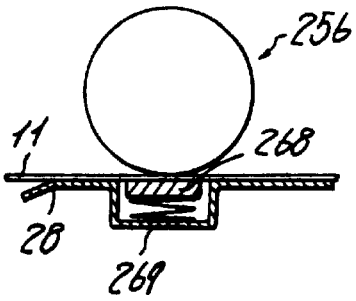

To bring the opposing member 268 into abutment against the cleaning roller 256 with the record 11 interposed therebetween, a spring 269 may be used as illustrated in FIG. 72. Specifically, the top plate 28 may be formed with a recess in a region opposite to the cleaning roller 256 in which to receive the spring 269, on top of which the opposing member 268 is placed. Consequently, the opposing member 268 is urged upward to bring the record 11 into abutment against the cleaning roller 256. The spring 269 can be omitted if the opposing member 268 has a thickness greater than the depth of the recess. A single spring 169 may be disposed centrally, as viewed in a direction perpendicular to the plane of the drawing, or a pair of springs may be disposed at the opposite ends of the top plate 28. Since the opposing member 268 is merely placed on top of the spring 269, it is capable of moving in either direction, that is, displaceable, assuring that the record 11 contacts the surface of the cleaning roller 256 uniformly and "in confirmity" thereto if the parallelism between the cleaning roller 256 and the record 11 is not perfectly attained.

In the arrangement described above, the upper surface of the opposing member 268 is maintained in contact with the rear surface of the record 11, and hence in order to minimize the resistance of contact therebetween to reduce the loading effect or to increase the area of contact between the record 11 and the cleaning roller 256 to thereby enhance the cleaning effect, the upper surface of the opposing member 268 can be profiled in various manners as illustrated in FIG. 70. Thus, the surface of the opposing member 268 which contacts the record 11 may be formed with rounded corners or as convex or concave surfaces.

Figure 73:
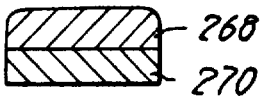
FIG. 73 is a cross section of the mating member.

In the various embodiments described above, the cleaning member comprises the non-magnetic sleeve 259 in which magnets are housed. Accordingly, a magnetizable material or a magnet 270 of the opposite polarity from that of the opposing magnet within the sleeve may be applied to the underside of the opposing member 268, as shown in FIG. 73. The magnetizable material or the magnet 270 is attracted by the magnet disposed within the sleeve, and hence the opposing member can be urged into abutment against the cleaning roller, with the record interposed, without utilising any mechanical bias. Examples of such an arrangement are shown in FIGS. 74 and 75.

Figure 74:
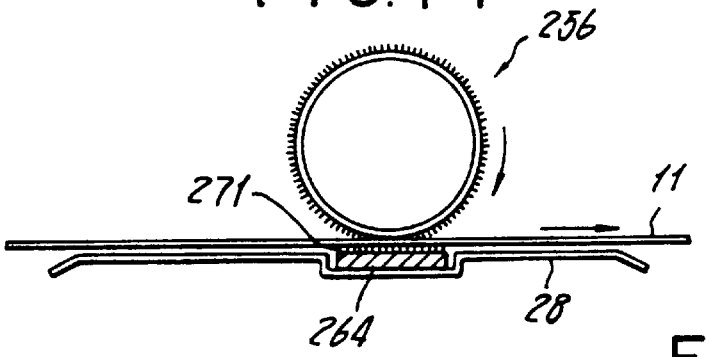
FIGS. 74 and 75 are elevations of further forms of mating members.

In FIG. 74, an opposing member 264, which is constructed in a manner illustrated in FIG. 68, is provided with a cushion 271 of a pliable material such as that mentioned previously, on its surface located opposite to the record 11 for contact with the rear surface thereof.

Figure 75:
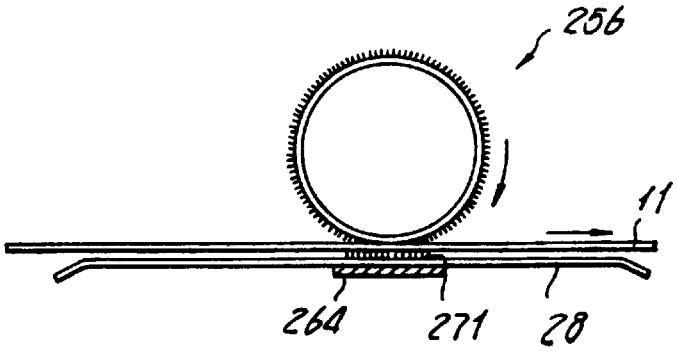

In FIG. 75, an arrangement as shown in FIG. 67 is utilized, and a cushion 271 is formed on the top plate 28 in opposing relationship with the cleaning roller 256 so that it may contact the rear surface of the record.

When the cushion is brought into contact with the rear surface of the record 11 as shown in FIGS. 74 and 75, the pressure, which is produced as the opposing member 264 urges the record 11 into abutment against the cleaning roller 256 under the influence of magnetic force from the roller 256, is made uniform in the direction of generatrices of the roller. In other words, the record 11 uniformly contacts the cleaning roller 256 as viewed crosswise, thus assuring a uniform cleaning of the record.

Sequence Control

Figure 76:
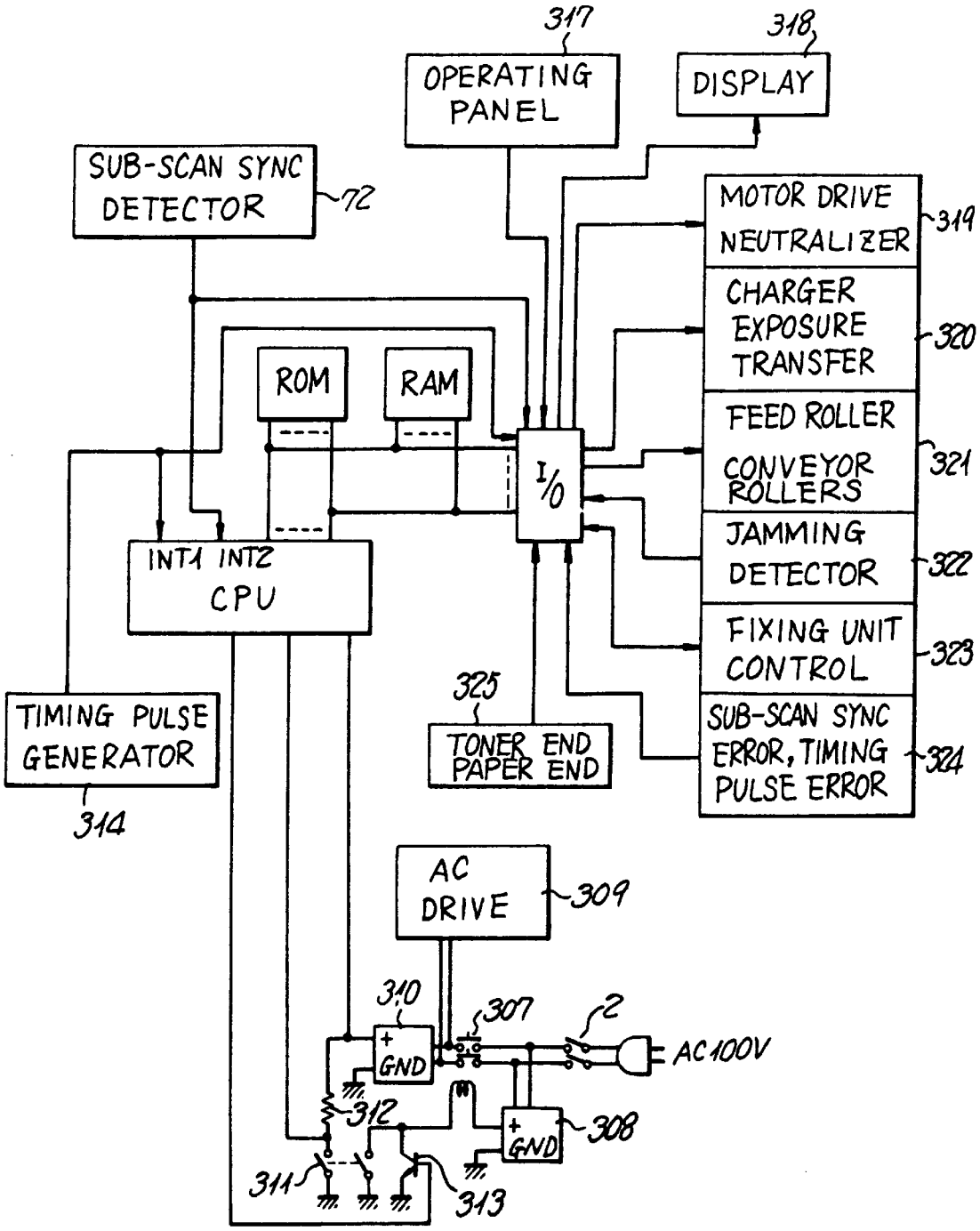
FIG. 76 is a block diagram of a sequence controller for the printer of the invention.

FIG. 76 is a block diagram of a sequence control unit of the printer of the invention. As shown, the control unit includes a central processing unit CPU, a read only memory ROM, a random access memory RAM and an input/output port I/O, all of which constitute together a microcomputer. A double pole main switch 2 is connected to an a.c. source, and is also connected to a main relay 307 and a relay source 308. The relay switch 307 is connected to an a.c. drive system 309 and a control system power source 310. A pair of power switches 311 have their one end connected to the ground, and the other end if one of the swiches is conneceted through a resistor 312 to the positive output of the power source 310 while the other end of the other power switch is connected to the collector of a transistor 313 and also connected through the solenoid coil of the relay 307 to the positive output of the source 308. The transistor 313 has its emitter connected to the ground and the base connected to the central processing unit. A timing pulse generator 314 (FIG. 8) comprises a slitted disc 315 fixedly mounted on the shaft 281 of the gear 63 which rotates the drive shaft for the record 11, and a photointerrupter 316 or reflection sensor which is operable to detect a slit or slits in the disc 315. An operating panel 317 includes ten keys. A display 318 (FIG. 1) provides a variety of indications. A circuit 319 drives the motor and neutralizing charger 19; a circuit 320 operates the charger 14, the exposure unit 15 and the transfer charger 19; a circuit 321 drives the feed roller 17 and the conveyor roller pair 18 which convey a record sheet; a jamming detection circuit 322 detects the occurrence of a jamming of a record sheet; a circuit 323 control the fixing unit 20, and a circuit 324 detects an error in the sub-scan synchronization and the timing pulse. A circuit 325 detects the exhaustion of toner in the developing unit is and the absence of record sheet in the sheet feeder 130.

In accordance with a selected one of programs stored in the memory ROM, the central processing unit CPU processes the signals which are received from the panel 317 and the circuits 322 to 325 through the input/output port I/O, and also performs an interrupt operation in response to a sub-scan sync signal and the timing pulse from the sub-scan sync detector 72 and the timing pulse generator 314 to effect a sequence control by outputting signals to the various units and circuits 318 to 321 and 323, in a manner to be described below.

1. From power-on to warm-up of heater (see FIG. 77 (1))

When the main switch 2 is turned on, the main relay power source 308 is energized. Subsequently when the power switches 311 are turned on, the source 308 energizes the main relay 307, whereby both the a.c. drive system 309 and the control power source 310 are energized. It is to be noted that when no power is supplied, the record 11 remains at rest at a position indicated in FIG. 78 (1), and the non-record area x (junction) of the record 11 is located such that the record region may be adversely influenced. In the example shown, the non-record area x is located below the charger 14 which is outside the curved region when it remains at rest. This is because during the formation of an image, an ozone may be produced by the charger 14 and may adversely influence the adjacent region if the record 11 remains at rest for a prolonged period of time. Positions y and z shown in FIG. 78 indicate the leading end of an image on the record 11 or the point where the record is initiated and the location of the sub-scan mark 71 (FIG. 8).

When the power source 310 is energized, the central processing unit CPU begins to operate, initially clearing the memory RAM, resetting input/output circuits of the input/output port I/O and determining a stack pointer SP. Various flip-flops F/F, timing pulse counter TPCOU, set counter SETCOU (presetting the number of copies to be printed) and the like are previously programmed within the memory RAM. Heater F/F is then set to cause the fixing unit control circuit 323 to turn the heater 207 of the fixing unit 20 on. TPCOU is cleared, and the mask for an interrupt INT1 (an interrupt in response to a timing pulse) is reset while setting a mark for an interrupt INT2 (an interrupt in response to the detection of a sub-scan sync mark). When the heater 207 warms up to a given temperature, it is then turned off by the control circuit 323. In response to a signal from the control circuit 323, the central processing unit CPU recognizes that the heater 207 is turned off, and then turns the motor and the neutralizer 21 on. When the motor 273 is set in motion, a timing pulse TP causes TPCOU to count up. When the count reaches a given number N, both the motor 273 and the neutralizer 21 are turned off, and the heater F/F is reset and the mask for INT1 is set. When the motor stops, the record 11 has moved to a position shown in FIG. 78 (2) where the non-record area x is located upstream of the neutralizer 21 and immediately before the follower roller 12. The mask for INT2 is set to avoid the possibility that noises may be fed to the input system which receives the sub-scan sync mark detection signal during the rotation of the motor.

2. Main Routine

Figure 77:
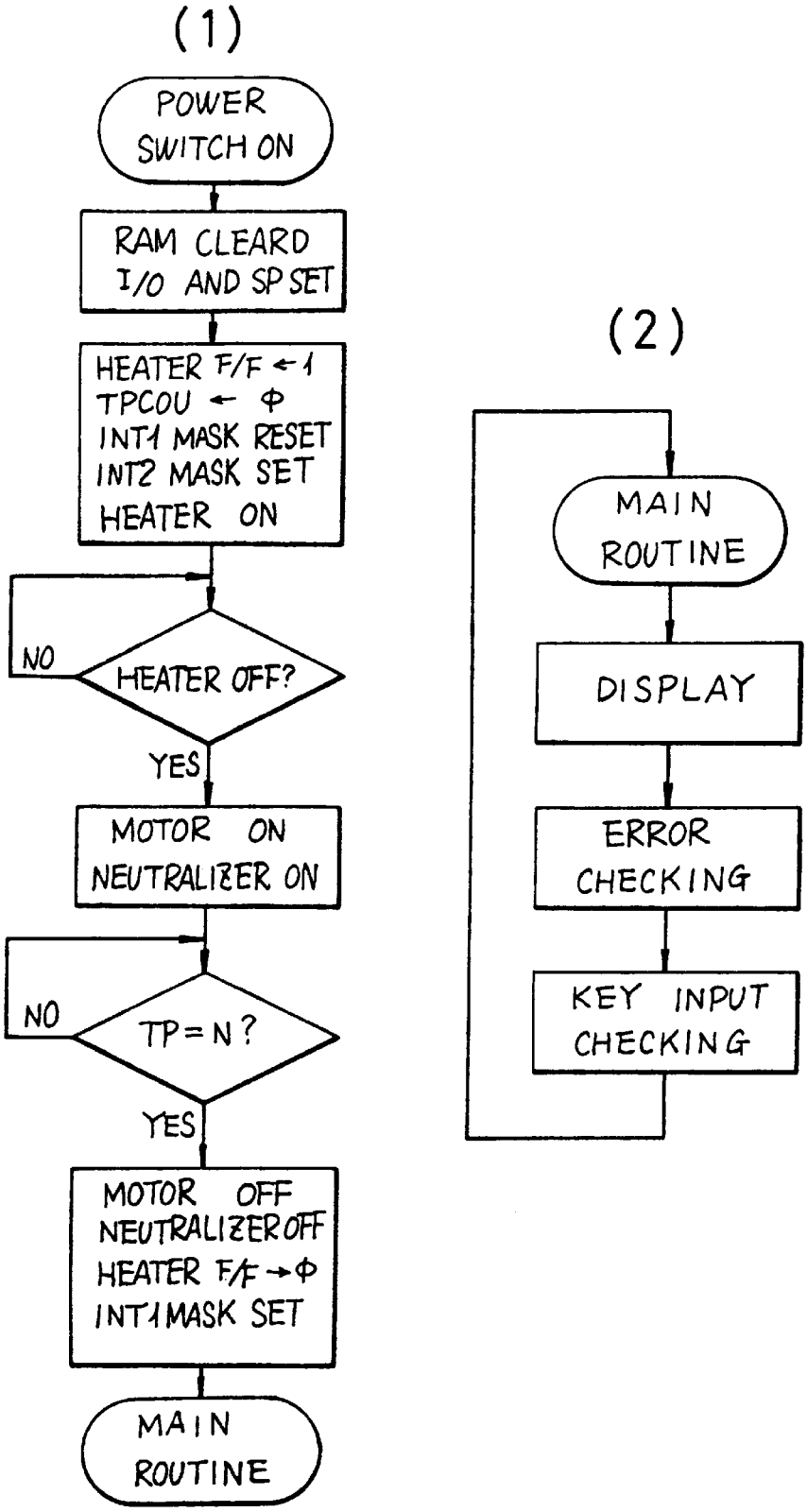
FIG. 77(1), 77(2), 77(3), 77(4), 77(5), 77(6), 77(6B), 77(6C), and 77 (6D) show several flow charts illustrating the sequence control.
Figure 77:
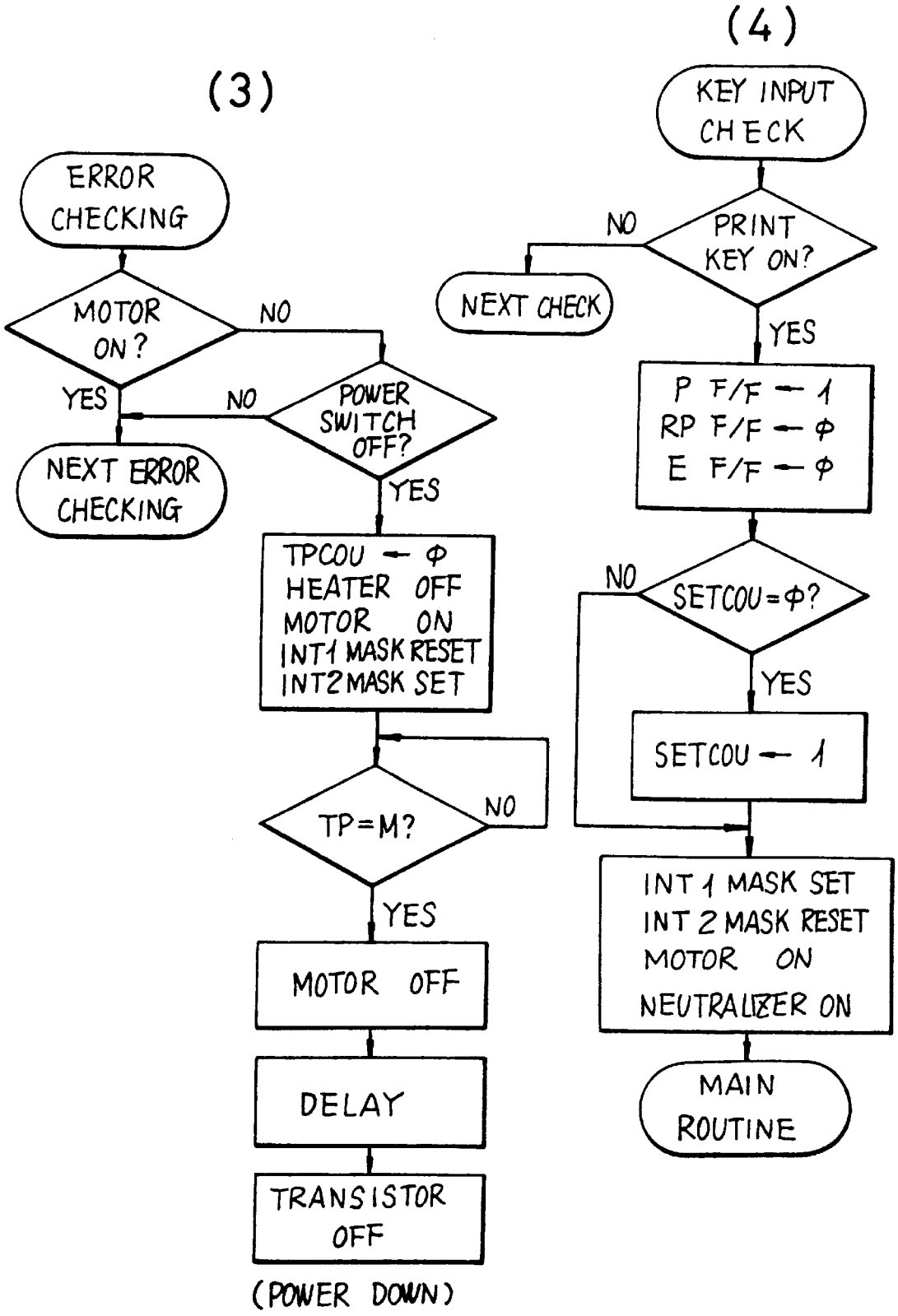
Figure 77:
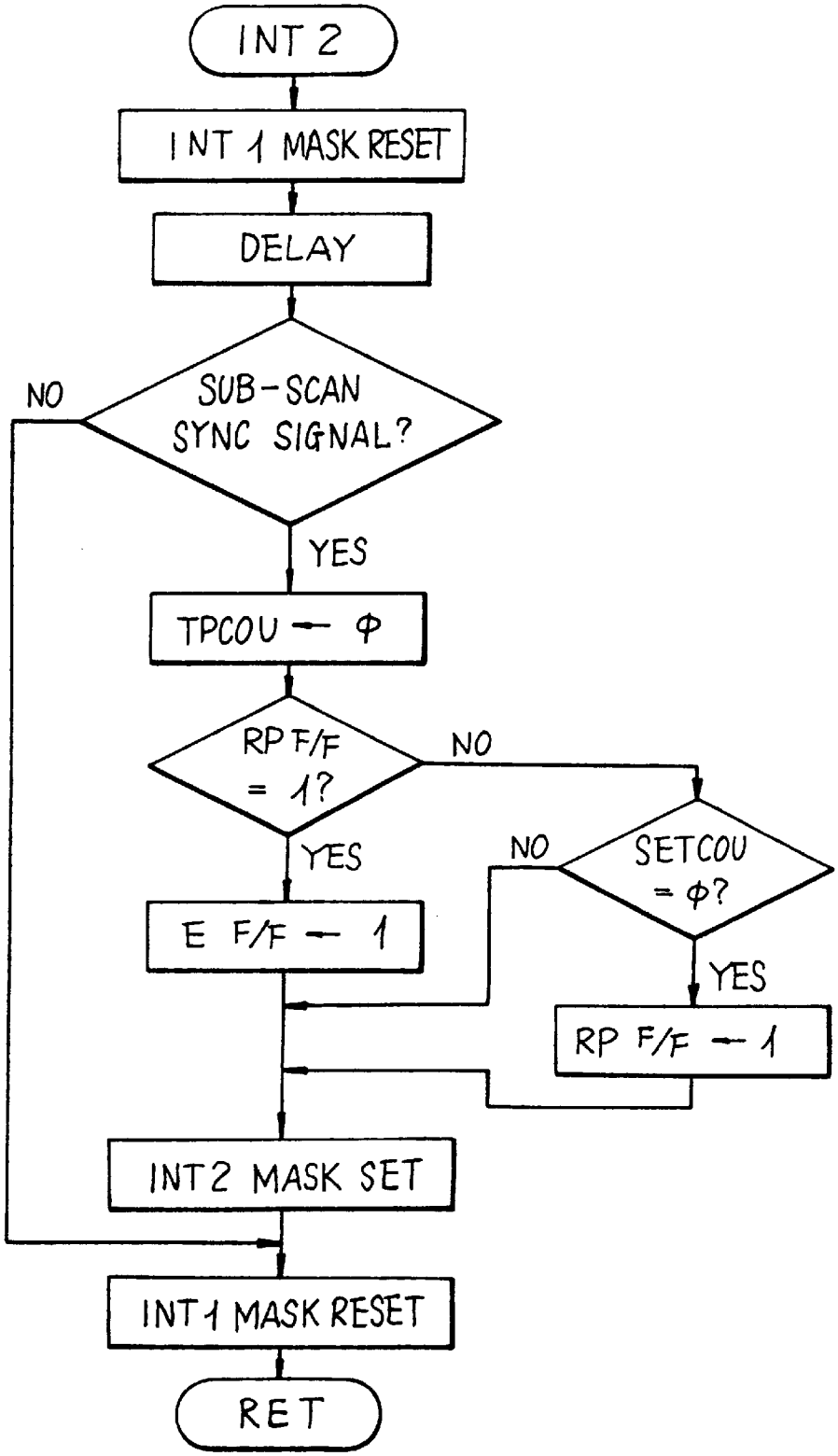
Figure 77:
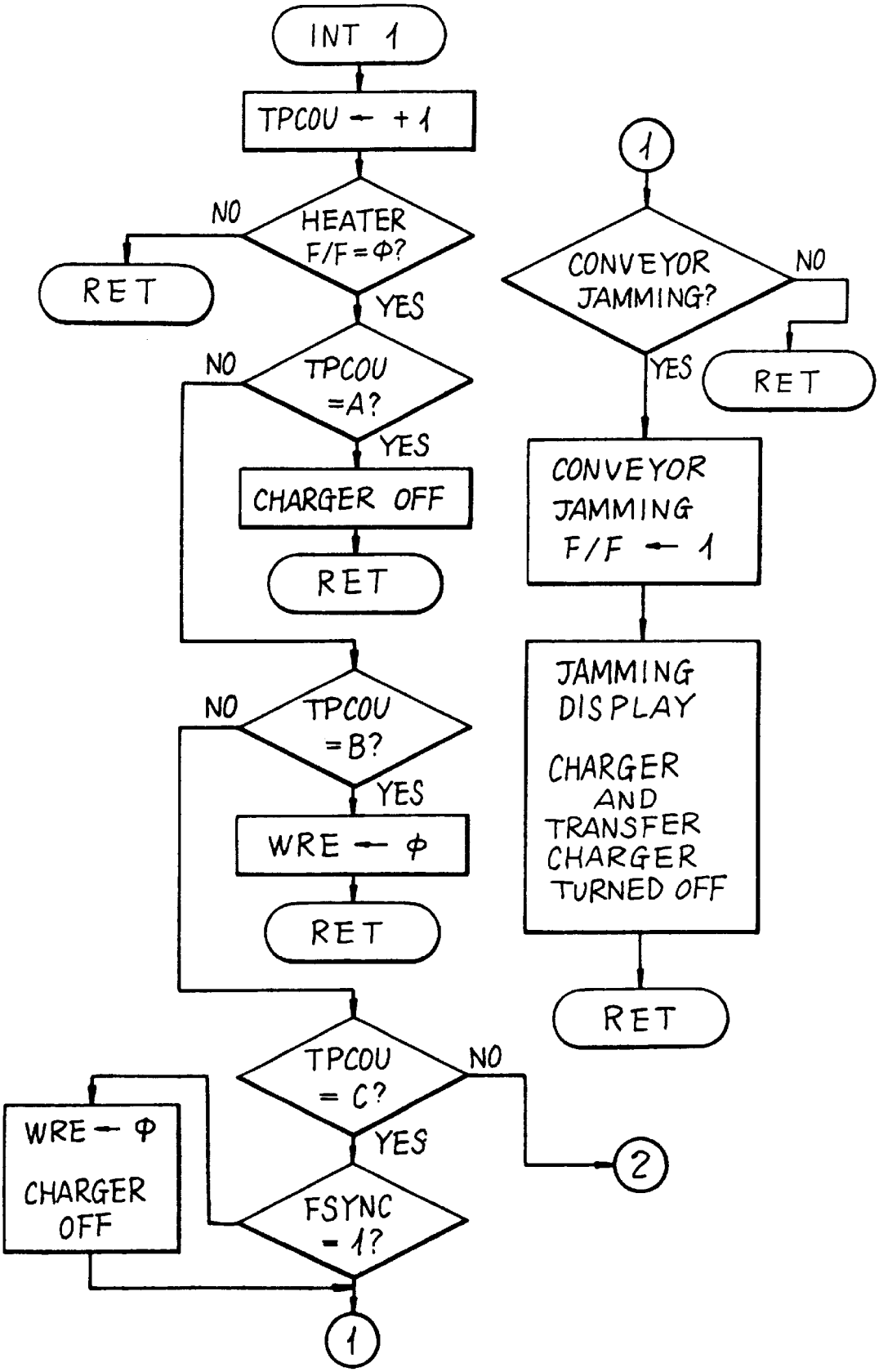
Figure 77:
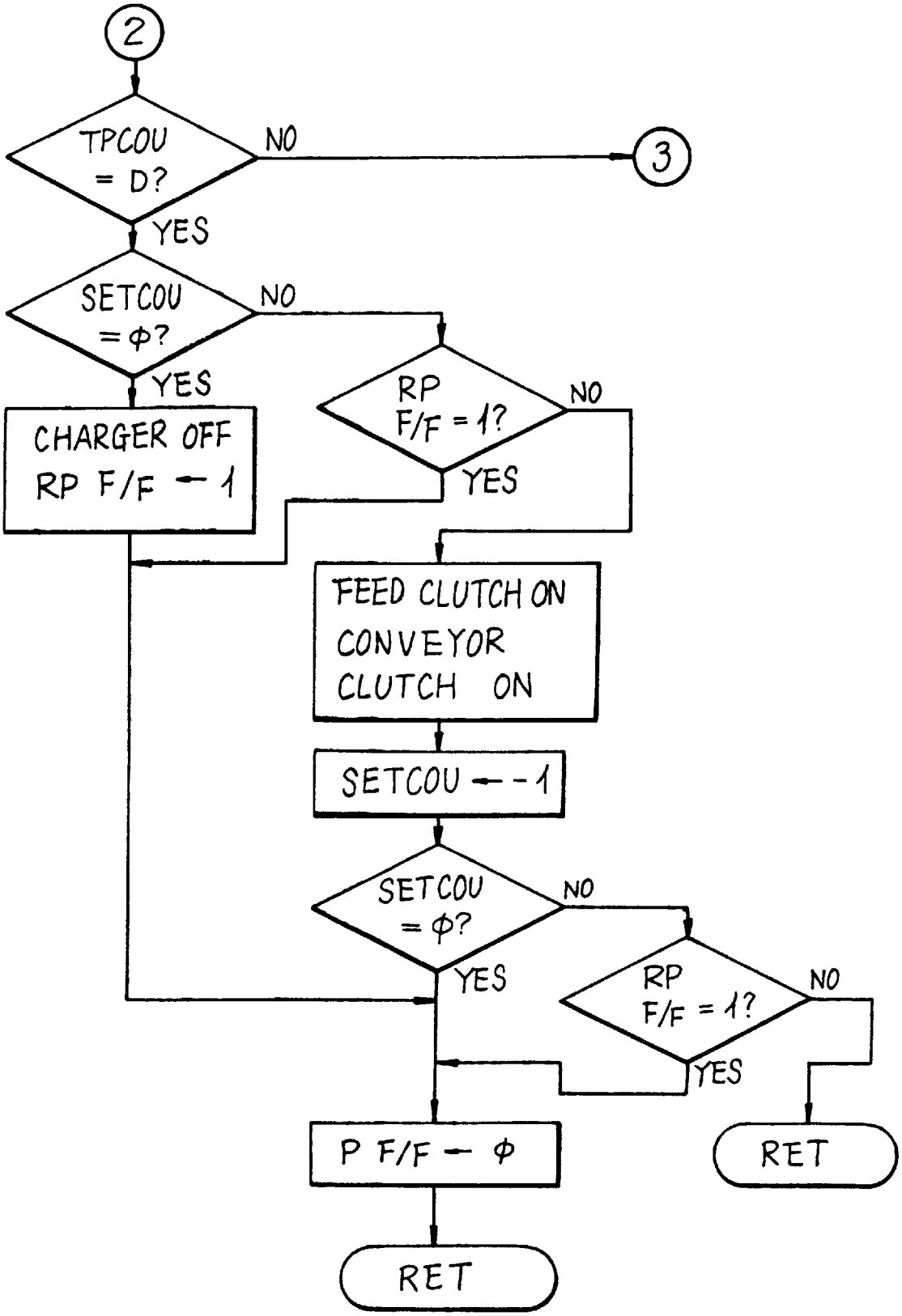
Figure 77:
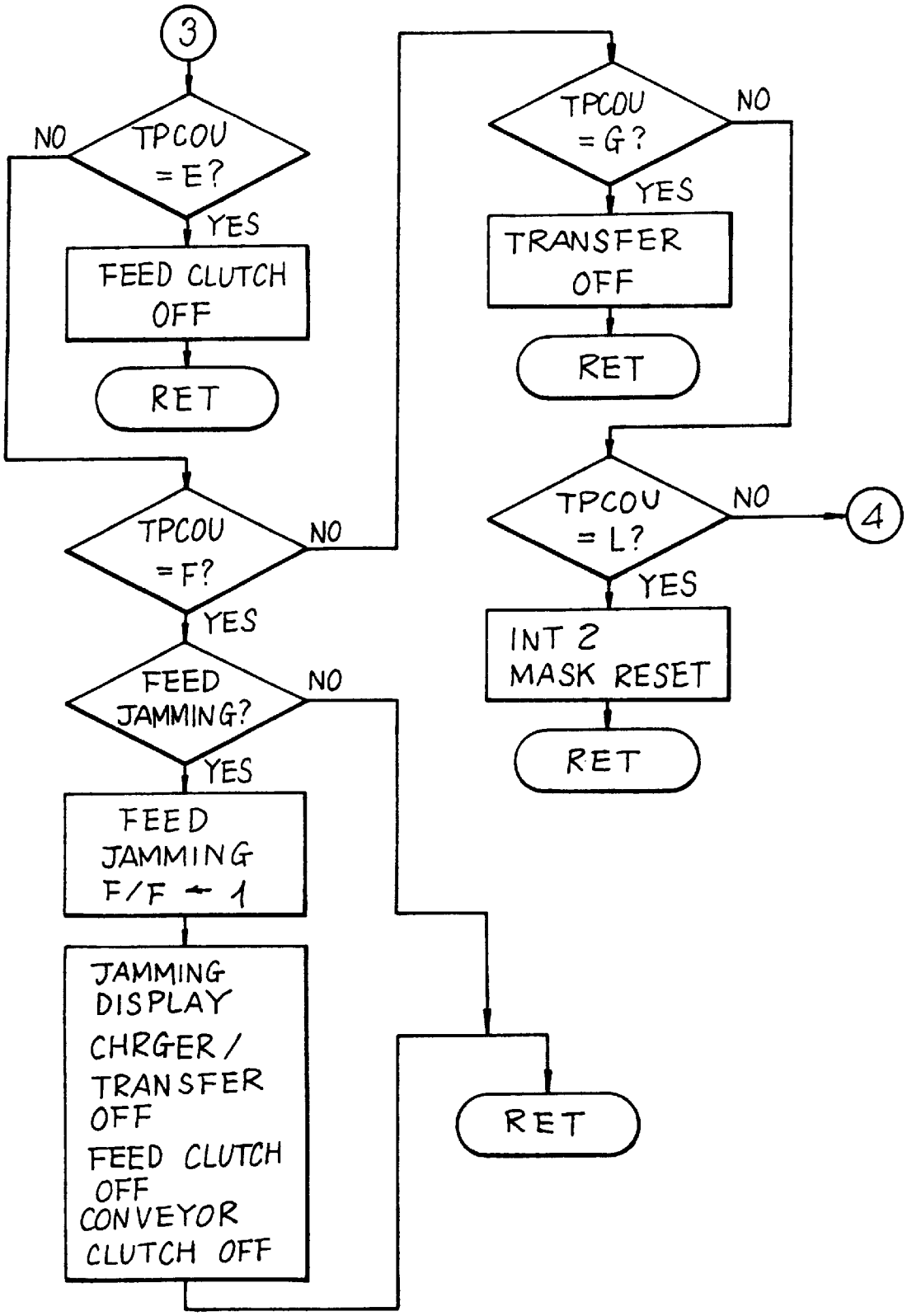
Figure 77:
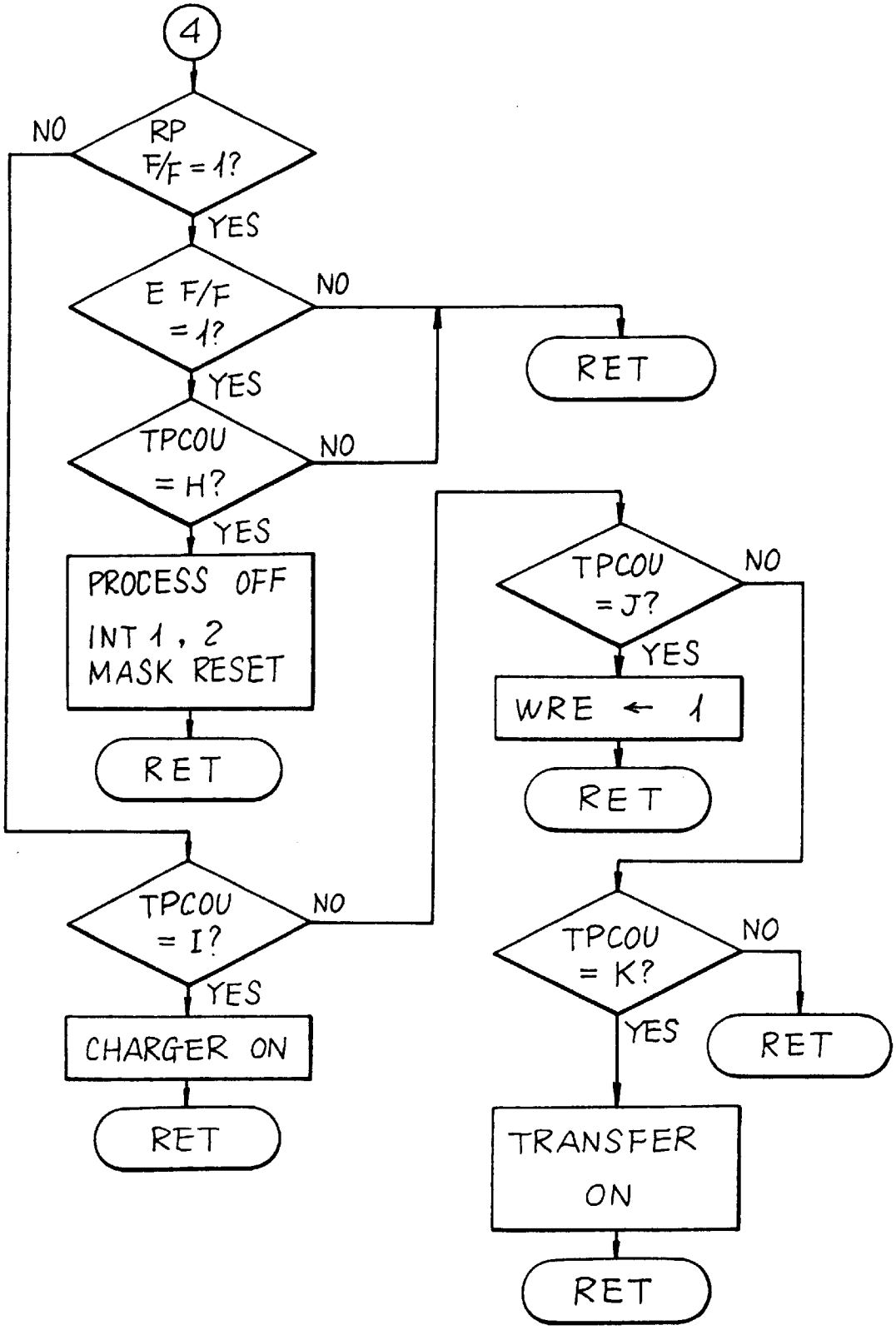

While not shown in detail in FIG. 77 (2), the main routine executes programs relating to the display of the number of copies, record enablement (ready/busy), the exhaustion of record sheet, the exhaustion of toner, the occurrence of a jamming in the feeding and conveying system, an error of the sub-scan synchronization, an error in the timing pulse, the breakage of a thermistor and the recovery of tone, all by the display 318.

An error in the sub-scan synchronization and the timing pulse is checked during the time the record 11 is in motion. The sub-scan sync mark z on the record 11 is detected by the detector 72, and unless the sub-scan sync mark is detected for the next time within a time interval which is slightly longer than the time required for the record 11 to complete its one revolution, it is determined that an error has occurred in the sub-scan synchronization. The timing pulse generator 314 produces a timing pulse in response to the movement of the record 11, and there is provided a timer having a duration which is greater than the normal pulse interval to enable a determination that an error in the timing pulse has occurred in the event the timing pulses are not produced within the duration of the timer. If a breakage of the thermistor occurs when the printer is in its mode, the fixing unit control circuit 323 immediately displays the breakage by establishing a busy condition. However, if the breakage occurs in the process of the record operation, the busy condition is established upon completion of the process being executed.

Figure 79:
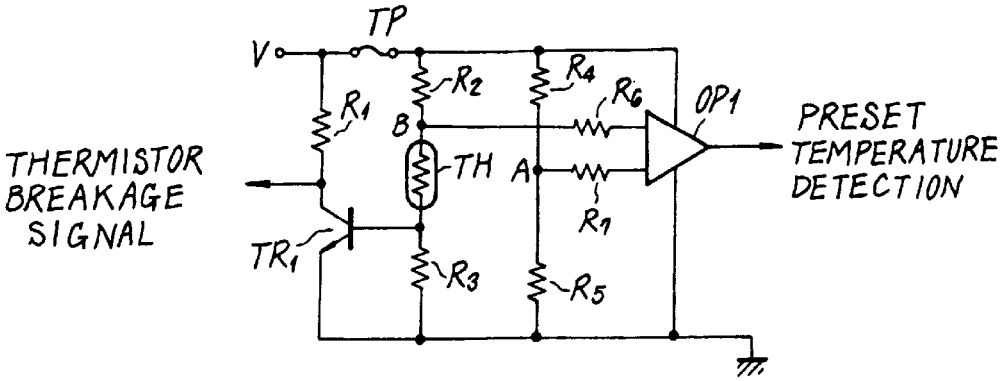
FIGS. 79 and 80 are circuit diagrams illustrating certain circuits within the printer of the invention.

Part of the fixing unit control circuit 323 is shown in FIG. 79 where TH represent a thermistor, TP a thermal fuse disposed within the fixing unit 20, TR1 a transistor, OP1 a comparator and R1 to R7 resistors. The purpose of the thermistor TH is to detect the temperature of the fixing unit 20, and has a characteristic such that it exhibits a high resistance at low temperatures and a low resistance at elevated temperatures.

A thermal fuse TP, resistor $R_2$, thermistor TH, and another resistor $R_3$ are connected in series, and a constant voltage V is applied across the series circuit. Both the thermal fuse TP and the thermistor TH are disposed in a region adjacent to the heater of the fixing unit 20. The junction B between the resistor $R_2$ and the thermistor TH is connected to the inverting input of an operational amplifier OP1, operating as a comparator, and the junction between the thermistor TH and resistor $R_3$ is connected to the base of a transistor Tr1. A reference voltage, produced by a division of the constant voltage V, is applied to the non-inverting input of the amplifier OP1. The comparator OP1 compares the potentials at the points A and B against each other, and responds to the temperature detected by the thermistor mistor by providing an low level or "0" whenever the heater temperature is below a given value and providing a high level or "1" whenever the heater temperature exceeds the given value, such output being applied to the input port of RAM. The breakage of the thermistor TH causes the transistor Tr1 to be turned off, whereby an abnormality signal of a high level or "1" is applied to the input port RAM. In the event of blowout of the thermal fuse TP, the transistor Tr1 is similarly turned off, applying an abnormality signal of high level or "1" to the input port of RAM. In either instance, the single line is utilized to signal to CPU the occurrence of high level "1" which represents an abnormality. CPU responds to the high level by interrupting the sequence of printing operation according to a given schedule and alerts the occurrence of an abnormality.

When examining the exhaustion of record sheet, the paper end sensor 133 contained in the circuit 325 detects the presence or absence of record sheet in the tray 3. It produces a sheet exhausted signal when the record sheet is exhausted. In response thereto, the central processing unit CPU resets print F/F (P F/F) to 0, sets a last paper F/F (RP F/F) to 0 and sets an end F/F (E F/F) to 1, thereby allowing the display 318 to indicate the exhaustion of record sheet. The record operation is terminated when the last record sheet has been delivered to the abutment 10.

Figure 81:
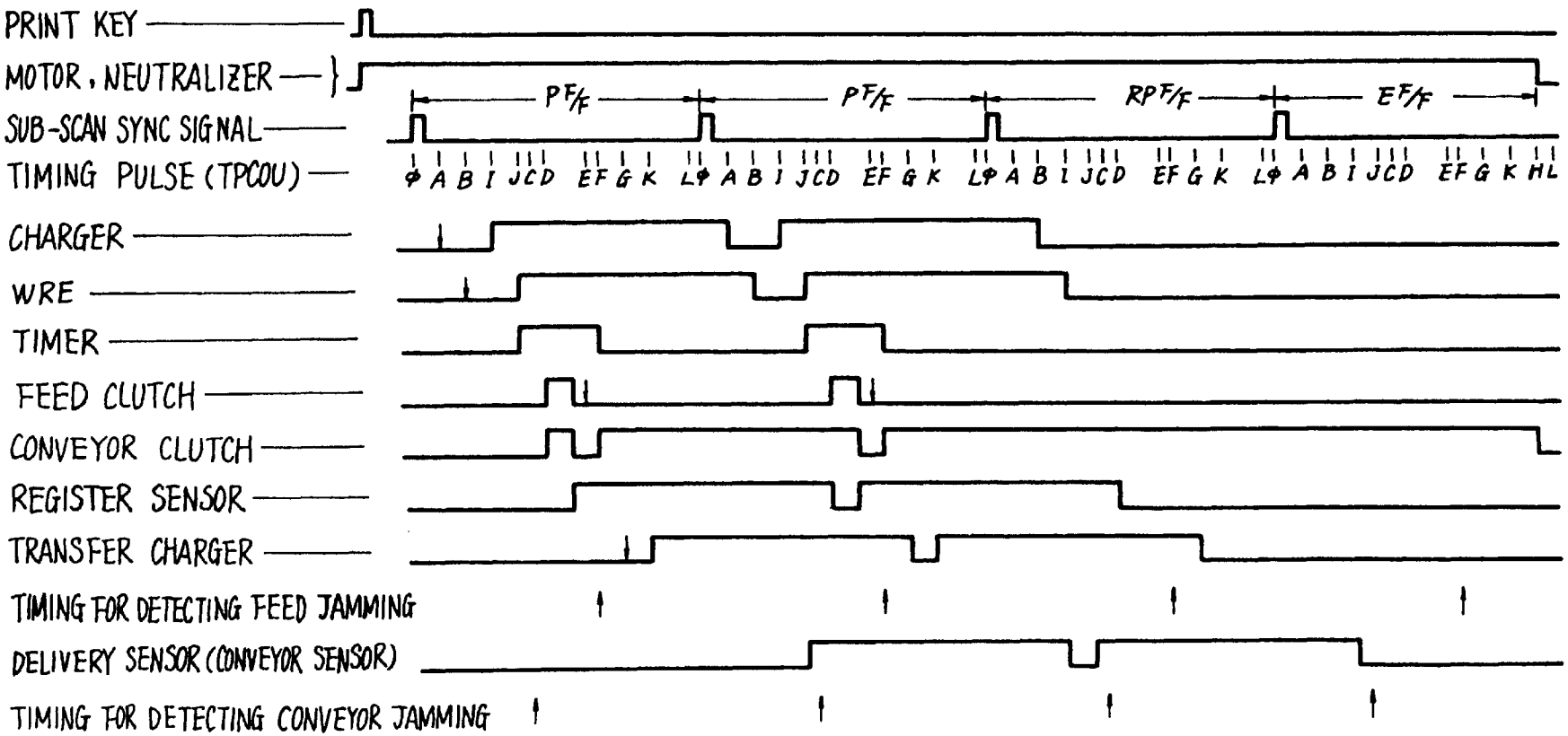
FIG. 81 is a series of timing charts illustrating the operation of the printer of the invention.

The occurence of a jamming in the feeding and the conveyor system is checked at a given count of timing pulses, as will be noted from the timing chart of FIG. 81 and the flow chart of FIG. 77 (6). Upon occurrence of a feed mistake, the heater and the process are turned off, bringing a write enable signal WRE to 0. Because the motor is not stopped, its motion is stopped after completion of the sheet delivery during the preceding step. Upon occurrence of a jamming in the course of conveying the record sheet, the motor, the heater and the process are immediately turned off in response to the detection of a jamming since the record sheet may be entangled into the fixing unit 20 or the conveyor system. The display 318 obviously indicates the occurrence of such a feed mistake and jamming. The detection of a feed mistake and jamming will be described in detail later.

A key input is checked by examining a print input or a count of copies input from the operating panel 317.

In the main routine, the operations described above are repeated except when an interrupt operation takes place.

3. Power off (see FIG. 77 (3))

This operation is included as part of an error check routine.

Initially a check is made to see if the motor is turned off, and if the power switches 311 are turned off when the motor is off. The central processing unit CPU receives a low level input when the power switches 311 are turned on, and receives a high level input when the power switches 311 are turned off. When the power switches are turned off, the timing pulse counter TPCOU is cleared to turn the heater off and to turn the motor on while resetting the mask for INT1 and setting the mask for INT2. When the motor is set in motion, the timing pulse TP is counted by TPCOU, and when the count reaches a given value M, the motor is turned off, followed by turning the transistor 313 off with a certain time delay. The main relay 307 is turned off, thus deenergizing the a.c. drive system 309 and the control system power source 310. The record 11 then comes to a stop at the position shown in FIG. 78 (1).

4. Print start (FIG. 77 (4))

When a print key on the operating panel 317 is turned on, a key input check routine responds thereto by setting P F/F and resetting RP F/F and E F/F to 0. SETCOU is then checked to see if any number is present. If the preset number is found to be equal to 0, SETCOU is set to 1. The mask for INT1 is then set while the mask for INT2 is reset. Finally, the motor 273 and the neutralizer 21 are turned on.

5. INT2 operation in response to sub-scan sync signal (FIG. 77 (5))

Figure 82:
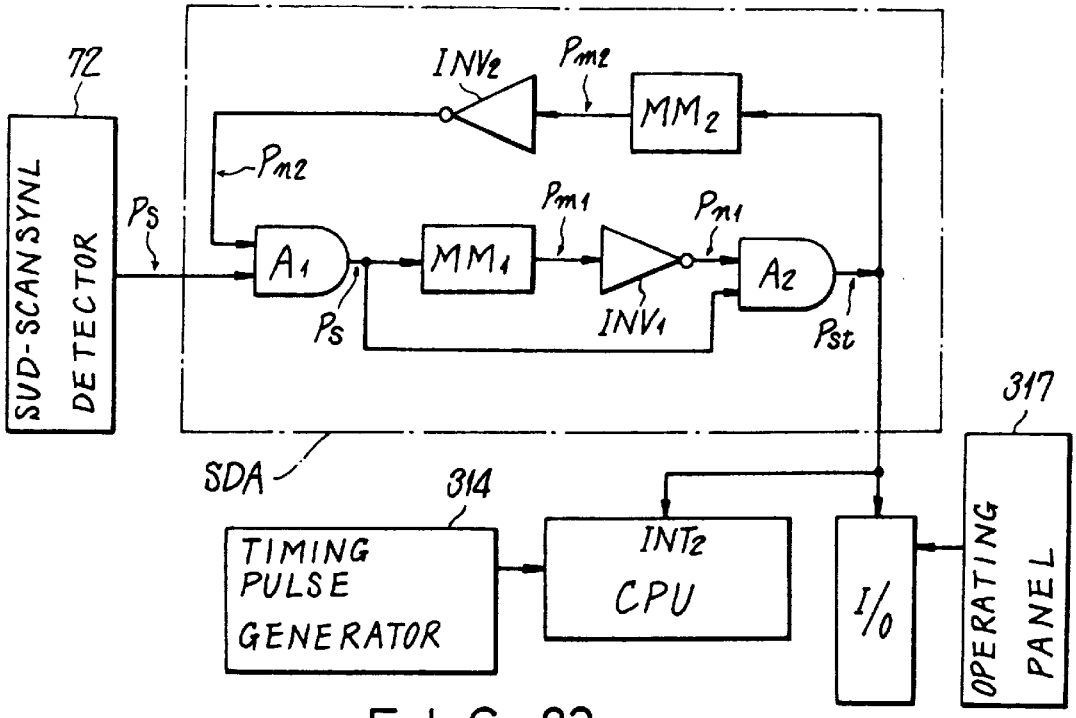
FIG. 82 is a block diagram of one form of sync signal detection system.

When a sub-scan sync signal is supplied from the detector 72, INT2 routine is executed. Initially the mask for INT1 is set to inhibit an interrupt operation in response to a timing pulse, and after a certain time delay, a check is made to see if there still occurs the sub-scan sync signal. If no sub-scan sync signal is detected, the mask for INT1 is reset, returning the program to the start. The prupose of checking the sub-scan sync signal is to assure against the presence of any flaw or dust at a location other than the mark on the record 11. Accordingly, if a mark is once detected by the detector 72, unless it is detected during the next check, a decision is rendered that it is not a normal mark, thus preventing a malfunctioning. When a mark is determined to be normal, TPCOU is reset to 0 and it is checked whether RP F/F is set. If RP F/F is not set, SETCOU is checked. If RP F/F is set, E F/F is set, thus setting the mask for INT2. If a check of SETCOU reveals that its count is not 0, the operation goes to a routine which sets the mask for INT2. If SETCOU is found to be 0, RP F/F is set, thus setting the mask for INT2. After setting the mask for INT2, the mask for INT1 is reset, returning to the routine from which an interrupt has occurred. The detection circuit which detects the sync signal is shown in FIG. 82 and will be described later.

6. INT1 operation in response to timing pulse (FIGS. 77 (6) and 81)

When the timing pulse is supplied, it is counted by TPCOU, which controls various operations.

(1) When a print signal from a print key on the operating panel 317 is inputted, the mask for INT1 remains set until the sub-scan sync mark is detected by the detector 72, and hence TOCOU does not operate (as mentioned previously in connection with the print start). P F/F assumes a value of 1.

(2), When the motor is set in motion and the sub-scan sync mark is detected by the detector 72, TPCOU is reset to 0 and the mask for INT2 is set while resetting the mask for INT1. Accordingly, TPCOU counts up for each timing pulse which is applied subsequently. The mask for INT2 is left in its set condition until TPCOU reaches a given value L, thus inhbiting an interrupt operation in response to a mark detection signal from the detector 72 in order to prevent the occurrence of a mark detection signal in response to the presence of flaw or dust on the record 11.

(3) The timing pulse is counted by TPCOU, and a check is made to see if heater F/F is equal to 0. If it is 0, the charger 14 is turned off at the time when the count of TPCOU reaches a present value A. If the heater F/F assumes a value of 1, the operation enters the power on routine.

(4) When the count of TPCOU reaches a preset value B, WRE is reset to 0, but without effect since WRE is not originally set at the print start.

(5) The charger is turned on when TPCOU assumes a value of 1.

Figure 80:
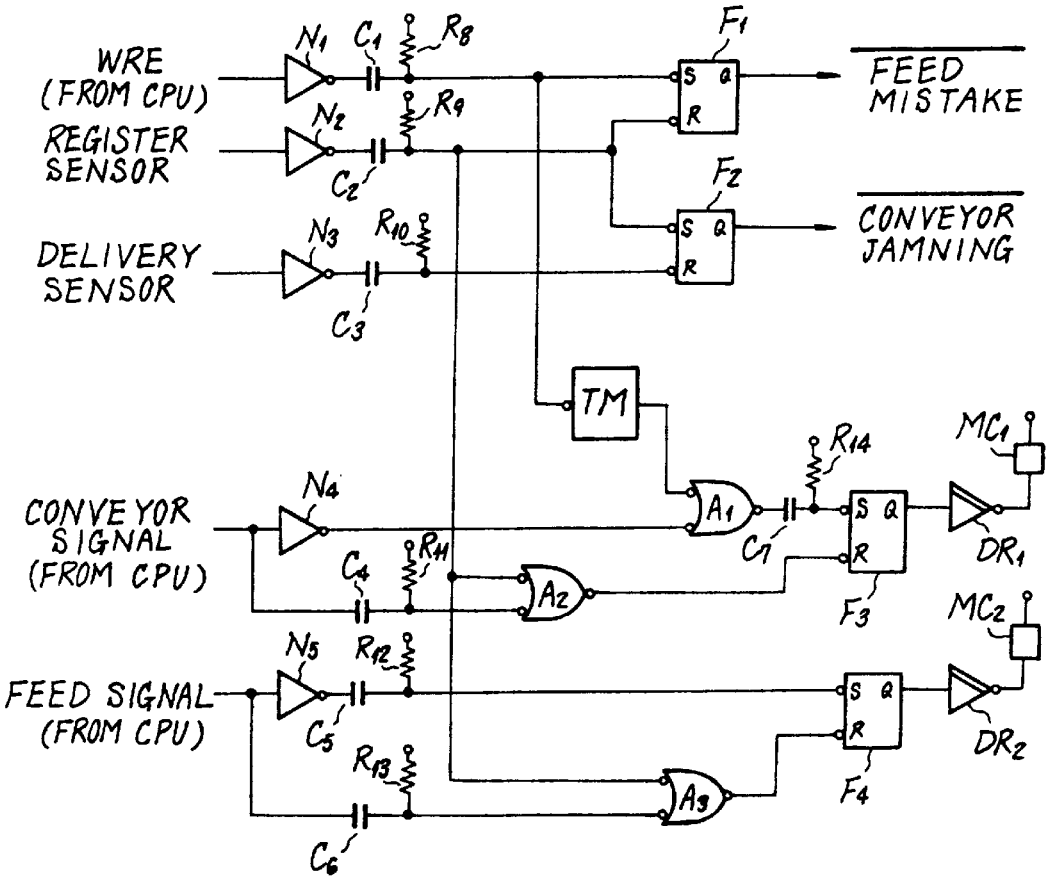

(6) When TPCOU assumes a preset value of J, WRE is set 1, allowing an external timer TM to start. As shown in FIG. 80, the timer TM receives the input WRE through an inverter N1 and a differentiator including capacitor C1 and resistor R8.

Referring to FIG. 80, there are shown flipflops F1 to F4, inverters N1 to N5, capacitors C1 to C7, resistors R8 to R14, gates A1 to A3, drivers DR1, DR2, conveyor clutch MC1 (shown by numeral 299 in FIG. 4) which drives the conveyor system, and feed clutch MC2 (shown by numeral 304 in FIG. 4) which drives the feed roller 6a. The flipflop F1 is set by WRE, and is reset by a detection signal from the resistor sensor 179 (FIG. 2). The flipflop F2 is set by a detection signal from the register sensor 179, and is reset by a detection signal from the delivery sensor 272 (FIG. 61).

The register sensor 179 detects a record sheet at the location of the conveyor roller pair 18 while the delivery sensor 272 detects a record sheet at the location of the delivery port. The central processing unit CPU checks outputs from the flip-flops F1 and F2 at a given timing to render a determination concerning a feed mistake and a jamming.

(7) (a) When TPCOU reaches a present value of C, FSYNC, a signal externally supplied and indicative of the width of an image, is checked and if it is equal to 1 and there is no conveyor jamming, the operation returns to the start.

(b) If FSYNC is not equal to 1, WRE is reset to 0, turning the charger 14 off.

(c) When a conveyor jamming is checked during the step (a) or (b), the occurrence of a conveyor jamming is determined to be present if the sheet does not reach the delivery sensor 272 and the flipflop F2 is set. The conveyror jamming F/F is then set to 1, turning the charger 14 and the transfer charger 19 off, with the display 318 providing an indication to this effect.

(8) (a) If SETCOU is not equal to 0 and RP F/F is equal to 0 when TPCOU reaches a present value of D, a feed signal and a conveyor signal are outputted to set the filiflops F3 and F4, thus turning the convoyor clutch MC1 and the feed clutch MC2 on while decrementing SETCOU by one. If SETCOU is not equal to 0 and RP F/F is equal to 0, the operation returns to the start.

(b) If SETCOU is not equal to 0 and RP F/F is equal to 1 after decrementing SETCOU by one in the step (a), P F/F is reset to 0, returning the operation to the start.

(c) If SETCOU is equal to 0 after decrementing SETCOU by one in the step (a), P F/F is reset to 0, returning the operation to the start.

(d) If SETCOU is not equal to 0 and RP F/F is equal to 1, P F/F is reset to 0, returning the operation to the start.

(e) If SETCOU is equal to 0, the charger 14 is turned off. RP F/F is set to 1 while P F/F is reset to 0, returning the operation to the start.

(9) When the sheet reaches the location of the register sensor 179, both flipflops F3 and F4 are reset, turning the feed clutch MC2 and the conveyor clutch MC1 off.

(10) When TPCOU reaches a present count of E, the feed signal is turned off to supply a reset signal to the flipflop F4, thus turning the feed clutch MC2 off.

(11) When TOCOU reaches a present count of F, a jamming is checked, and if the sheet does not reach the register sensor and the flipflop F1 is set, it is determined that there occurred a feed mistake, setting the feed jamming F/F to 1 to turn the charger 14, the transfer charger 19, the feed clutch MC2 and the conveyor clutch MC1 off. The display 318 displays the occurrence of a jamming.

(12) When TPCOU reaches a preset count of G, the transfer charger 19 is turned off.

(13) When TPCOU reaches a preset count of K, the transfer charger 19 is turned on.

(14) When TPCOU reaches a preset count of L, the mask for INT2 is reset.

(15) When TPCOU reaches a preset count of H, and if RP F/F and E F/F are equal to 1's, the entire process including the rotation of the motor 273 is turned off, setting the masks for INT1 and INT2. The record 11 now comes to a stop at the same position as it assumed at the print start.

A. "1" in P F/F allows the operations mentioned above under the sub-paragraphs (1) to (14) to be performed, but "1" in RP F/F prevents the feed clutch MC2, the conveyor clutch MC1, the charger 14 and the transfer charger 19 from being turned on.

B. If both RP F/F and E F/F are set to 1, only the operation under the sub-paragraph (15) takes place.

It should be understood that during the operation A or B takes place, other items may be checked or other components may be turned off without causing any difficulty. In the example shown, the record 11 moves through three revolutions when a single copy is to be produced.

As discussed above, in accordance with the invention, the position where the record stops after a record operation is located upstream of re-usable step (neutralizing and claning step) as close thereto as possible. In this manner, the time spent until the record operation is initiated is reduced, as is the movement of the record upon completion of the record operation. Because the re-usable step is not entered intermediate its length, it is possible to use the record repeatedly under identical conditions, assuring the formation of a good image.

The junction x in the record 11 located in the non-record area is contrasted to the remainder of the record in that it is uneven in profile, has a reduced strength and is liable to cause an exfoliation of photoconductive layer. Accordingly, it is undesirable that the junction be located around the curved regions E, E1 (FIG. 22) when the record comes to a stop. In this respect, it will be seen that according to the invention, the junction is located on a linear zone, preventing any force from acting upon the junction which tends to weaken it, thus assuring that the mechanical strength of the record be maintained over a prolonged period of time.

Figure 83:
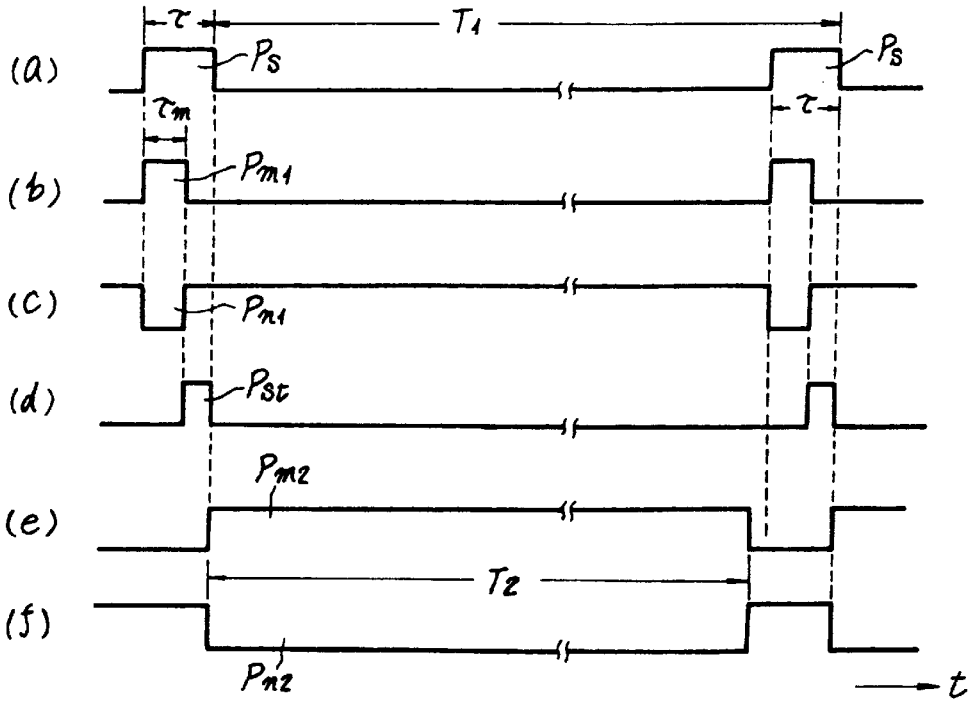
FIG. 83 is a series of timing charts illustrating the operation of the system shown in FIG. 82.

One technique to detect a sync signal will now be described with reference to FIGS. 82 and 83. FIG. 82 shows a sync signal detector circuit SDA where $A_1$, $A_2$ represent AND circuits, $MM_1$, $MM_2$ monostable multivibrators, $INV_1$ $INV_2$ inverters. The operation of the detector circuit SDA will be apparent by reference to waveforms of signals shown in FIGS. 83(a) to (f), but will be briefly described below.

The output signal from the detector 72, FIG. 83(a), is applied to ttone input of AND circuit $A_1$, the other input of which is connected to receive a high level signal from the inverter $IV_2$. When the signal from the inverter $INV_2$ is high, AND circuit $A_1$ produces an output in the form of a pulse Ps. The monostable multivibrator $MM_1$ is triggered by the leading edge of the pulse Ps to produce an output pulse Pm1. FIG. 83(b), having a pulse width $\tau_m$ which is less than the pulse width $\tau$ of the normal sync signal.

The pulse Pm1 is inverted into a pulse Pn1, FIG. 83(c), by the inverter $INV_1$, which pulse is then supplied to one input of AND circuit $A_2$. The other input of AND circuit $A_2$ is fed from the output of AND circuit $A_1$ has a greater pulse width than the output pulse $\tau_m$ from the monostable multivibrator $MM_1$, there is produced on the output side of AND circuit $A_2$ a pulse Pst shown in FIG. 83(d).

When the signal supplied from the detector 72 is not the sync signal Ps, but is a noise, the pulse width of the noise which is greatly reduced as compared with the pulse width $\tau$ of the sync signal prevents such noise pulse from being outputted by AND circuit $A_2$. In this manner, the output pulse Pst from AND circuit $A_2$ is supplied to CPU as a true sync signal.

It Will be seen that when the printer is performing a continuous record operation, the record 11 is moving at a uniform speed so that the prevailing sync signal will appear at a given time interval $T_1$. Accordingly, when a true sync signal is detected by AND circuit $A_2$, a gate signal may be formed having a pulse width $T_2$ which is slightly less than the period $T_1$ of the sync signal and referred to the time of occurrence thereof and applied to AND circuit $A_1$, thus enabling a more reliable detection of the sync signal.

In FIG. 82, the output pulse Pst from AND circuit $A_2$ is applied to the monostable multivibrator $MM_2$, which is triggered by the trailing edge of the output pulse Pst to produce a pulse Pm2, FIG. 83(e), of a pulse width $T_2$ which is slightly less than the period $T_1$ of the sync signal on its output side. The pulse Pm2 is fed through the inverter $INV_2$, which converts it into a gate pulse Pn2. FIG. 83(f), to be applied to AND circuit $A_1$.

It will be appreciated that the described techhique allows a true sync signal to be detected from among output signals of the detector 72 and to supply the sync signal to the control unit.

The printer of the invention is provided with safeguard means, the control of which is simplified, to assure against the occurrence of a trouble in conveying the record sheet, such as a feed mistake or paper jamming. Such safeguard means include the paper end sensor 133 which detects the presence or absence of record sheet or sheets in the tray 3, a write enable circuit which is enabled when "sheet present" signal is produced to supply a signal which permits a supply of the record sheet, the register sensor 179 disposed rearwardly of the conveyor roller pair 18 for detecting whether or not a record sheet fed by the feed roller 17 is present at the location of the sensor, the register sensor 272 (FIG. 61) disposed in the region of the delivery roller 25 for detecting the presence or absence of the record sheet, register failure detection means responsive to the write enable signal for producing a "feed success" signal if the record sheet is detected by the register sensor 179 and for producing a "feed success" signal regardless of the register sensor 179 in the event the write enable signal is not produced, and jamming detection means for producing a "no jamming" signal if the presence of the record sheet is detected by the delivery sensor 272 after the presence of the record sheet has been detected by the register sensor 179, a "jamming" signal if the delivery sensor 272 fails to detect the presence of the record sheet, and a "n jamming" signal regadless of the delivery sensor 272 in the event the register sensor 179 has detected the absence of the record sheet. Independently from the status of the paper end sensor 133, register failure detection means and jamming detection means, a sampling operation is maintained at suitable timings as the process proceeds.

Figure 84:
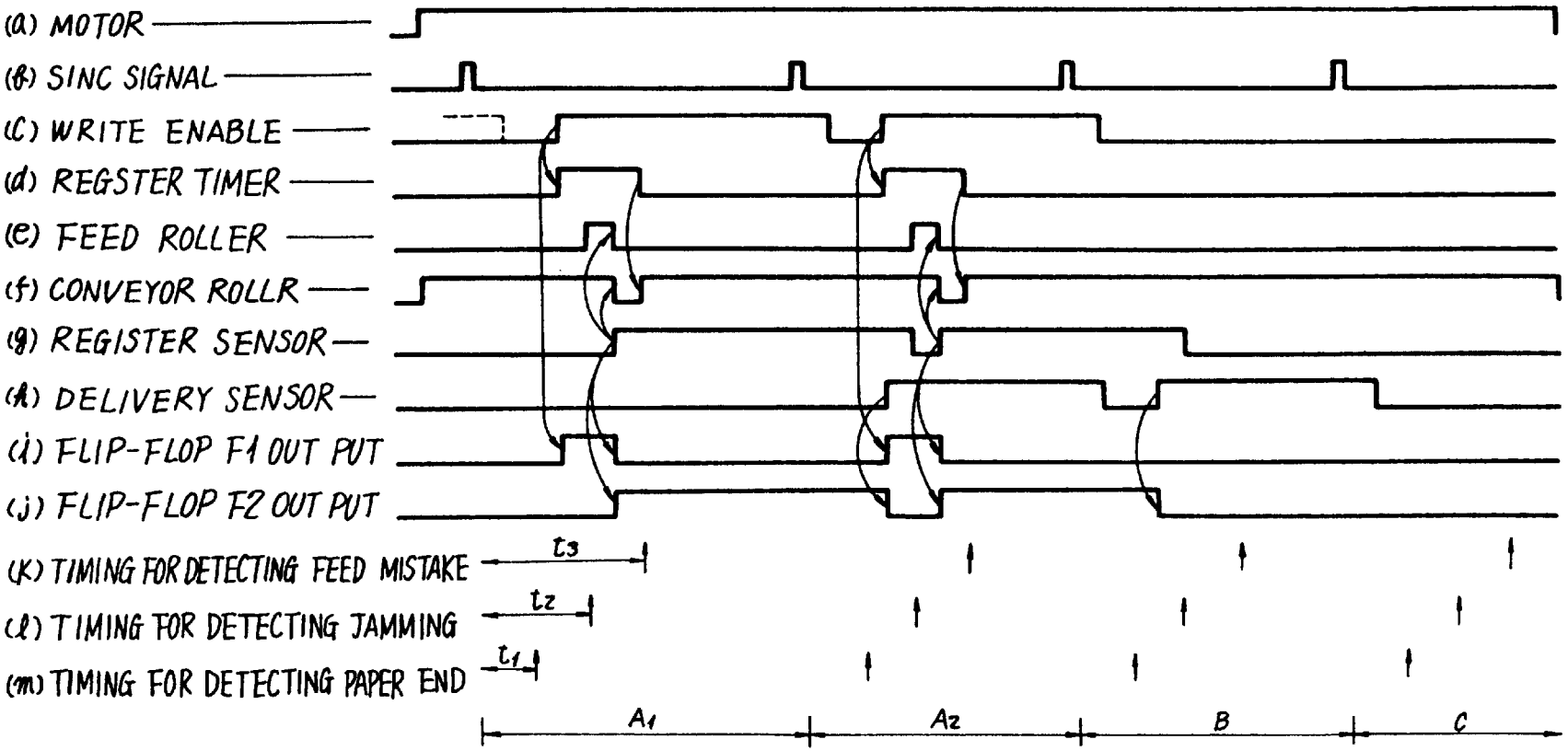
FIGS. 84 to 86 show series of timing charts involved with the detecting the record of a record sheet.

Referring to FIG. 84, when the motor is set in motion, FIG. 84(a), and the sync signal is supplied, FIG. 84(b), the process control proceeds on the basis of the sync signal. After the occurrence of the sync signal, an output from the paper end sensor is sampled. FIG. 84(m), at a time $t_1$, and an output from the jamming detection means is sampled at a time $t_2$, FIG. 84(l), and a feed mistake is sampled at a time $t_3$, FIG. 84(k), all under the control of CPU (FIG. 76). The write enable is outputted, FIG. 84(c), after it has been determined that the record sheet has not exhausted, and subsequently the feed drive system is activated. A flipflop circuit F1 is set, FIG. 84(i), by the leading edge of the write enable, and is reset, FIG. 84(i) by the leading edge of the register sensor 179, FIG. 84(g) Thus, the write enable output is construed as a feed success in the event an output from the register sensor 179 has a leading edge until $t_3$, and is construed as a feed failure in the event such output has no leading edge until time $t_3$. In the latter instance, the feed drive system is stopped, the heater 207 (FIG. 61) is turned off, and after the preceding record sheet is delivered out of the printer, the motor is stopped, providing a display of a feed failure or mistake. In the event the write enable is not outputted, the flipflop circuit F1 is not set, and this is construed as a feed success. A flipflop circuit F2 is set, FIG 84(j), by the leading edge of the register sensor 179, and is reset, FIG. 84(j), by the trailing edge, FIG. 84(h), of the delivery sensor 272 (FIG. 61). Specifically, after a successful feed operation, if there is a leading edge from the delivery sensor 272 until time $t_2$ of the next cycle, no jamming is determined. However, if there is a leading edge, the occurrence of jamming is determined, the heater 207 is turned off, and the entire drive system is stopped with a display of jamming. In the event of a feed failure, the flipflop circuit F2 is not set, and hence a jamming is not detected during the delivery operation of the preceding record sheet.

Figure 85:
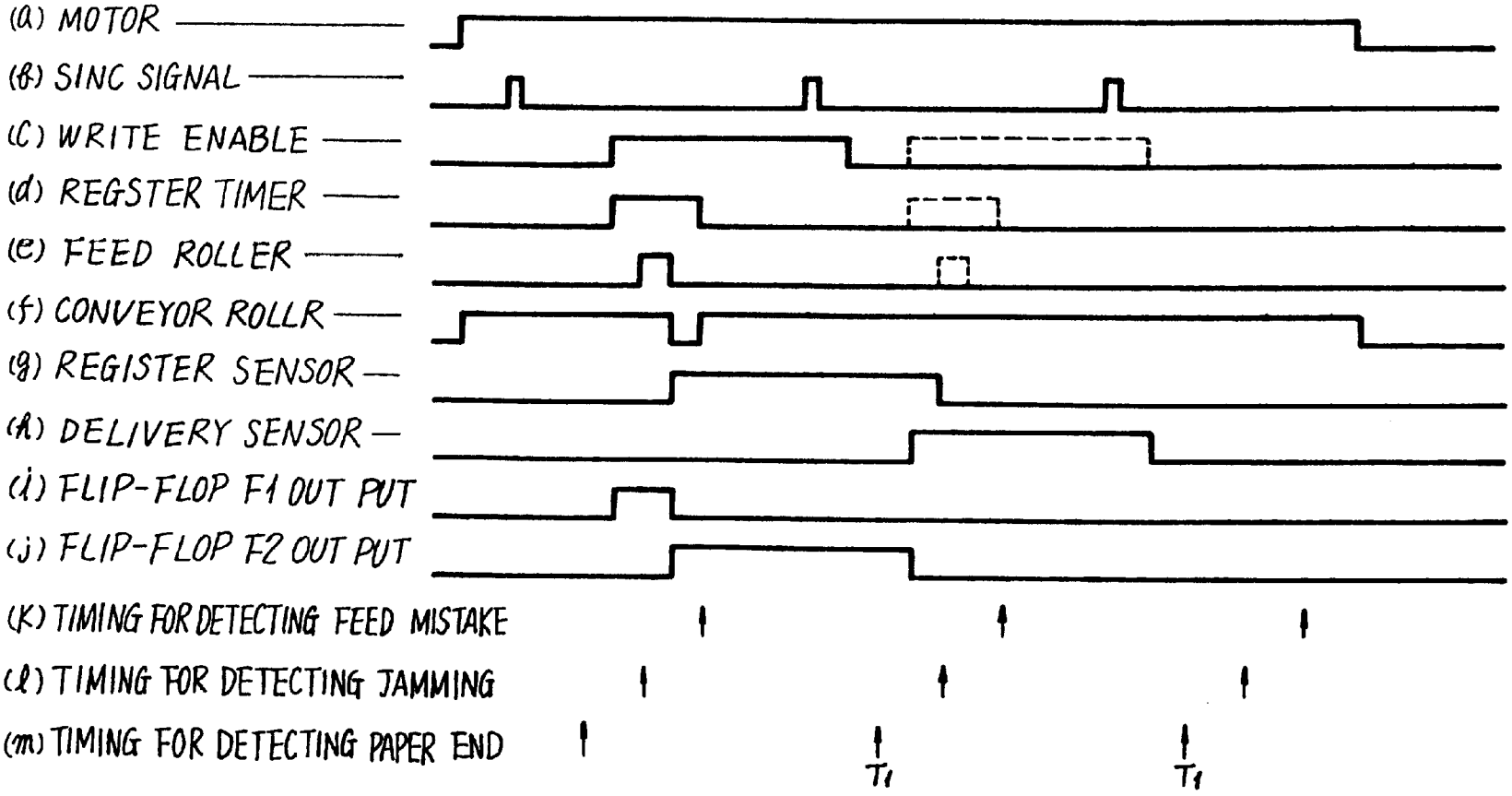

FIG. 85 shows a series of timing charts which are applicable when the paper end or exhaustion is detected. In the example, shown, the paper end is detected during the second cycle. When the paper end is detected (see $T_1$ in FIG. 85), no write enable is outputted, and the feed drive system does not operate. Consequently, the flipflop circuit F1 is not set, and accordingly if a signal is sampled in order to detect a feed failure, a feed success results. Since no transfer sheet is supplied to the register sensor 179, the flipflop circuit F2 is not set, and hence any operation to detect a jamming results in the determination of no jamming. While in the above description, the paper end is detected at a given timing, it is only necessary that it be detected before a signal is outputted which indicates that a feed operation is going to take plate. In the example shown, such signal corresponds to the write enable.

Figure 86:
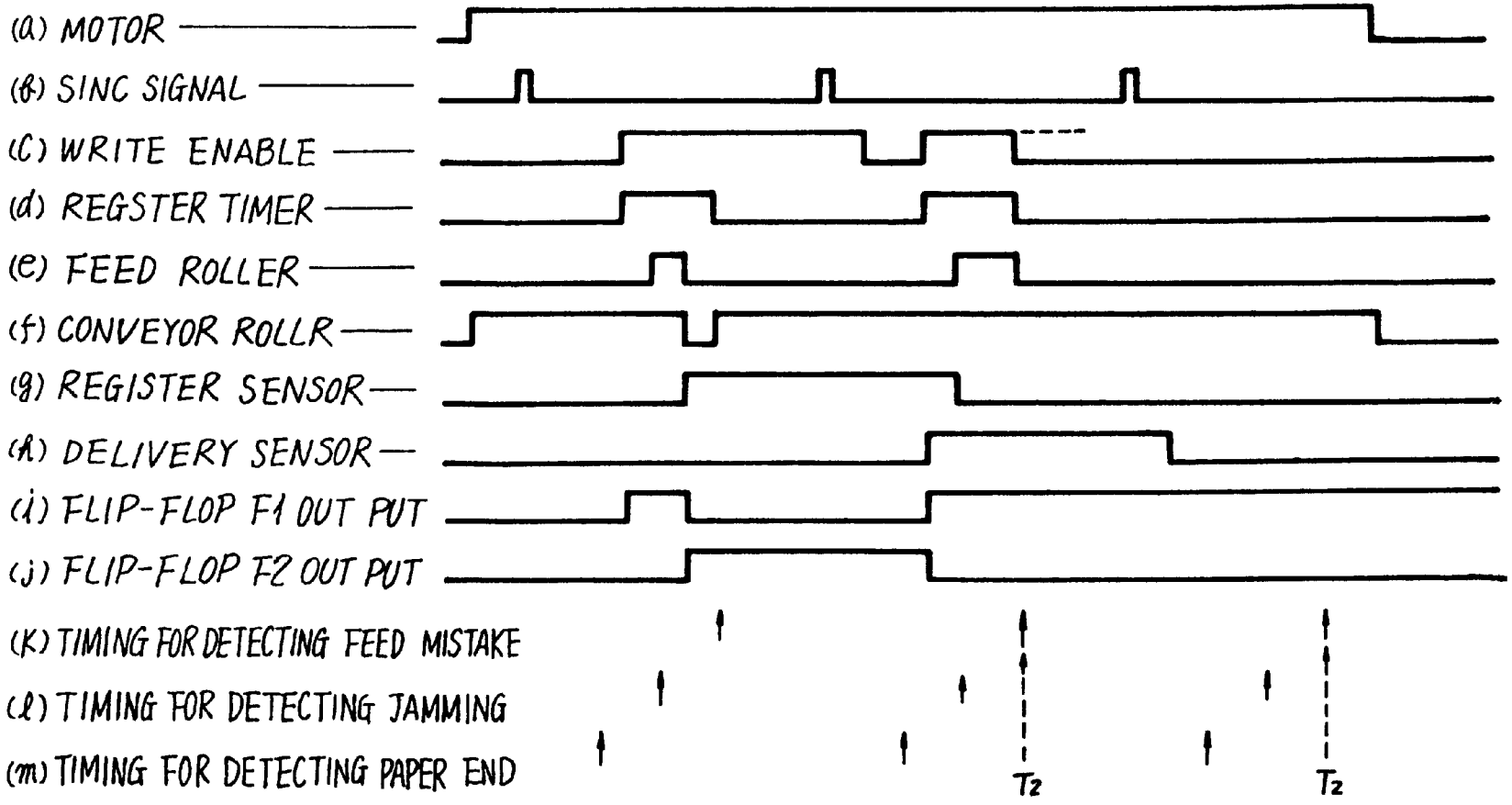

FIG. 86 graphically illustrates a series of timing charts for the occurrence of a feed mistake, which is assumed to occur during a second cycle. Upon occurrence of a feed mistake (see $T_2$ of FIG. 86), the heater 207 is turned off in order to prevent any danger, but the preceding record sheet on which the image is properly formed is fixed by utilizing waste heat of the heater 207 and is delivered externally of the printer. The motor comes to a stop when the record reaches a given position. In the meantime, a jamming detection is made, but the failure of the flipflop F2 to be set as a result of the feed mistake allows a determination to be rendered that no jamming has occurred, whereby a safeguard operation takes place alone reliably as a result of feed mistake.

Figure 87A:
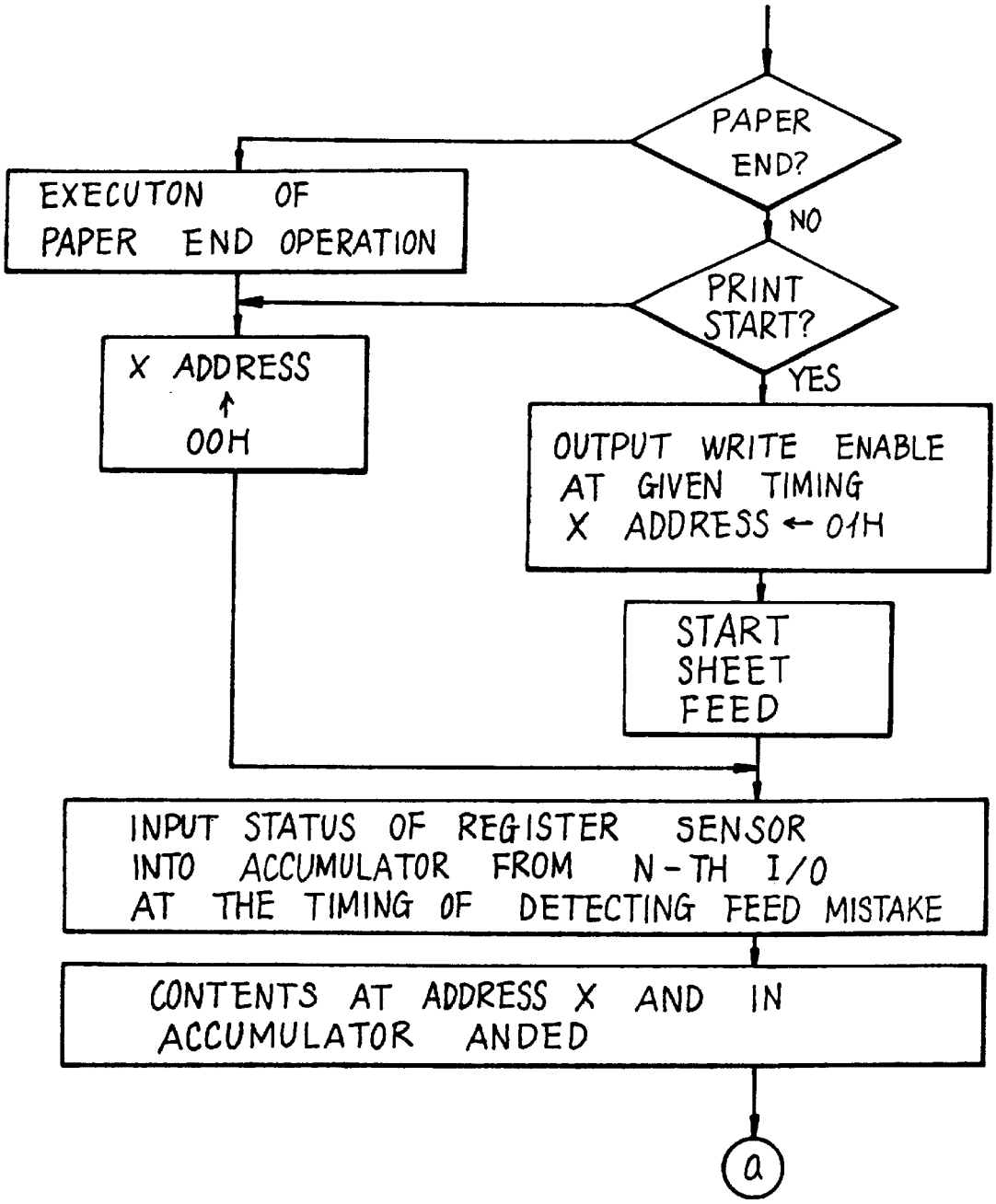
FIGS. 87(a) and 87(b) are a flow chart illustrating the operation shown in shown in FIGS. 34 to 86.
Figure 87B:
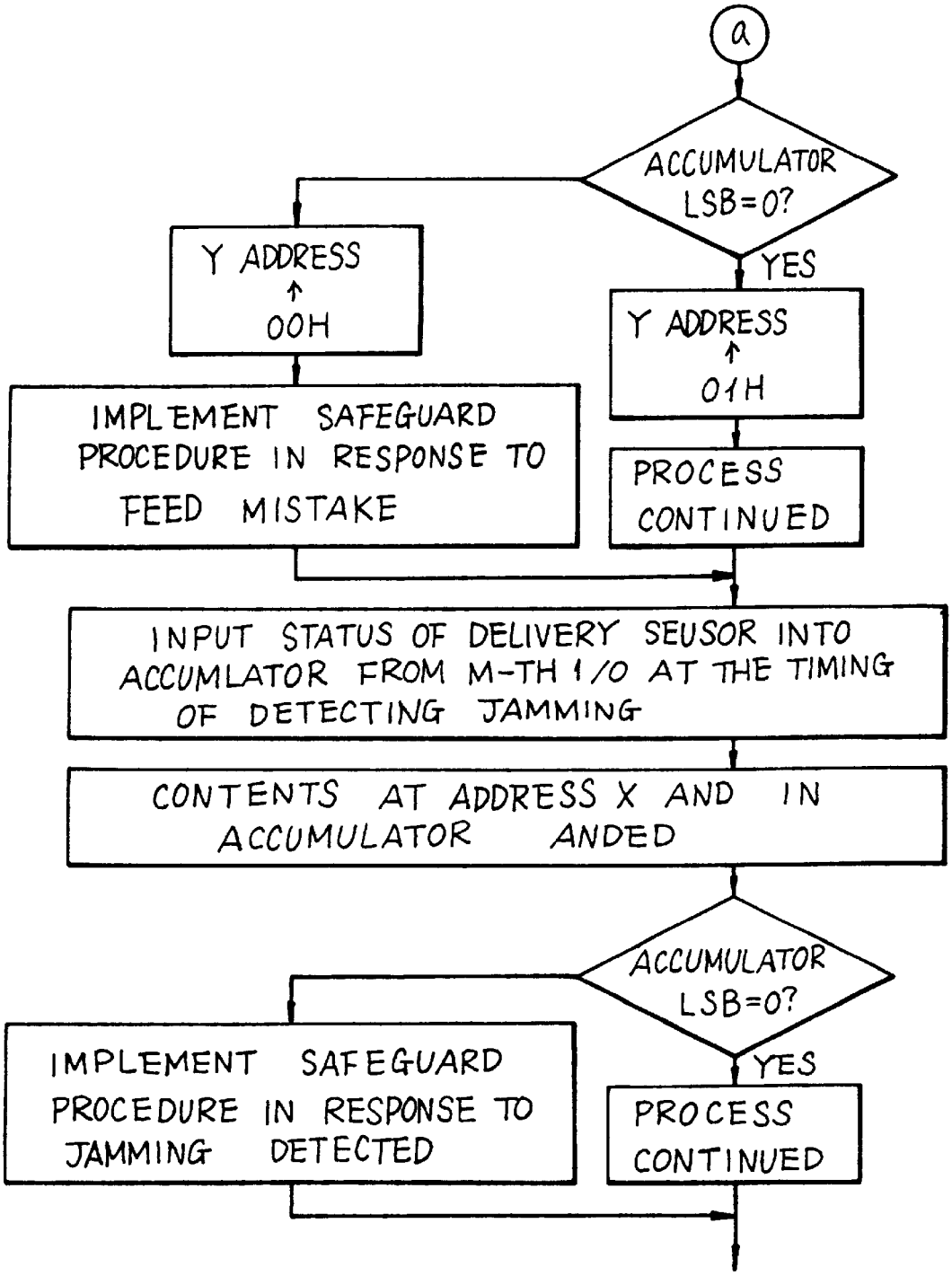

FIG. 87 is a flow chart for the described operations which may be carried out by using a microcomputer or the like. The least significant bit at address X performs the same function as the flipflop F1, and the status of the register sensor is fed to the least significant bit of N-th I/O, which status represents "0" when the record sheet is "present" and is equal to "1" when it is absent. The least significant bit at address Y performs the same function as the flipflop F2 and the status of the delivery sensor 272 is fed to the least significant bit of M-th I/O, which status represents "0" when the record sheet is "present" and represents "1" when it is absent.

It will be evident from the foregoing description that in accordance with the invention, a simple arrangement utilizing a pair of flipflop permits a sampling of individual outputs at times $t_1$, $t_2$ and $t_3$ in each of blocks A1, A2, B and C, thus facilitating a simplified control. In addition, the paper end or feed mistake removes the necessity to prevent a subsequent detecting operation, further simplifying the control in an advantageous manner.

In accordance with the invention, there is provided means which turn off the power supplies after desired processings have been completed within the printer and after the region of the record where an image to be formed was moved out of the region of the charger.

Said means comprises a power connection apparatus connected between a commercial a.c. source and a receiving end including the power supply unit, in combination with power turn-on means which allows the receiving end to be fed from the a.c. source. When the turn-on means is closed, the connection apparatus is brought to its "connected"

condition, and when the turn-on means is disconnected, the connection apparatus is brought to its "interrupted" condition after completion of necessary processings within the printer.

In the printer of the invention, an error in the timing can be reliably detected with a reduced cost arrangement, while avoiding the use of time limit circuit or elements which are analog in nature. Specifically, in accordance with the invention, the count of timing timing pulse which has occurred since the detection of the mark is monitored, and an error in the timing is detected when such count exceeds a given value which is slightly greater than the magnitude of a count which would be reached during the movement of the record between successive detections of the mark. In this manner, the central control unit which effects the primary timing control can be utilized to detect an error by digital processing of the timing pulses. This avoids the need for any external timer, and enables an error detection which is substantially free from the influence of tolerances in the values of C and R components or temperature fluctuations.

In accordance with the invention, a variation in the offset which results from the initialization of the timing pulse count is avoided. Specifically, in accordance with the invention, a count $C_T$ of timing pulse is compared against a standard value Q at the time when the mark is detected, and a deviation $C_T$–Q therebetween is chosen as an initial count. By way of example, if the count $C_T$ at the time the mark is detected is equal to A–1, it is determined that the timing pulse occurred immediately after the detection of the mark during the previous initialization or that the control timing during the previous cycle has been advanced by one timing pulse, relative to the position of the record. Consequently, the initial count is now preset to –1, thus delaying the control timing to be used during the current cycle by one timing pulse relative to the position of the record. If $C_T$=Q+1 at the time when the mark is detected, it is determined that the timing pulse has occurred immediately before the detection of the mark during the previous initialization or that the control timing used during the previous cycle has been lagging by one timing pulse relative to the position of the record. Accordingly, the initial count during the current cycle is preset to +1, thus delaying the control timing during the current cycle by one timing pulse as compared with the previous cycle. If $C_T$=Q, the initial count of 0 is chosen, assuming that the control timing matches the position of the record.

In the prior art practice, any timing pulse which occurs during the time the mask INT1 is being set is neglected, resulting in a non-uniform image width (in the sub-scan direction). An actual image width is determined in accordance with a preset number of timing pulses (count J→B in the timing chart). If TP.COU is reset to 0 during such time, there occurs an error of 0±1 in the number of counts from J to B. Accordingly, in the present embodiment, above situation is taken into consideration by comparing the prevailing count of TP.COU with a number of timing pulses (count Q) required for the record 11 to complete one revolution, and by setting TP.COU equal to FF, to 1 to 0, respectively, if it is equal to Q–1, Q+1 or other than Q±1, respectively (It is that TP.COU comprises 8 bits and provides a hexadecimal code.) Hence, if the sum of the delay time and the number of instructions executed by INT2 is substantially equal to the duration of the width of the timing pulse, there results a substantially uniform image (print) width. Any deviation can be held within two-third the usual value. Since TP.COU is equal to 0 at the start, there is no change in the content of TP.COU. While the initial count of 0 is used, it should be understood that the initial count need not be limited to 0. While it is assumed that the timing pulse has an error in a range of 0±1, it is also possible to use an error of 0±5, for processing by a program.

In the flow chart which controls the print operation, a slip may occur between the drive roller or follower roller and the record 11 during the time the belt is driven. Any slip may cause a disturbance in the image as a result of an exposure onto the non-record area or lagging operations in various steps. For this reason, a number (P) which is slightly greater than the number of timing pulses required for one revolution of the record is preset in the program which is used to execute the flow chart. There is no problem whatsoever if the record 11 is maintained in close contact with the roller since the sub-scan sync signal has been sensed (INT2). On the contrary, if dust, toner or the like becomes interposed therebetween during use to cause a slip so that a greater number of timing pulse than normal are counted and the preset value P is reached, the sub-scan error flipflop is set to 1. Under the normal driving condition, the counter is initialized by the detection of the mark until the preset value P is reached, and hence the sub-scan error flipflop cannot be set. If the sub-scan error flipflop is set to 1 by reaching the preset value P, the flip-flop is set in the error check flow chart shown in FIG. 77 (3), whereby various mechanism are deenergized and an error display is given.

Figure 90:
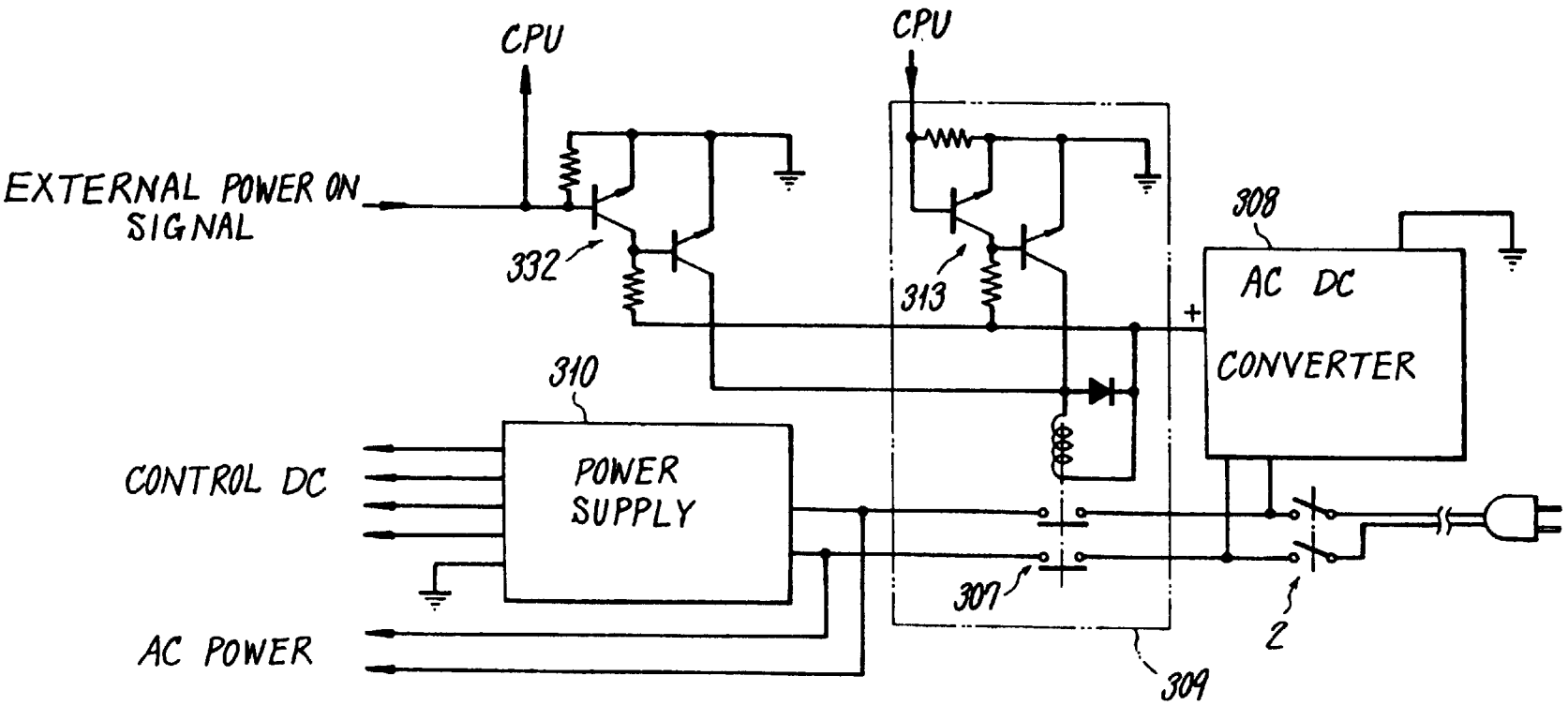
FIGS. 90 and 91 are circuit diagrams of different forms of power supplies.
Figure 91:
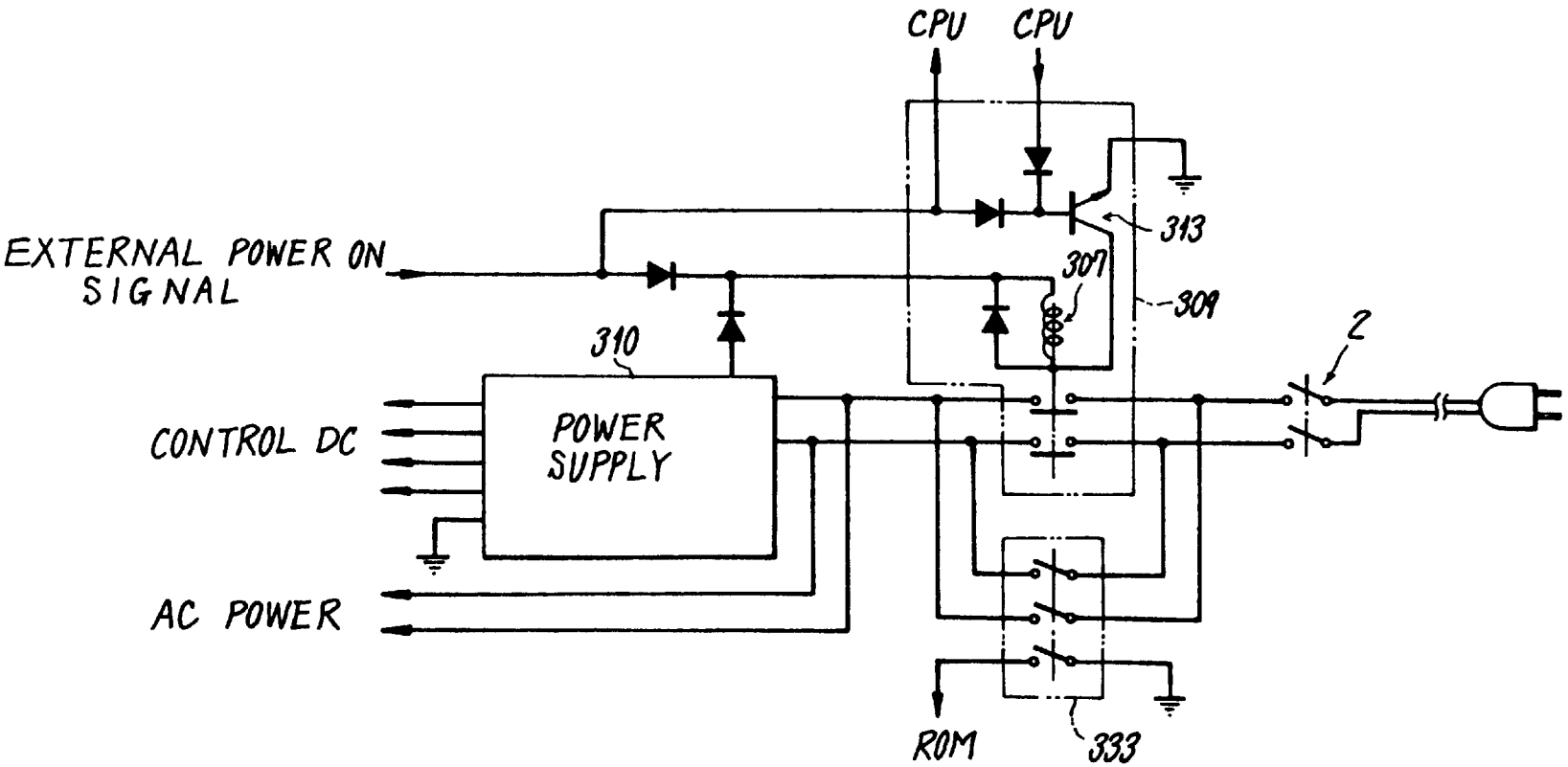

FIGS. 90 and 91 show different forms of the power supply unit. In the arrangement of FIG. 90, the power turn-on means comprises an NPN power transistor circuit 322, which is connected to the coil of a main relay 307. In this manner, the circuit 322 is turned on in response to an external power on signal, thereby closing the main relay 307. The external power on signal is fed to the input port of ROM, which is monitored by CPU, which controls the printing operation and the opening/closing of the main relay 307 in the manner mentioned above. When the power supply is to be turned on in response to an operation by an operator, the circuits 313 and 332 are shunted by a power switch 311. In the arrangement of FIG. 91, in order to eliminate the power dissipation in the a.c.-to-d.c. conversion circuit 308 during the time the power supply is turned off, the circuit 308 is eliminated, and is replaced by a double-pole power switch 333 which is connected in shut with the relay 307. In this manner, the power dissipation is entirely eliminated when the power switch 333 is open, there is no external power on signal and CPU turns the switching circuit 313 off.

We claim:

1. A compact, electrophotographic printer comprising:

a housing having a front wall and a rear wall, side walls, a top wall, and a bottom wall, said walls defining an interior space;

a sheet feeder for feeding a sheet in said housing;

sheet moving means defining a sheet moving path for moving a sheet fed from said sheet feeder;

electrophotographic components positioned in said interior space along the sheet moving path;

fixing means disposed at an end of the sheet moving path for fixing an image on the sheet;

a sheet delivery unit for receiving the sheet discharged from a sheet discharging port in said printer and having a delivery port for delivering the sheet on said top wall;

a delivery roller disposed in said delivery port;

guide members for guiding the sheet discharged from the printer to said delivery roller;

delivery roller driving means engageable to a rotating member disposed at said sheet discharging port for rotating said delivery roller; and a cover which is a portion of said top wall, covering an upper portion of said fixing means, wherein said cover is attached to said printer so as to be openable;

wherein said rotating member disengages from said delivery roller driving means when said cover is opened; and wherein said sheet delivery unit deposits the sheet on said top wall substantially over said electrophotographic components.

2. A compact, electrophotographic printer according to claim 1, wherein said top wall has an opening formed therein through which said fixing means is accessible, and said sheet delivery unit is hinged on said rear wall so as to be pivotable from an operating position covering said opening to a service position exposing said opening.

3. A compact, electrophotographic printer according to claim 1, wherein said sheet delivery unit is detachably hinged to said rear wall so as to be detachably removable therefrom, and wherein said printer further comprises a cover which is hingably mounted to said rear wall to pivotably cover and expose said sheet discharging port, in place of said sheet delivery unit, said cover having a rear opening exposing said sheet discharging port through said rear wall for allowing sheets to be discharged out a rear side of said housing, and a receiving tray mounted at the rear side of said rear wall for receiving the discharged sheets thereon.

4. A compact, electrophotographic printer according to claim 1, further comprising a photosensitive member and means for forming a latent image on said photosensitive member wherein said latent image forming means includes means for receiving image data from an external device corresponding to an image to be recorded, and exposure means for optically exposing said photosensitive member to a light beam.

5. A compact, electrophotographic printer according to claim 4, wherein said external device is a computer.

6. A compact, electrophotographic printer according to claim 4, wherein said exposure means includes a laser beam exposure unit.

7. A compact, electrophotographic printer as in claim 4, wherein said exposure means comprises an optical scanning means.

8. A compact, electrophotographic printer according to claim 1, further comprising a photosensitive member and developing means, both of which are removable from said printer as a unit.

9. A compact, electrophotographic printer as in claim 1, including side plates for guiding said sheets delivered on said top wall.

*10. An image forming apparatus comprising:*

*a photosensitive member and a first gear secured thereto for rotation about a first axis, a charger electrostatically charging the photosensitive member, an exposure device forming latent images at said photosensitive member, a developing device developing said latent images into developed images and a second gear secured thereto for rotation about a second axis, a paper supply device, an image transfer device transferring said developed images to paper supplied from the paper supply device, a fixing device fixing the images transferred to said paper, and a paper discharging device discharging paper with images fixed thereon;*

*a single unit comprising a frame supporting at least said photosensitive member and said developing device, said frame supporting said first and second gears for rotation, with the first and second axes substantially parallel to each other and spaced from each other by a selected distance, and with the first and second gears meshed with each other to rotate in synchronism;*

*said apparatus including a housing having a mounting structure defining an insertion/removal path for said single unit along which said single unit is inserted into the housing to an operative position and is manually removed from the housing;*

*wherein said insertion/removal path is substantially perpendicular to said first and second axes;*

*a selectively rotating driving gear in said housing;*

*one of said first and second gears meshing with said driving gear to be driven thereby when said single unit is inserted into the housing to said operative position;*

*whereby when the single unit is at its operative position in the housing, the driving gear drives one of said first and second gears, and the driven gear in turn drives the other one of said first and second gears to ensure a positive power transmission from the driving gear to the first and second gears, and wherein the single unit can be inserted into or removed from the printer while allowing a positive control of positioning.*

*11. An image forming apparatus as in claim 10, wherein said apparatus is a printer.*

*12. An image forming apparatus as in claim 11, including a face-down output portion formed at a top surface of said printer, wherein said paper discharging device discharges paper with images fixed thereon onto said output portion.*

*13. An image forming apparatus as in claim 11, in which said housing has side walls extending along said insertion/removal path and a front, and wherein said single unit is inserted/removed from in front of the printer.*

*14. An image forming device as in claim 11, in which said housing has side walls extending along said insertion/removal path and a front, and said housing includes a mounting structure defining another insertion/removal path along which said sheet supply device is inserted into and removed from the housing from in front of the printer.*

*15. An image forming device as in claim 11, in which said housing has side walls extending along said insertion/removal path and a front, and said printer includes a display and a control panel visible to and directly accessible by a user directly from in front of the printer.*

*16. An image forming apparatus comprising:*

*a photosensitive member, a charger electrostatically charging the photosensitive member, an exposure device forming latent images at said photosensitive member, a developing device developing said latent images into developed images, a paper supply device, an image transfer device transferring said developed images to paper supplied from the paper supply device, a fixing device fixing the images transferred to said paper, and a paper discharging device discharging paper with images fixed thereon;*

*a single unit comprising a frame supporting at least said photosensitive member and said developing device;*

*said apparatus including a housing having a mounting structure defining an insertion/removal path for said single unit along which said single unit is inserted into the housing to an operative position and is manually removed from the housing;*

*wherein said insertion/removal path is substantially perpendicular to a longitudinal rotational axis of said photosensitive member;*

*a selectively rotating driving gear in said housing;*

*a driven gear mounted for rotation at said frame and meshing with said driving gear to be driven thereby*

*when said single unit is inserted into the housing to said operative position;*

*wherein said frame has a sidewall transverse to said rotational axis, and said driven gear is mounted in a position substantially inside said side wall, thereby facilitating insertion/removal of the single unit.*

*17. An image forming apparatus as in claim 16, wherein said apparatus is a printer.*

*18. An image forming apparatus as in claim 17, including a face-down output portion formed at a top surface of said printer, wherein said paper discharging device discharges paper with images fixed thereon onto said output portion.*

*19. An image forming apparatus as in claim 17, in which said housing has side walls extending along said insertion/removal path and a front, and wherein said single unit is inserted/removed from in front of the printer.*

*20. An image forming device as in claim 17, in which said housing has side walls extending along said insertion/removal path and a front, and said housing includes a mounting structure defining another insertion/removal path along which said sheet supply device is inserted into and removed from the housing from in front of the printer.*

*21. An image forming device as in claim 17, in which said housing has side walls extending along said insertion/removal path and a front, and said printer includes a display and a control panel visible to and directly accessible by a user directly from in front of the printer.*

*22. A compact electrophotographic printer delivering printed sheets stacked face-down at the top of the printer in the order of printing so that the sheets are collated as delivered, said printer having a control panel and a display directly accessible to the user for viewing and operation from in front of the printer and said printer being configured for the manual insertion/removal by the user, from in front of the printer, of both a sheet supply and a single unit carrying at least a photosensitive member and a developing unit in directions generally parallel to the side walls of the printer so that the printer need not be accessible from other sides for that purpose and can reduce the use of office space in operation, comprising:*

*a printer housing having a front and a back, a top, left and right side walls, and an input for externally generated digital signals representing matter to be printed;*

*said top comprising an output portion for face-down delivery of printed sheets stacked in an order of printing, said output portion being directly user-accessible from in front of the printer;*

*a display and a control panel mounted at printer locations comprising areas spaced from said left and right walls and directly visible and accessible by a user from in front of the printer;*

*a sheet supply manually inserted into the printer directly from in front of the printer, in a direction generally parallel to the left and right side walls, and removable manually from the printer in an opposite direction;*

*internal components defining a sheet path generally parallel to said left and right side walls and extending from said sheet supply to said output portion and changing direction at an intermediate portion of the path;*

*a sheet feeder feeding sheets in succession from said sheet supply into said path;*

*electrophotographic components including at least a photosensitive member having an axis of rotation extending in a direction from one to the other of said left and right side walls, an exposure unit receiving digital signals from said input and in response forming latent images at said photosensitive member, a developing unit developing latent images formed at the photosensitive member, and a transfer unit transferring developed images from said photosensitive member to sheets fed along said path, wherein at least said photosensitive member and said developing unit are joined into a single removable unit;*

*a mounting structure for said removable unit defining an insertion/removal path generally parallel to said left and right side walls along which a user manually inserts the removable unit in the printer and manually removes the removable unit from the printer; and*

*a printed sheet ejector receiving sheets with images transferred thereto and delivering the received sheets face-down onto said output portion stacked in the order of printing so the sheets are collated as delivered.*

*23. An electrophotographic printer as in claim 22, in which said insertion/removal path extends generally toward the back of the printer for insertion and toward the front of the printer for removal of the removable unit.*

*24. An electrophotographic printer as in claim 23, in which the sheet path extends generally from the front toward the back of the printer and then from the back toward the front of the printer.*

*25. An electrophotographic printer as in claim 24, in which the display and control panels are at the front of the printer.*

*26. An electrophotographic printer as in claim 25, including a power on/off switch mounted at the front of the printer.*

*27. An electrophotographic printer as in claim 22, in which at least a portion of the output portion is vertically aligned with and overlies the photosensitive member.*

*28. An electrophotographic printer as in claim 22, including at least one rib at a front portion of said removable unit to facilitate grasping by the user for removal of the unit from the printer.*

*29. An electrophotographic printer as in claim 28, in which said rib has a side visible from in front of the printer after the unit has been inserted in the printer in an operational position.*

*30. An electrophotographic printer as in claim 22, in which said printing sheet ejector is positioned to eject sheets at a level higher than that of at least a portion of said output portion facing the back of the printer.*

*31. An electrophotographic printer as in claim 22, in which the back of the printer includes a hinged cover manually movable to an open position to allow access to a portion of said sheet path.*

*32. A method of printing matter represented by externally generated digital signals supplied to a printer, comprising the steps of:*

*receiving digital signals supplied from an external source and representing matter to be printed at a printer having left and right sides, a front and a top;*

*electronically processing said digital signals into optical printing signals and exposing therewith a photosensitive member in the printer to thereby form latent images thereon and developing the latent images;*

*guiding sheets along a sheet path generally parallel to the left and right sides of the printer and extending within the printer from a sheet supply to an output portion at the top of the printer;*

*transferring developed images from the photosensitive member to sheets moving along said sheet path;*

*delivering sheets with images transferred thereto from said sheet path onto said output portion in a direction*

*generally parallel to said left and right side of the printer, stacked face-down, with each successively printed sheet over the sheet printed last and with the printed sheets collated as delivered to the output portion;*

*manually inserting a sheet supply into the printer within a first guiding structure for insertion/removal of the sheet supply and manually removing the sheet supply from the printer within said first guiding structure in directions generally parallel to said left and right sides of the printer;*

*manually inserting a photosensitive member and a developing unit formed as a single unit into the printer within a second guiding structure and manually removing said unit from printer within said second guiding structure along directions generally parallel to the left and right sides of the printer; and*

*displaying printer function and manually inputting printer commands at printer locations that are spaced from the left and right sides of the printer;*

*whereby a user services the printer by inserting/removing the paper supply and the unit containing the photosensitive member and the developing unit, and observes the display and operates the control panel, from in front of the printer without needing access to other sides of the printer for that purpose and thereby said method reduces office space requirements for the operation and user servicing of said printer.*

*33. A method as in claim 32, in which said guiding comprises guiding said sheets along a path that initially extends from the front toward the back of the printer and then turns up toward the top of the printer.*

*34. A method as in claim 33, in which the user gains access to at least the portion of the path that turns up toward the top of the printer by manually pivoting at least a hinged portion of a back wall of the printer about a hinge axis extending in a direction from one to the other of the left and right sides of the printer.*

*35. A method as in claim 33, in which the direction in which the user manually inserts said unit into the printer is toward the back of the printer.*

*36. A method as in claim 35, in which the user inserts said sheet supply into the printer is toward the back of the printer.*

*37. A method as in claim 33, in which the user turns the printer off and on by manually operating a switch at the front of the printer.*

*38. A method as in claim 33, in which the user removes said unit by grasping a rib formed therein and pulling in a direction away from the back of the printer.*

* * * * *